(12) United States Patent
Ozasa et al.

(10) Patent No.: US 7,332,214 B2
(45) Date of Patent: Feb. 19, 2008

(54) BIODEGRADABLE MOLDED ARTICLE, MANUFACTURING METHOD THEREOF, AND COMPOSITION FOR EXPANSION MOLDING

(75) Inventors: Akio Ozasa, Kyoto (JP); Akihisa Hashimoto, Kyoto (JP); Rumi Shinohara, Ibaraki (JP); Shinji Tanaka, Takatsuki (JP)

(73) Assignee: Nissei Kabushiki Kaisha, Osaka (JP)

( * ) Notice: Subject to any disclaimer, the term of this patent is extended or adjusted under 35 U.S.C. 154(b) by 134 days.

(21) Appl. No.: 10/129,672

(22) PCT Filed: Sep. 12, 2001

(86) PCT No.: PCT/JP01/07903

§ 371 (c)(1),
(2), (4) Date: May 7, 2002

(87) PCT Pub. No.: WO02/22353

PCT Pub. Date: Mar. 21, 2002

(65) Prior Publication Data

US 2003/0107145 A1    Jun. 12, 2003

(30) Foreign Application Priority Data

Sep. 13, 2000    (JP) .............................. 2000-278585

(51) Int. Cl.
B32B 7/12 (2006.01)
B32B 9/00 (2006.01)
B29C 44/06 (2006.01)

(52) U.S. Cl. .................... 428/317.1; 264/46.4; 264/53; 428/304.4; 428/318.4; 521/84.1

(58) Field of Classification Search .................. 264/51, 264/53, 46.4; 428/304.4, 318.6, 317.1, 318.4; 521/84.1
See application file for complete search history.

(56) References Cited

U.S. PATENT DOCUMENTS 3,887,521 A * 6/1975 Blocker et al. ............. 528/195

(Continued)

FOREIGN PATENT DOCUMENTS

EP        0 692 357        1/1996

(Continued)

OTHER PUBLICATIONS

An International Search Report that is dated Aug. 14, 2003 and that was issued by the European Patent Office in connection with EP 01965576.0, which is a foreign counterpart to the subject application.

(Continued)

Primary Examiner—Allan R. Kuhns
(74) Attorney, Agent, or Firm—Edwards Angell Palmer & Dodge LLP; David G. Conlin; Mark D. Russett

(57) ABSTRACT

Biodegradable molded articles; a process for producing the same: and compositions for foam molding packed in a packaging film bag to be used in the production. A bowl-type container(10a), which is one of the biodegradable molded articles as described above, consists of a bowl body(11a) comprising starch as the main component and a coating film(12) having at least hydrophobic properties and comprising a biodegradable plastic as the main component which is bonded to the surface of the bowl body(11a). This bowl body(11a) is formed by steam-foaming molding a material to be molded which is in the form of a slurry or a dough containing starch and water. The coating film(12) is closely bonded to the surface of the bowl body(11a) either directly or via an adhesive layer. Compositions for foam molding packed in such packaging film bags can be easily stored and molded.

11 Claims, 23 Drawing Sheets

U.S. PATENT DOCUMENTS

| | | | | |
|---|---|---|---|---|
| 5,413,855 | A | * | 5/1995 | Kolaska et al. .......... 428/320.2 |
| 5,591,491 | A | | 1/1997 | Ando et al. ................. 427/544 |
| 5,634,946 | A | * | 6/1997 | Slepian ...................... 128/898 |
| 5,639,518 | A | * | 6/1997 | Ando et al. ................. 427/544 |
| 5,797,984 | A | * | 8/1998 | Billmers et al. ............... 127/33 |
| 6,040,063 | A | * | 3/2000 | Doane et al. ................ 428/532 |
| 6,106,753 | A | * | 8/2000 | Redd et al. ................. 264/112 |
| 6,153,306 | A | * | 11/2000 | Selin et al. ................. 428/481 |

FOREIGN PATENT DOCUMENTS

| | | |
|---|---|---|
| JP | 62-122716 | 6/1987 |
| JP | 63-054217 | 3/1988 |
| JP | 05-278738 | 10/1993 |
| JP | 05-294332 | 11/1993 |
| JP | 05-320401 | 12/1993 |
| JP | 06-125718 | 5/1994 |
| JP | 06-79509 | 11/1994 |
| JP | 6-81729 | 11/1994 |
| JP | 06-339936 | 12/1994 |
| JP | 07-001477 | 1/1995 |
| JP | 07-001479 | 1/1995 |
| JP | 07-010148 | 1/1995 |
| JP | 07-097545 | 4/1995 |
| JP | 07-224173 | 8/1995 |
| JP | 8-500547 | 1/1996 |
| JP | 10-119949 | 5/1998 |
| JP | 11-171238 | 6/1999 |
| JP | 11-512467 | 10/1999 |
| JP | 2000-033976 | 2/2000 |
| JP | 2000-142783 | 5/2000 |
| KR | 10-0208971 | 7/1999 |
| WO | WO 94/05492 | 3/1994 |

OTHER PUBLICATIONS

Office Action dated Oct. 13, 2005 in Korean Patent Application 10-2003-7003703.

Office Action mailed Aug. 22, 2006 by the Japanese Patent Office in connection with Japanese Patent Application No. 2002-526583.

The International Search Report issued by the Japanese Patent Office in corresponding application No. PCT/JP01/07903 together with a *copy* of the first page of the English language translation thereof, 2001.

* cited by examiner

F I G. 1 4
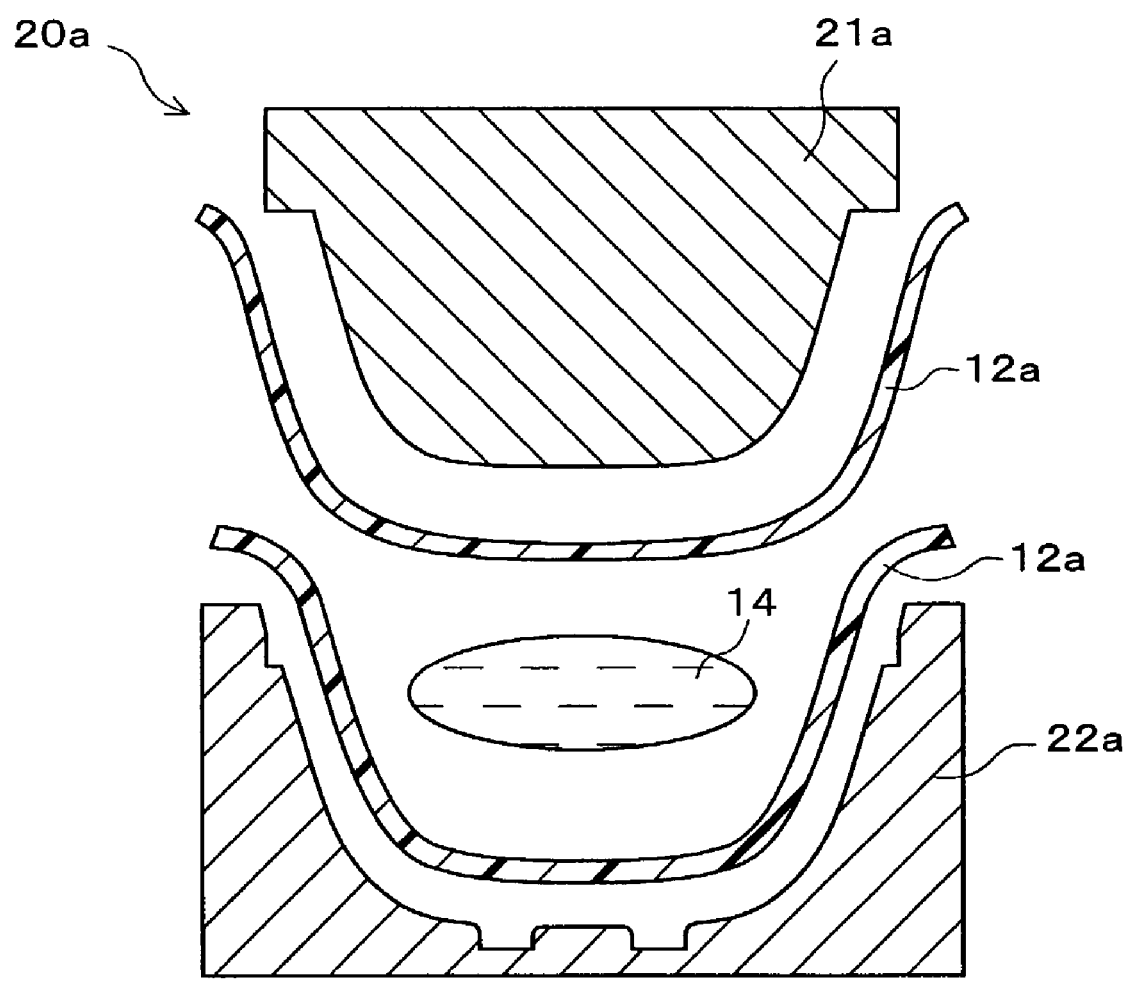

F I G. 1 8
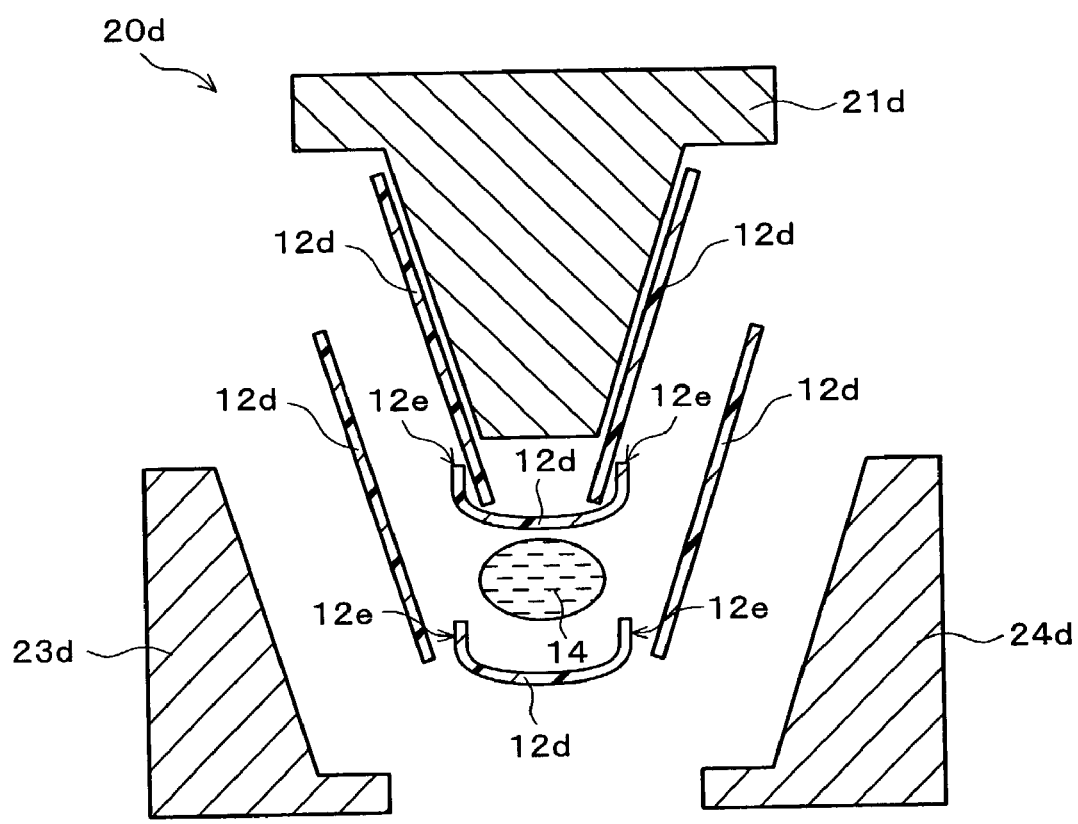

F I G. 1 9
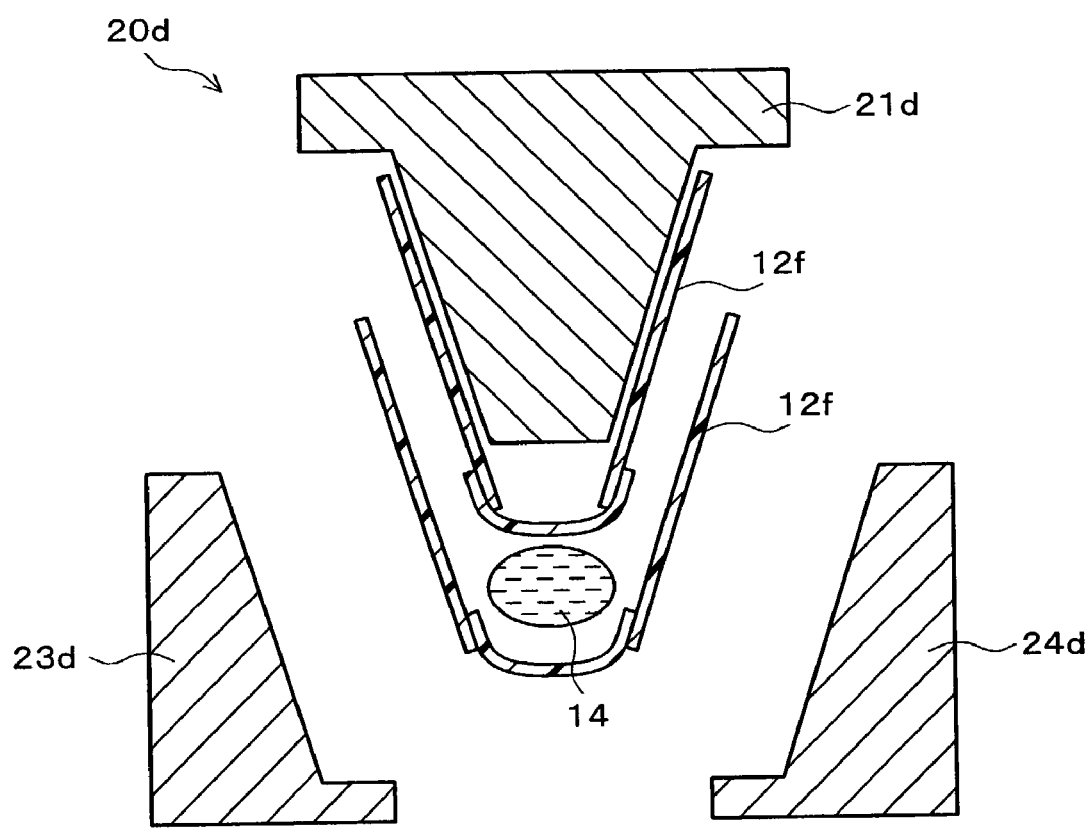

F I G. 2 3
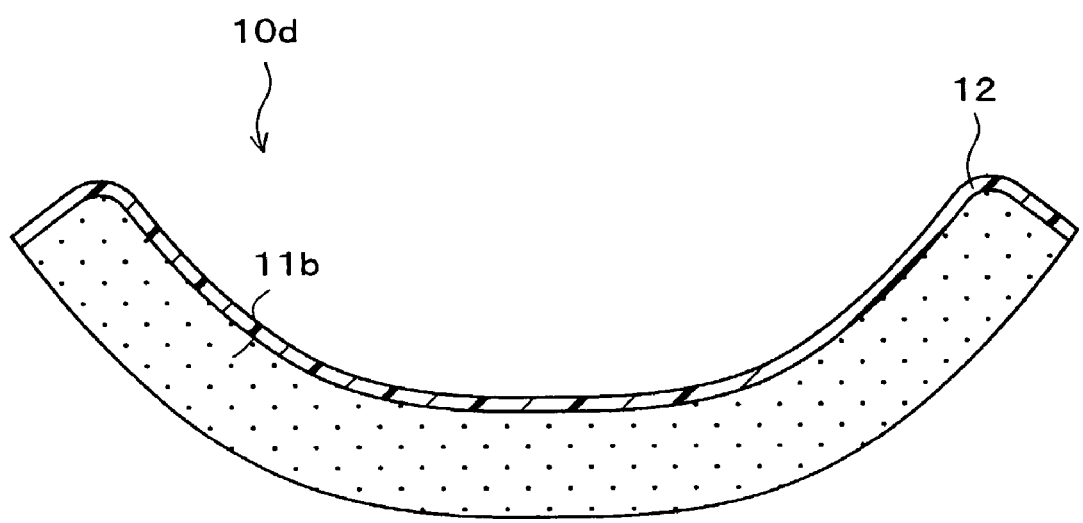

BIODEGRADABLE MOLDED ARTICLE, MANUFACTURING METHOD THEREOF, AND COMPOSITION FOR EXPANSION MOLDING

TECHNICAL FIELD

The present invention relates to a biodegradable expanded molded article mainly derived from starch, a method of manufacturing the same, and a composition for expansion molding suitable for manufacturing the expanded molded article, and particularly to a biodegradable molded article that can suitably be used for disposable expanded molded articles that are disposed after the use as a food bowl, a molding buffer material, GES, a wrapping tray, etc., a method of manufacturing the same, and a composition for expansion molding that can suitably be used for the manufacturing of the biodegradable molded article.

BACKGROUND ART

Conventionally, plastic molded article and a paper/pulp molded article are the mainstream of a disposable molded article that is disposed after the use. This is because in most cases, raw materials of the disposable molded article should be durable and strong and at the same time readily formable.

However, the plastic molded article and the paper/pulp molded article both have difficulties to be used as the disposable molded article, as shown below.

First, when incinerated, the plastic molded article damages an incinerator because of the generation of extremely high heat, or additionally produces evironmental contaminants such as dioxin. Also, when the plastic molded article is buried for reclamation, it is impossible to bury the molded article where once the same is buried, since plastics almost never be decomposed naturally. Moreover, due to a recent increase of the amount of waste, it has become difficult to secure new dumping sites year after year. Furthermore, continuous environmental pollution for a long period of time could be caused, since the plastic molded article cannot be decomposed easily.

Also, reserves of fossil fuels such as oil, which are raw materials of plastics, are decreasing year after year, so the plastic molded article could become more expensive in the future.

Meanwhile, the paper/pulp molded article is superior to the plastic molded article in that it can easily be disposed of by burning and can be decompressed naturally. However, trees, of which paper and pulps are made, grow slowly and thus the mass consumption of paper and pulps rapidly reduce forests. The reduction of forest resources brings about not only heavy destruction of an environment of the area but also a great impairment of an ability of forests to absorb $CO_2$ and a spur for global warming because of the increase of $CO_2$, from a broad perspective.

So to solve the aforementioned problems particularly from an environmental perspective, the disposition method of the molded article has recently shifted from dumping to recycling.

However, as for the recycling, for instance, when a food container, one of the main use of the disposable expansion molded articles, is recycled, residues in the bowl such as remaining foods and seasonings have to be removed. This is required to avoid a contamination of impurities in the material to be recycled.

Usually the removal of the residues is washed in water, so this induces another pollution such as an increase of the amount of polluted water and subsequent water pollution in rivers and the sea. Also, the recycling requires high cost, because the removal of the residues itself lowers the efficiency as it needs a lot of time and effort, and the system of recycling has not been really socially established at the moment.

So, what has become a focus of attention is a recently-developed biodegradation disposal method for the molded article by using microbe, as a new disposal method of the molded article being different from the recycling. This disposal method can avoid the problems above, since in this case the molded article is mainly made of various biodegradable plastics or natural high polymers such as starch.

Especially, in the biodegradation disposal method above, a method to utilize the natural high polymers such as starch and protein particularly draws attentions in terms of its practicality. This is because the various biodegradable plastics have a problem that despite having a fine quality almost comparable to conventional plastics (non-degradable or degradation-retardant), practically they cannot be decomposed quickly enough.

For instance, when the thickness of a molded article made of the biodegradable plastic is heavy, it takes very long time until the molded article is completely decomposed, so practically it is not possible to produce a molded article with enough volume. Also, when the molded article made of the biodegradable plastic is used practically as a disposable food bowl, composting the molded article together with food residues is the least harmful disposal method for the environment. However, actually it is difficult to compost them together since the biodegradable plastic above is only decomposed much slower than the food residues. Furthermore, it is also difficult to crush the molded article to hasten the decomposition of the biodegradable plastic, because normally the molded article cannot be crushed easily when it has a certain thickness and strength. Thus it is almost impossible to compost the molded article made of the biodegradable plastic.

Whereas starch and protein, etc. are positively evaluated as the materials because of advantages such as:
- with fine biodegradability, decomposition is quite easy even if the volume is large;
- the resource can be acquired easily on account of an availability of a vegetable starch that is mass-produced by agriculture; and
- a molded article with adequate thickness and thermal insulation can be acquired, since the molded article is usually an expanded molded article.

(1) Japanese Laid-Open Patent Application No. 5-320401/1993 (Tokukaihei 5-320401; published on Dec. 3, 1993), (2) Japanese Laid-Open Patent Application No. 7-224173/1995 (Tokukaihei 7-224173; published on Aug. 22, 1995), (3) Japanese Laid-Open Patent Application No. 7-10148/1995 (Tokukaihei 7-10148; published on Jan. 13, 1995), (4) Japanese Laid-Open Patent Application No. 2000-142783 (Tokukai 2000-142783; published on May 23, 2000), and (5) Japanese Laid-Open Patent Application No. 7-97545/1995 (Tokukaihei 7-97545; published on Apr. 11, 1995) disclose biodegradation disposal technologies using starch, protein, etc.

First, a molded article derived from the technology (1) or (2) have the advantages that it has better decomposability than a molded article made of the biodegradable plastic and also superior to those derived from paper/pulps in its diversity of the molded shape, since natural starch is mainly used as the material. However, at the same time the molded article derived from the technology (1) or (2) has the disadvantages that it can be used only for limited purposes and is required to barrier moisture, due to its poor water and humidity resistance.

Second, a molded article derived from the technology (3) or (4) is mainly made of starch or similar polysaccharide, and to enhance its water resistance, a natural resin (dammer resin, shellac resin, etc.) is painted on the surface of the molded article to form a water-resistant coating. However, the surface of the molded article (including expanded molded article) mainly made of starch cannot be completely smoothed, and generation of small irregularities cannot be avoided. Thus small pinholes are likely to be formed on the surface in accordance with the irregularities if the resin is simply painted, so it could be possible to render the molded article water repellent but difficult to make the same complete water proof. Particularly, if the molded article is required to be moisture-resistant, moisture is likely to be absorbed from the pinholes on the water-resistant coating, and the molded article becomes apt to be disfigured.

Furthermore, the dammer resin, the shellac resin, etc., must be dissolved in an organic solvent such as alcohol, etc., when applied to the surface. So this introduces problems in terms of a manufacturing facility. For instance, when the organic solvent is removed after the paint, large-scale equipment is required to prevent diffusion of the organic solvent in the air that causes air and environmental pollution.

Now, on a surface of a molded article derived from the technology (5) that is made of, as in the cases of the molded articles of the technologies (3) and (4), poorly water-resistant biodegradable material such as starch, a biodegradable coating agent composed of aliphatic polyester being dissolved in halogenated hydrocarbon is painted. In this case, using a dip method (dip coating method) for actual coating of the surface, an adequately water-resistant coating can be formed even on a complicatedly-shaped molded article.

However, in this method it is required to remove the halogenated hydrocarbon used to dissolve the coating agent, and as in the case of the technologies (3) and (4), problems such as a requirement of equipment to prevent diffusion of halogated hydrocarbon arise. Many halogenated hydrocarbons are often harmful for a human body and the environment, and moreover the halogated hydrocarbon that is concretely mentioned in the technology (5) contains CFC so that should be released to the air as little as possible. On this account, a large-scale hermetic room and a reclaiming device are required as the equipment above.

In addition to the technologies introduced above, there is a technology in which wax or hydrophobic protein, prepared as a solution to be applied, is painted on the surface of the molded article. Generally speaking, it is difficult to paint a water-resistant coating on the surface of the molded article evenly and entirely, while the coating on a flat molded article such as a flat plate is relatively easy. However, small irregularities are likely to be formed on the surface of the molded article mainly made of starch as described above and obstruct the formation of an uniform film, and furthermore, the molded article or a painting device has to be rotated when the molded article is substantially circular in cross section, for instance formed like a cup or a bowl. Therefore the painting becomes more difficult.

Besides, even if the coating agent can be painted evenly and entirely by using the dip method, the painted agent runs down before it solidifies and becomes the coating, and an unevenness is likely to show up.

The wax has a problem of poor heat resistance due to its relatively low melting point. In the meantime, although the hydrophobic protein has better heat resistance and does not need the organic solvent, the molded article absorbs water and is softened/disshaped in the painting process owing to a frequent use of aqueous solvents.

So, a technology that has already been proposed is to laminate a water-resistant coating instead of painting thereof. More specifically, such examples include (6) Japanese Laid-Open Patent Application No. 11-171238/1999 (Tokukaihei 11-171238; published on Jun. 29, 1999), (7) Japanese Laid-Open Patent Application No. 5-278738/1993 (Tokukaihei 5-278738; published on Oct. 26, 1993), (8) Japanese Laid-Open Patent Application No. 5-294332/1993 (Tokukaihei 5-294332; published on Nov. 9, 1993).

A container of the technology (6), made by a pulp molding method instead of molding starch, is covered by a water-impermeable or non-absorbing protective coat. This method has the advantage that conventional plastic coating method can be applied almost without any change. However, at the same time the method has problems such as:

the biodegradation of the pulp-molding takes place slowly since it is made of fiber so that the molded article cannot be disposed together with remaining foods, etc.; and only limited types of the molded article can be produced because it is difficult to make the molded article thicker, and also the molded article is not suitable for a deep drawing.

Meanwhile, a thin film made of biodegradable plastic is formed on a surface of a biodegradable container of the technologies (7) or (8) made of either one of natural polysaccharide or protein, or either of the two materials that is chemically modified but still biodegradable.

In this technology, while the biodegradable plastic is provided as the thin water-resistant coating, the container itself is made of starch, protein, etc. with enough thickness. On this account, the container is sufficiently water-resistant as well as biodegradable. Thus it can be said that this technology is particularly promising among the disposal technologies by dint of biodegradation using starch, protein, etc.

However, the technology (7) is an arrangement that the biodegradable plastic thin film simply covers the main body of the biodegradable container, and a concrete arrangement of the biodegradable container is hardly mentioned.

For instance, when the main body of the biodegradable container is mainly made of starch or, the main body's strength should be cared of, but the technology (7) does not mention the strength at all. Also, the technology (7) does not explain how the biodegradable plastic thin film is actually formed, such as by painting, by attaching already-formed film, etc., for instance.

Moreover, the technology (7) does not stipulate the coating state of the biodegradable plastic thin film with respect to the main body of the biodegradable container at all. The biodegradable plastic thin film covers the main body of the biodegradable container mainly made of polysaccharide or protein, to improve the main body's water resistance. But the technology (7) does not mention anything except that the main body is covered, so there is no statement about how it is covered.

Even if the biodegradable container is made as disposable one, still the container should have a stability and durability as an one-way container. So the biodegradable plastic thin film should not fall off from the main body of the biodegradable container, and thus the state of coating on the main body of the container is an important factor, but no mention with respect to this can be found in (7).

Furthermore, as already described, it is difficult to use biodegradable plastics as a thick molded article due to its slow biodegradation, so the speed of the biodegradation also greatly depends on not only the thickness of the molded article but also a total amount of biodegradable plastics contained in the molded article. In relation to this, the technology (7) only describes that an effectiveness of the biodegradation is improved if the main body of the biodegradable container is expanded, and there are no comments on a relationship between a degree of the expansion and the biodegradation, and a balance between the biodegradation of the biodegradable plastic and that of the main body of the biodegradable container. As a result, it is not possible to manage the biodegradation of the whole container favorably.

In the meantime, the technology (8) can be assumed to correspond to one of the manufacturing technologies of the biodegradable container disclosed by (7). In this technology, a thermoplastic is dissolved in a solvent and painted on the surface of the main body of the biodegradable container. Then after the solvent is dried and volatilized, another coating thin film made of thermoplastic is laminated and bonded by thermocompression. That is to say, the technology (8) discloses that thermoplastic is used as an adhesive to bond the coating thin film (equivalent to the biodegradable plastic thin film) securely.

Now, as described in relation to technologies (3) to (5), when the thermoplastic dissolved in the solvent is used, problems such as a requirement of equipment to prevent diffusion of the solvent arise. Moreover, an embodiment of (8) uses chloroform as the solvent and this substance should be scattered in the air as little as possible, thus as in the case of (5), a large-scale hermetic room and reclaiming device are required as the equipment above.

Also, the manufacturing technology of (8) acquires the main body of the biodegradable container by press-molding a sheet made of polysaccharide or protein that is formed in advance in a metal mold. Thus it is impossible to mold molded articles such as a container with deep drawing shape like a cup, molded articles having irregular thickness like a food tray with partitions and a wrapping tray, and molded articles having complex shape like cushioning material for wrapping.

The present invention takes the problems above into account, and hence the object is to provide:
  a biodegradable molding mainly made of starch that has satisfactory strength regardless of a degree of complexity of the shape, at least satisfactory water resistance, and high biodegradation;
  a manufacturing technology of the biodegradable molding; and
  a composition for expansion molding preferably used for manufacturing the biodegradable molded article.

DISCLOSURE OF THE INVENTION

The inventors of the present invention have diligently worked on the problems raised above, and as a result, the inventors of the present invention have autonomously found that a biodegradable molded article with very high quality can be produced by:
  choosing starch as a main material and preparing a slurry or dough molding material by adding at least water to the starch;
  paying attention to stability of a biodegradable expanded molded article made of the molding material, after a coating film mainly made of biodegradable plastic is attached on the molded article; and
  stipulating either an amount of a biodegradable plastic of the coating film with respect to the biodegradable expanded molded article mainly made of starch or a ratio of a gas phase contained in the biodegradable expanded molded article, which has led to the completion of the invention.

That is to say, to solve the problems above, the biodegradable molded article of the present invention has at least hydrophobicity, and includes:
  a biodegradable expanded molded article molded in a specified shape; and
  a coating film mainly made of a biodegradable plastic and attached on a surface of the biodegradable expanded molded article.

The biodegradable molded article is characterized in that the biodegradable expanded molded article is mainly made of starch or a derivative thereof and molded through steam expansion of a slurry or dough molding material prepared by adding water to the starch or the derivative thereof.

According to the arrangement above, producing the slurry or dough molding material mainly made of starch and steam-expanding this material allow manufacture of a highly complicatedly shaped molded article easily, and make the molded article have improved strength compared with conventional molded article made of starch, since the resultant expanded molded article includes a certain amount of water. Furthermore, inasmuch as a biodegradable coating film is attached on the expanded molded article, it becomes possible to apply the coating film to the molded article in accordance with the shape thereof easily and certainly, by, for instance, thermocompression bonding using a mold identically shaped as a mold used when the expanded molded article is molded, or simultaneously attaching the coating film at the moment of expansion molding.

The coating film is mainly made of a biodegradable plastic having similar quality to common plastics and has at least hydrophobicity. Thus the expanded molded article mainly made of starch can be water resistant simply by attaching the coating film. Moreover, extrinsic functions such as gas impermeability can be added by choosing appropriate types of biodegradable plastics and so on.

The biodegradable expanded molded article preferably accounts for not less than 60 weight % of the total weight of the biodegradable molded article in accordance with the present invention.

According to the arrangement above, inasmuch as the weight of the slowly-biodegraded biodegradable plastic is less than 40 weight % of the total weight, biodegradability of the biodegradable plastics and that of the expanded molded article are well-balanced, so biodegradability of the biodegradable molded article is further improved. Especially, the biodegradable expanded molded article being expanded has good biodegradability, and the molded article is plentifully contained comparing to the amount of the contained coated film. Therefore, the biodegradable molded article on the whole can deliver very good biodegradability.

The biodegradable molded article of the present invention is preferably arranged so that a ratio of a volume of a gas phase included in the biodegradable expanded molded article is more than 30 volume % of the total volume.

According to the arrangement above, the surface area of the biodegradable expanded molded article becomes larger and microbes biodegrading the biodegradable expanded molded article can be capture easily. Hence the biodegradable expanded molded article becomes to be biodegraded easily, and as a result, biodegradability of the biodegradable molded article can be further improved.

The biodegradable molded article of the present invention is preferably arranged so that a content of water in the molding material is between not less than 20 weight % and not more than 70 weight %, assuming that the total weight is 100 weight %.

According to the arrangement above, the expanded molded article to be acquired has the water content (more specifically, within a range between not less than 3 weight % and not more than 20 weight %) preferable for possessing enough strength, since the molding material includes an adequate amount of water. As a result, it is possible to manufacture the biodegradable molded article without adjusting the water ratio more than once, only by either attaching the coating film in a succeeding process after the process of steam expansion molding or attaching the coating film simultaneously with conducting the steam expansion.

The biodegradable molded article of the present invention is preferably arranged so that the coating film is substantially adhered with no gap to the surface of the biodegradable molded article through compress-bonding.

According to the arrangement above, the coating film is not easily peeled off from the surface of the expanded molded article, since the coating film is substantially adhered to the surface of the biodegradable expanded molded article so that the coating film is directly attached to the same. This results in the coating film being attached on the expanded molded article with more certainty and biodegradability of the resultant biodegradable molded article being ensured.

The biodegradable molded article of the present invention may be arranged so that the coating film is attached on the surface of the biodegradable expanded molded article by using a biodegradable adhesive.

According to the arrangement above, this results in the coating film being attached on the expanded molded article with more certainty and biodegradability of the resultant biodegradable molded article being ensured.

The biodegradable molded article of the present invention is preferably arranged so that a final water content of the biodegradable expanded molded article is between not less than 3 weight % and not more than 20 weight %.

According to the arrangement above, an adequate amount of water contained in the expanded molded article enables the same to have enough strength. This results in further improving the strength and durability of the resultant biodegradable molded article.

The biodegradable molded article of the present invention is preferably arranged so that the softening point of the coating film is preferably not less than 130° C. and at the same time the melting point is not less than 170° C.

According to the arrangement above, deformation and melting of the biodegradable molded article because of heat can be avoided with more certainty.

To solve the problems above, a manufacturing method of a biodegradable molded article includes the steps of:
  molding a biodegradable expanded molded article mainly made of starch or a derivative thereof into a specific shape through steam expansion of a slurry or dough molding material prepared by adding water to the starch or the derivative thereof;
  attaching a coating film mainly made of a biodegradable plastic and having at least hydrophobicity on a surface of the biodegradable expanded molded article by compress-bonding the film after heating and softening the film.

According to the method above, the coating film having biodegradability is attached by heating and compress-bonding the same, after the slurry or dough molding material mainly made of starch is molded through expansion molding. Thus it is possible to provide the expanded molded article containing a certain amount of water required for obtaining enough strength, at the moment of molding, and also to attach the coating film safely to the main body (expanded molded article) having a stable water content. This makes it possible to produce the biodegradable molded article far superior to conventional ones by a simple method.

The manufacturing method of the biodegradable molded article of the present invention may be arranged so that a specified mold is used in the molding step and also a attaching mold whose shape is substantially identical with that of the mold is used in the attaching step.

According to the method above, the attaching mold is easily produced by copying the shape of the mold produced in advance, since the mold of the expanded molded article and the attaching mold of the coating film substantially have the same shape. Moreover, since the coating film is attached by using the mold substantially identically shaped as the mold, the coating film can be certainly and easily attached to even a complicatedly shaped expanded molded article. Consequently, it is possible to manufacture the biodegradable molded article in a simpler process.

The manufacturing method of the biodegradable molded article of the present invention may be arranged so that in the attaching step, an adhesive film made of biodegradable plastics, having a low melting point and can be melted at a temperature lower than the melting point of the coating film, is provided between the coating film and the biodegradable expanded molded article, before the coating film is attached.

According to the method above, only by inserting an adhesive that is film-shaped in advance between the coating film and the expanded molded article, the coating film is softened and compress-bonded so that the adhesive layer is fused, so the coating film is certainly attached to the surface of the expanded molded article. Consequently, the manufacturing method of the biodegradable molded article can be further simplified, since a process to apply an adhesive to the surface of the expanded molded article becomes unnecesary.

The manufacturing method of the biodegradable molded article of the present invention may be arranged so that the coating film is shaped in advance substantially identically with an outside shape of the resultant biodegradable molded article.

According to the method above, the coating film is not ripped and a biodegradable molded article with a deep draw depth can be successfully manufactured even if the coating film cannot be stretched extensively at the moment of the molding, since the coating film is shaped in advance substantially identically with an outside shape of the resultant biodegradable molded article. This results in certainly and efficiently coating the expanded molded article by the coating film.

To solve the problems above, another manufacturing method of the biodegradable molded article in accordance with the present invention includes the step of:
  simultaneously molding a biodegradable expanded molded article and attaching a coating film, the molding being carried out by heating a slurry or dough molding material and the coating film in a mold and by steam-expanding the biodegradable expanded molded article into a specific shape, and the attaching being carried out by compress-bonding the coating film through heating and thereby softening the film so that the coating film is attached on a surface of the biodegradable expanded molded article in the end.

According to the method above, expansion molding of a molding material and attaching a coating film are simultaneously done in a single process, and moreover, the resultant biodegradable molded article includes the coating film compress-bonded so as to directly attached to the surface of the expanded molded article. This makes it possible to produce the biodegradable molded article far superior to conventional ones by a simpler method, and also further stabilize a attaching condition of the coating film of the resultant biodegradable molded article.

In another manufacturing method of the biodegradable molded article of the present invention, the biodegradable molded article, in which the entire surface thereof is coated by the coating film, can be acquired by heating the molding material after sandwiching the same by the coating film. Another manufacturing method of the biodegradable molded article of the present invention is preferably arranged so that the molding material is directly heated by using high frequency dielectric heating in the process above.

According to the method above, pressure to press the coating film against the mold is generated strongly as well as uniformly, since the molding material itself generates heat in a short period of time in the early stage of the process of the expansion molding, and the whole molded article expands altogether. As a result, this makes it possible to acquire the biodegradable molded article in which the biodegradable expanded molded article and the coating film are adhered well.

Also, According to the method above, an adequately heated molding material can be bonded to the molding material even if a temperature of the mold is adjusted to be relatively low, i.e. less than 150° C., since the molding material is directly heated instead of heated through the mold. So this makes it possible to use a coating film having a melting point at a temperature not more than 150° C., and widen the choice of the coating film.

Another manufacturing method of the biodegradable molded article of the present invention may be arranged so that the coating film is shaped in advance substantially identically with an outside shape of the resultant biodegradable molded article.

According to the method above, the coating film is not ripped and a biodegradable molded article with a deep draw depth can be successfully manufactured even if the coating film cannot be stretched extensively at the moment of the molding, since the coating film is shaped in advance substantially identically with an outside shape of the resultant biodegradable molded article. This results in certainly and efficiently coating the expanded molded article by the coating film.

Another manufacturing method of the biodegradable molded article of the present invention may be arranged so that the coating film is cut as a film part shaped substantially identically with an outside shape of the resultant biodegradable molded article.

According the method above, the coating film is not ripped and a biodegradable molded article with a deep draw depth can be successfully manufactured even if the coating film is made of a hardly extensive biodegradable plastic, since the coating film before the attaching is shaped substantially identically with an outside shape of the resultant biodegradable molded article in advance. This results in certainly and efficiently coating the expanded molded article by the coating film.

Another manufacturing method of the biodegradable molded article of the present invention may be arranged so that the coating film is further transformed to be a bag shape capable of storing the molding material therein.

According to the method above, the molding material is substantially wrapped by the coating film transformed to be a bag shape. So it becomes possible to store the molding material for a while by distributing bulk of the molding material to each bag film in advance, and furthermore, preparation of the molding is completed only by putting the wrapped material in the mold, when the biodegradable molded article is manufactured. This makes it possible to further simplify the manufacturing process.

To solve the problems above, a composition for expansion molding of the present invention is characterized in that:

a slurry or dough molding material mainly made of starch or a derivative thereof and prepared by adding water to the starch or the derivative thereof is stored in a bag film formed as a substantially bag shape; and the bag film is made from a coating film, mainly made of a biodegradable plastic and having at least hydrophobicity.

According to the arrangement above, the molding material for expansion molding is stored in and substantially wrapped by the bag film. So it is possible to store a large amount of the molding material that is distributed to each bag shaped coating film for a while, and at the same time the biodegradable molded article on which the coating film mainly made of biodegradable plastics is attached can easily be manufactured by simply putting the molding material in the mold and steam-expanding the same. So the biodegradable molded article can be manufactured in an easy and simple process.

For a fuller understanding of the nature of the invention, reference should be made to the ensuing detailed description taken in conjunction with the accompanying drawing.

BRIEF DESCRIPTION OF THE DRAWINGS

FIG. 14 is an explanatory view describing a case that a manufacturing method 2 is used, in the simultaneous attaching method for manufacturing the biodegradable molded article shown in FIG. 1(a).

FIG. 18 is an explanatory view describing a case that a manufacturing method 5 is used, in the simultaneous attaching method for manufacturing the biodegradable molded article shown in FIG. 3(a) is used.

FIG. 19 is an explanatory view describing a case that a manufacturing method 6 is used, in the simultaneous attaching method for manufacturing the biodegradable molded article shown in FIG. 3(a) is used.

FIG. 23 is a schematic cross-sectional view showing a shape of a plate-shaped container acquired by the manufacturing method 1A as another example of the biodegradable molded article in accordance with an embodiment of the present invention.

BEST MODES FOR CARRYING OUT THE INVENTION

Figure 1:
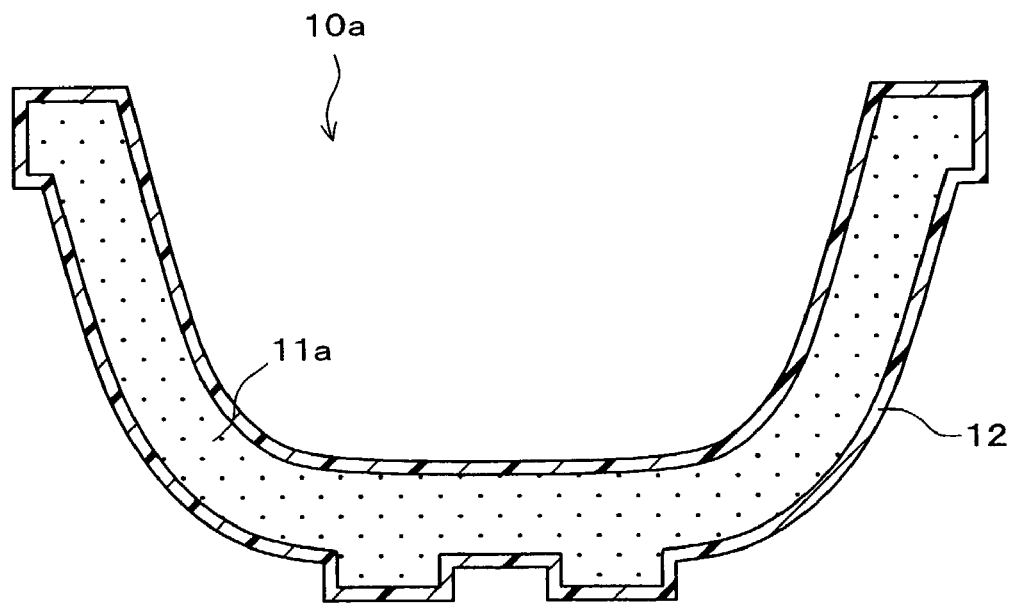
FIGS. 1(a) and (b) are schematic section views showing a shape of a bowl-shaped container as an example of a biodegradable molded article of an embodiment in accordance with the present invention.
Figure 1:
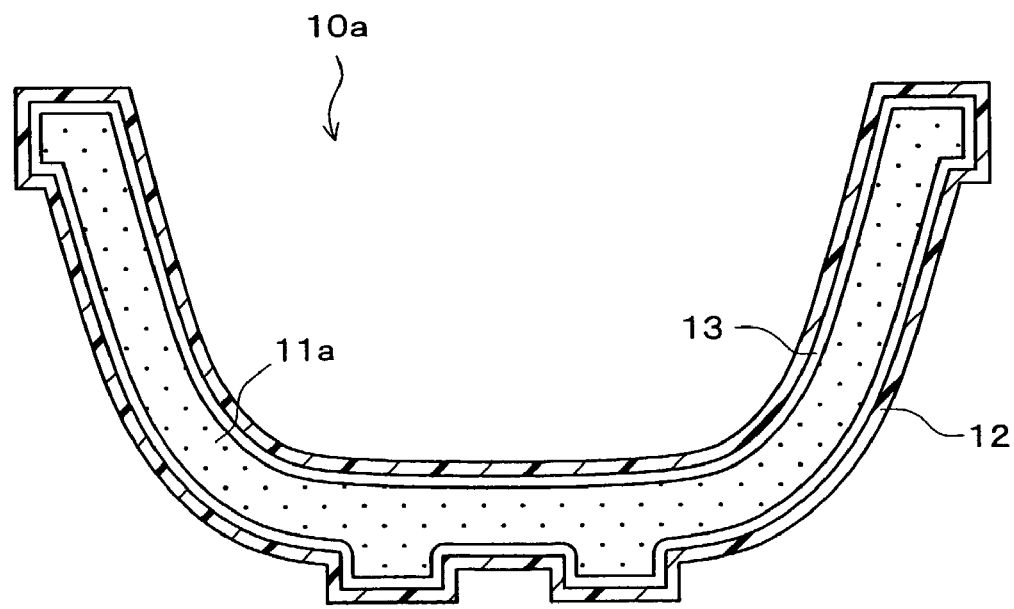
Figure 2:
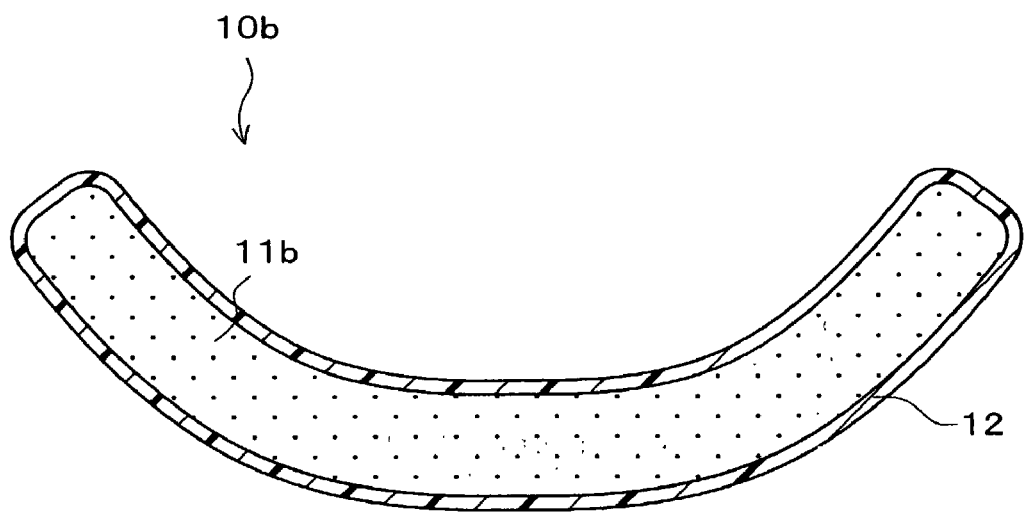
FIGS. 2(a) and (b) are schematic cross-sectional views showing a shape of a plate-shaped container as an example of a biodegradable molded article of an embodiment in accordance with the present invention.
Figure 2:
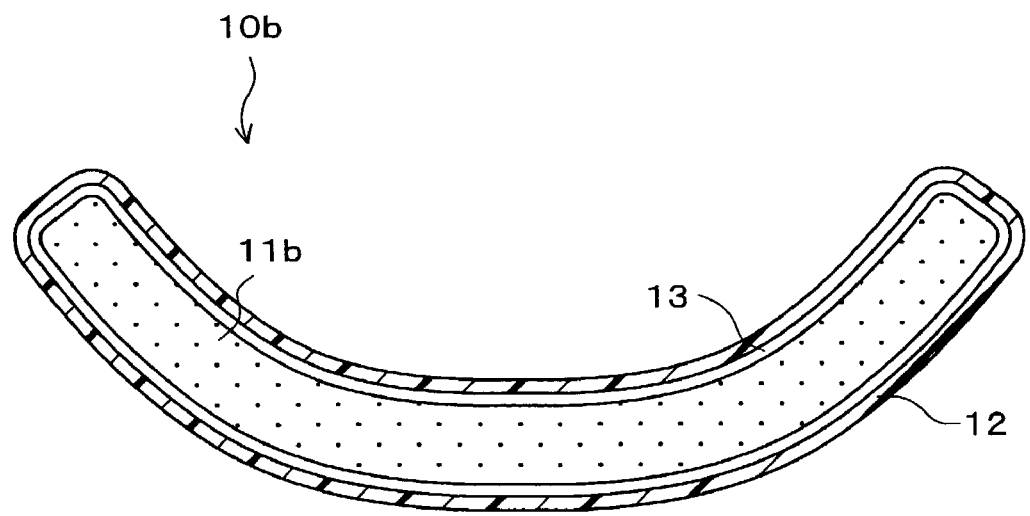

An embodiment of the present invention is described below in accordance with FIGS. 1 to 23. By the way, the invention is not limited to this embodiment.

Key signs in the figures are as below.

10a; bowl-shaped container (biodegradable molded article)
10b; plate-shaped container (biodegradable molded article)
10c; cup-shaped container (biodegradable molded article)
11a; main body of the container (biodegradable expanded molded article)
11b; main body of the container (biodegradable expanded molded article)
11c; main body of the container (biodegradable expanded molded article)
12; coating film
12b; bag film
12c; molding bag film (bag film)
12g; outline bag film (bag film)
13; adhesive layer
13a; adhesive film
14; molding materials
15; boundary surface
20a; metal mold (mold)
20b; metal mold (mold)
20c; metal mold (mold)
20d; metal mold (mold)
30; mold (attaching mold)
40b; composition for molding (composition for expansion molding)
40c; composition for molding (composition for expansion molding)
40g; composition for molding (composition for expansion molding)

A biodegradable molded article in accordance with the present invention includes a biodegradable expanded molded article molded in a specified shape and a coating film attached on the surface thereof, wherein the coating film is mainly made of biodegradable plastic and has at least hydrophobicity. The biodegradable expanded molded article is made of starch or a derivative thereof as the main material and molded by conducting steam expansion to slurry or dough molding material which is made by adding water to the main material.

Also, in the biodegradable molded article above, a preferred arrangement is either:
an amount of biodegradable plastics such as the coating film is stipulated to be steady with respect to the biodegradable expanded molded article; or a ratio of the amount of gas phase included in the biodegradable expanded molded article is stipulated as a certain amount, and moreover, the coating film above preferably coats the surface of the biodegradable expanded molded article in the state that the coating film is substantially adhered to the surface. In this case, an adhesive layer may be inserted between these two, despite it is preferred if the coating film is directly adhered.

By the way, in the description below, the term "the biodegradable expanded molded article" may be shortened as "expanded molded article" without notice. Also, the "slurry" state as above indicates a state that starch has enough fluidness when at least water is added. Thus the starch only needs to be suspended and does not have to be dissolved in water. Meanwhile, the "dough" state as above has lower fluidness compared to the slurry state, and the material is half solidified.

The biodegradable molded article in accordance with the present invention is described. More specifically, if a bowl-shaped container is taken as a example of the biodegradable molded article, as FIG. 1(a) shows, the bowl-shaped container 10a includes a main body 11a of the container which is the biodegradable expanded molded article and a coating film 12 that is directly adhered substantially fast to the main body 11a to cover the surface thereof. Also, as FIG. 1(b) shows, the bowl-shaped container 10a may include an adhesive layer 13 inserted between the coating film 12 and the main body 11a, to attach the coating film 12 to the surface of the main body 11a. By the way, as described later, the surface of the main body 11a is not necessarily to be completely covered by the coating film 12, so may be partly covered by the same.

Correspondingly, if a plate-shaped container is taken as another example of the biodegradable molded article in accordance with the present invention, the plate-shaped container 10b is also arranged either to include the main body 11b and the coating film 12 as FIG. 2(a) shows, or additionally to include the adhesive layer 13 between the main body 11b and the coating film 12 as FIG. 2(b) shows.

Moreover, if a cup-shaped container is taken as another example of the biodegradable molded article, the cup-shaped container 10c is also arranged either to include the main body 11c and the coating film 12 as FIG. 3(a) shows, or additionally to include the adhesive layer 13 between the main body 11c and the coating film 12 as FIG. 3(B) shows. By the way, in FIGS. 3(a) and (b), the upper figure is a vertical cross-sectional view of the cup-shaped container 10c and the lower figure is a plan view (a figure looking down at the cup-shaped container 10c from above) in relation to the upper figure.

The biodegradable expanded molded article, of which the main body (the main bodies 11a, 11b, and 11c) of the biodegradable molded article in accordance with the present invention is made, is made from a molding material whose main ingredient is starch or a derivative thereof being molded through the steam expansion.

Starch used as the main material of the molding material is not limited to any particular type. For instance, starch easily acquired from agricultural products produced worldwide as major cereals, such as potato, corn, tapioca, rice, wheat, sweet potato, etc. can be properly used. The starch above may be either produced from a particular agricultural product or a mixture of starch produced from more than one agricultural product.

Also, the derivative of starch is starch that chemically modified but still biodegradable, more specifically, such as α-starch, cross linked starch, and denatured starch, etc. Moreover, a mixture of the unmodified starch or the derivative of starch can be used as well. Thus in a broad sense, the starch in the present invention includes the unmodified starch (starch in a narrow sense), the derivative of starch, and the mixture of these two. So, in the description below, "starch" indicates the starch in a broad sense, unless particularly noticed.

Figure 4:
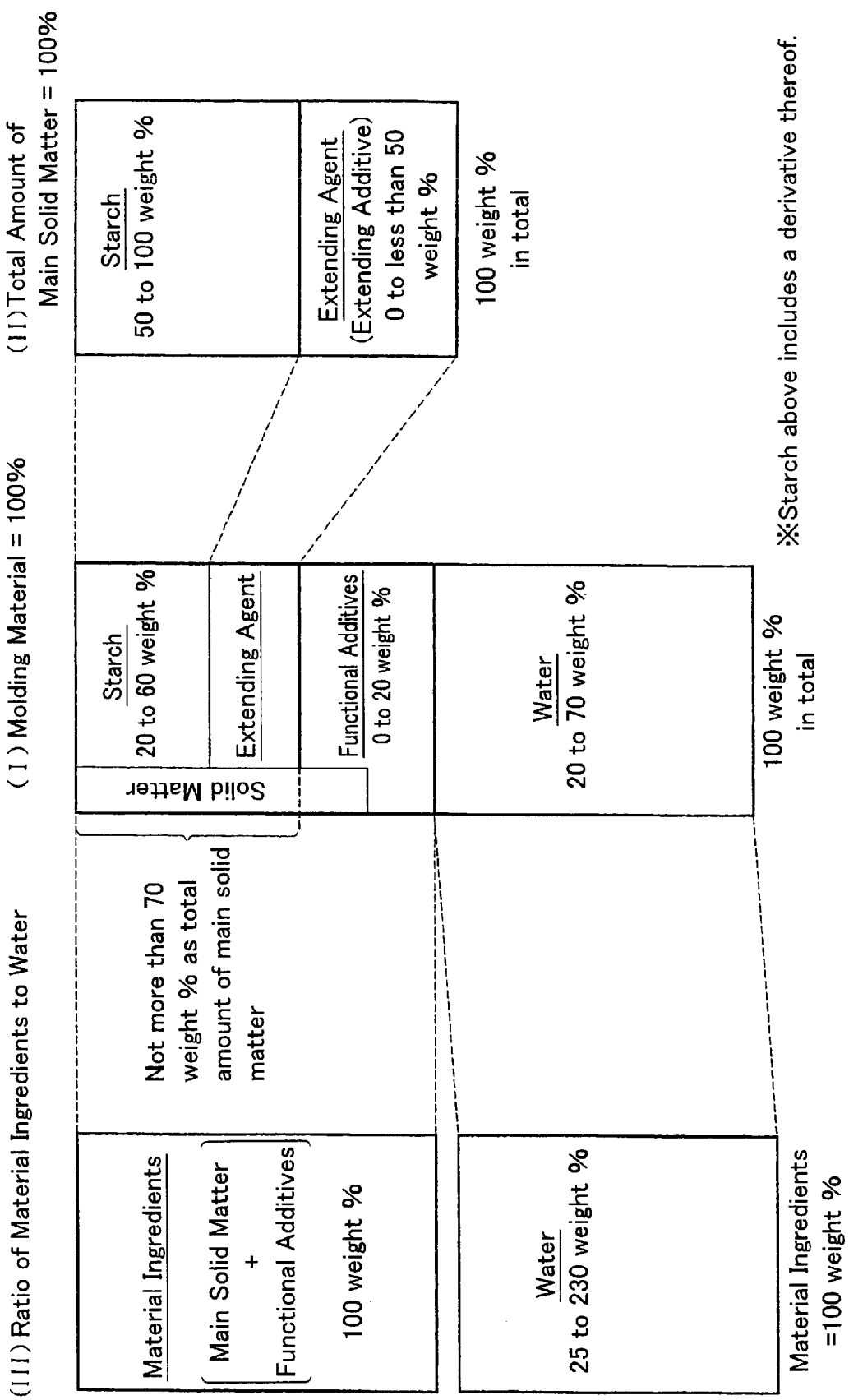
FIG. 4 is a graph that shows a composition of a molding material in the present invention, as measured in relation to the whole molding materials in a graph (I), and a total amount of solid matter in a graph (II), and by means of a ratio between a total amount of the materials and water in a graph (III), and a relationship between those measurements schematically.

As a graph "(II) Total Amount of Main Solid Matter=100%" in FIG. 4 shows, the percentage of starch content in the molding material is preferably not less than 50 weight % and not more less than 100 weight %, if a total amount of the main solid matter of the molding material is taken as 100 weight %. Meanwhile, if a total amount of the molding material including water is taken as 100 weight %, as a graph "(I) Molding Material=100%" in FIG. 4 indicates, the percentage of starch content is preferably between 20 weight % and 60 weight %. When the starch content falls in the ranges above, the main material of the biodegradable molded article in accordance with the present invention can be regarded as starch, so good biodegradability can be expected. By the way, the main solid matter and the total amount thereof are described later.

Apart from the starch, the molding material may include various additives. More specifically, the additives are such as an extending agent, strength adjusting agent, plasticizer, emalusifier, stabilizer, mold releasing agent, homogeneity adjusting agent, moisture retaining agent, handling adjusting agent, conductivity adjusting agent, dielectric loss adjusting agent, swelling agent, coloring agent, etc.

Some additives are beneficial in the manufacturing process of the biodegradable molded article, such as improving efficiency of manufacturing the biodegradable molded article or avoiding problems happening in the manufacturing process, and others are advantageous for the biodegradable molded article as a finished product, such as improving the quality of the acquired biodegradable molded article and cutting costs thereof. The type of these additives is not limited, unless significantly lowering the quality of the expanded molded article or the biodegradable molded article.

The extending agent is an additive added to the molding material to increase the bulk of the molding material and decrease the amount of starch included in the material as much as possible, to cut costs. Therefore, a substance used as the extending agent is not limited to any particular one as long as cheaper than starch, but by-products of processing and manufacturing of foods, etc. are preferred, to dispose the wastes simultaneously.

More specifically, what can be used are:
(1) a remained juice, residue of squeezing, and mixture of these two that are produced in food (food and drink) processing and manufacturing using vegetables and fruits such as celery, carrot, tomato, citrus fruits (mandarin orange, lemon, grapefruit, etc.), apple, grape, berries, pineapple, sugarcane, sugarpeat, etc.;
(2) by-products of a manufacture of processed foods using cereals, such as bean curd lees and tofu;
(3) sake lees, shochu lees, beer yeast lees, wine yeast lees, etc. that are produced in processes of producing liquors such as sake, shochu, beer, wine, etc., and any mixture thereof;
(4) residues of used luxury drinks such as coffee, black tea, barley tea, green tea, oolong tea, etc., and any mixture thereof;
(5) oil cakes remained after squeezing oil from soybean, corn, rapeseed, sesame, etc., and any mixture thereof;
(6) residues produced in processes to polish wheat bran, rice bran, rice husks, etc., and any mixture thereof;
(7) by-products produced in a process to produce starch such as gluten meal, etc.;

(8) baking residues produced in processes of manufacturing sweets and bread such as a cone cup, cracker, wafer, waffle, and any mixture thereof;

(9) the aforementioned by-products etc. above being dried or crushed.

Furthermore, either one of the substances or any mixture thereof may be used.

The strength adjusting agent is an additive to adjust (especially enhance) the strength of the expanded molded article and the biodegradable molded article. Although the type of the agent is not limited to any particular substance, what are taken as the concrete examples are, for instance:

the aforementioned by-products (1) to (9) taken as the extending agents;

(10) saccharide such as glucose, dextrin, isomerized saccharide, etc., and any mixture thereof;

(11) sugar-alcohols such as sorbitol, mannitol, lactitol, etc., and any mixture thereof;

(12) fats and oils such as vegetable fat and oil, animal fat and oil, processed fat and oil made thereof, etc., and any mixture thereof;

(13) waxes such as carnauba wax, candelilla wax, bees wax, paraffin, microcrystalline wax, and any mixture thereof;

(14) thickener polysaccharide (microbe producing polysaccharide or vegetable polysaccharide, etc.) such as xanthan gum, gellan gum, guar gum, locust bean gum, pectin, gum arabic, karaya gum, tara gum, carrageenan, furcellaran, agar, alginate, etc. and salts thereof, and any mixture thereof;

(15) chlorides of metals, such as calcium, sodium, potassium, aluminum, magnesium, and iron; sulfates, organic acid salts, carbonates, hydroxides, phosphates, and other salts of these metals; and any mixture thereof;

(16) insoluble minerals such as quartz powder, diatomaceous earth, talc, silicone, etc., and any mixture thereof;

(17) vegetable fibers and their derivatives such as cellulose, microcrystalline cellulose, paper, pulp (used pulp, virgin pulp), carboxymethyl cellulose, methyl cellulose, acetyl cellulose, etc., and any mixture thereof;

(18) structures of inorganic substances etc. (grass, metal, carbon, ceramic, etc.) and fibers made thereof, and any mixture thereof;

(19) natural materials such as a shell, bone powder, eggshell, leaf, wood powder, etc., and any mixture thereof;

(20) calcium carbonate, carbon, talc, titanium dioxide, silica gel, aluminum oxide, non-fiber filler, etc., and any mixture thereof;

(21) fatty acid (stearic acid, lactic acid, lauric acid, etc.), salt such as metal salt of the acid substances, etc., fatty acid derivatives such as acid amide, ether, etc., and any mixture thereof;

(22) other food additives such as glycerin, polyglycerin, propylene glycol, ethylene glycol, glycerine fatty acid ester, polyglycerine fatty acid ester, propylene fatty acid ester, sugar ester, lecithin, sorbitan fatty acid ester, polysorbate, etc., and any mixture thereof;

(23) natural resins such as shellac, rosin, sandarac resin, gutta-percha, dammer resin, etc., and any mixture thereof;

(24) biodegradable resins such as polyvinyl alcohol, polylactic acid, etc., and any mixture thereof;

(25) acetyltributyl citrate, solution of zirconium salt, alkali solution of ammonium zirconium carbonate, and any mixture thereof. Furthermore, either one of the substances above or any mixture thereof may be used.

The plasticizer is an additive to improve fluidity of the molding material and gives flexibility to the acquired expanded molded article and biodegradable molded article. Although the type of the plasticizer is not limited to any particular substance, what are taken as the concrete examples are, for instance:

the aforementioned by-products (1) to (9) taken as the extending agents;

the aforementioned compounds (10) to (21), (23), and (24) that are taken as the strength adjusting agents;

(26) acetylpolybutyl citrate, or sugar-alcohols such as glycerin, polyglycerin, propylene glycol, ethylene glycol, etc., and any mixture thereof.

Furthermore, either one of the substances above or any mixture thereof may be used.

The emalusifier is an additive to mix an oily additive adequately and emulsify the additive to be a oil-drop-in-water shape, provided that the oily additive is added to the molding material. Although the type of the emulsifier is not limited to any particular substance, what are taken as the concrete examples are, for instance:

(27) interfacial active agents such as glycerine acid ester, polyglycerine acid ester, propylene glycol fatty acid ester, sugar ester, sorbitan acid ester, lecithin, polysorbate, etc., and any mixture thereof.

The stabilizer is an additive to stabilize the state of the processed molding material. Although the type of the stabilizer is not limited to any particular substance, what are taken as the concrete examples are, for instance:

starch (in a narrow sense, not modified) as the main material and the derivative thereof; and the substances taken as the strength adjusting agents such as (10) saccharide, (11) sugar-alcohols, (14) thickener polysaccharide, (17) vegetable fibers and their derivatives (except paper), and (21) fatty acid, fatty acid salts, and fatty acid derivatives etc.

Either one of the substances above and any mixture thereof may be used.

The mold releasing agent is an additive to assist the molded expanded molded article being released from the mold and also make the surface of the expanded molded article as smooth as possible. Although the mold releasing agent is not limited to any particular type, what are taken as the concrete examples are, for instance, the substances taken as the strength adjusting agents, such as (12) fats and oils, (13) waxes, (14) thickener polysaccharide, (21) fatty acid, fatty acid salts, and fatty acid derivatives, etc.

Either one of the substances above or any mixture thereof may be used.

The homogeneity adjusting agent is an additive to make "grain" (in this case grain, etc. of a solid matter in the slurry/dough material) of the slurry/dough molding material as fine, smooth and homogeneous as possible. Although the homogeneity adjusting agent is not limited to any particular type, what are taken as the concrete examples are, for instance:

starch (in a narrow sense, not modified) as the main material, and the derivative thereof;

the aforementioned by-products (1) to (9) taken as the extending agents;

the aforementioned compounds (10) to (25) taken as the strength adjusting agents.

Furthermore, either one of the substances above and any mixture thereof may be used.

The moisture retaining agent makes the expanded molded article include a certain amount of water, and has the same effect as the plasticizer. That is to say, if the expanded molded article mainly made of starch includes a certain amount of water (if retaining moisture), while the brittleness of α-starch is decreased, strength and flexibility thereof are improved. Thus the moisture retaining agent can be used as a plasticizer and a strength adjusting agent as well.

The type of the moisture retaining agent is not limited to any particular substance either. So, what are taken as the concrete examples are, for instance:

- the starch (in a narrow sense, not modified) as the main material and the derivative thereof;
- the aforementioned by-products (1) to (9) taken as the extending agents; and
- the substances taken as the strength adjusting agents such as (10) saccharide, (11) sugar-alcohols, (12) fats and oils, (13) waxes, (14) thickener polysaccharide, (15) metallic salts, (17) vegetable fibers and their derivatives, (19) natural materials such as a shell, bone powder, eggshell, leaf, wood powder, etc., and (22) food additives.

Furthermore, either one of the substances above or any mixture thereof may be used.

The handling adjusting agent works as a slurry adjusting agent and is an additive to improve the handling of the slurry/dough molding material. Although the handling adjusting agent is not limited to any particular substance, it is noted that all materials and compounds taken as the plasticizer, the emalusifier, and stabilizer can be used. Either one of the substances above or any mixture thereof may be used.

The conductivity adjusting agent is an additive to adjust a conductivity of the molding material, which is one of the factors to control the state of heating in the case of internal heating as described later, especially in the case of heat molding using the internal heat generated by electric heating, when the expanded molded article is molded. Although the conductivity adjusting agent is not limited to any particular type, what are taken as the concrete examples are, for instance:

- (12) fats and oils, (13) waxes, (14) thickener polysaccharide, and (15) metallic salts that are taken as the strength adjusting agents, and
- (28) water soluble electrolytes such as salts, acid, alkali, alcohol, etc.

Either one of the substances above or any mixture thereof may be used.

The dielectric loss adjusting agent is an additive to adjust a dielectric loss of the molding material, which is one of the factors to control the state of heating especially in the case of heat molding using the internal heat generated by high frequency dielectric heating, when the expanded molded article is molded. Although the dielectric loss adjusting agent is not limited to any particular type, what are taken as the concrete examples are, for instance:

- the substances that are taken as the strength adjusting agents such as (12) fats and oils, (13) waxes, (15) metallic salts, (16) insoluble minerals, and (17) vegetable fibers and their derivatives;
- the substance taken as the conductivity adjusting agent such as (28) water soluble electrolytes; and
- (29) compounds including zirconium salt such as zirconium salt, solution of ammonium zirconium carbonate, etc., and any mixture thereof.

Either one of the substances above or any mixture thereof may be used.

The swelling agent is an additive to adjust the degree of expansion of the molding material and further the swelling to form the expanded molded article having an appropriate shape for the use. Although the swell agent is not limited to any particular type, what are taken as the concrete examples are, for instance:

- (30) formulations including organic swelling agents such as benzenesulfonyl hydrazine compounds, azonitryl compounds, nitroso compounds, diazo acetamide compounds, azocarboxylic acid compounds, etc.;
- (31) formulations including ammoniacal swelling agents such as espata, etc.;
- (32) formulations including inorganic swelling agents such as sodium bicarbonate, ammonium alum hydrogen tartaric acid, magnesium carbonate, etc.

Either one of the substances above and any mixture thereof may be used.

The coloring agent is an additive to color the whole expanded molded article. Although the coloring agent is not limited to any particular type, what are taken as the concrete examples are, for instance:

- (33) inorganic pigments such as carbon black, etc.;
- (34) natural or synthetic organic dyes such as colorants specified by a color index;
- (35) colorants made of natural materials such as a caramel, cacao powder, etc.

Either one of the substances above or any mixture thereof may be used.

Among the additives included in the molding material, a content of the extending agent (may be alternatively termed as extending additive) is preferably not more than a content of the starch contained in the total amount of the main solid matter in the molding material.

That is to say, although the extending additive (extending agent) is not necessarily contained, it is preferable if the extending additive is contained not exceeding the content of the starch at the maximum, from the viewpoint to cut the cost of raw materials of the biodegradable molded article in accordance with the present invention and to utilize the wastes as described above efficiently. So the starch that is the main material, and the extending agent that is the extending additive among the additives, are termed together as the main solid matter.

By the way, in the main solid matter, if the extending additive is contained more than the content of the starch, the starch virtually becomes not the main ingredient of the acquired biodegradable molded article. This should be avoided since the quality of the biodegradable molded article is degraded. Also, the starch and the extending agent are integrally termed as "main solid matter", because "solid matter" included in the biodegradable molded article includes solid matter of functional additives (see a graph "(I) Molding Material=100%" in FIG. 4).

That is, in the present invention, as the graph "(II) Total Amount of Main Solid Matter=100%" in FIG. 4 indicates, assuming that the total amount of the main solid matter (starch and extending agent) is taken as 100 weight %, the starch (including the derivatives) is contained not less than 50 weight % and not more than 100 weight %, while the extending agent is contained not less than 0 weight % and less than 50% (0-50 weight % in the figure).

Moreover, as described beside the graph "(I) Molding Material=100%" in FIG. 4, the total amount of the main solid matter is preferably not more than 70 weight %, assuming that the whole molding material including water is taken as 100 weight %.

Furthermore, among the additives included in the molding material, as the graph "(I) Molding Material=100%" in FIG. 4 shows, a content of each additive (termed as functional additives) except that the extending agent (extending additive) is preferably not less than 0 weight % and not more than 25 weight %, and more preferably not less than 0 weight % and not more than 20 weight %, assuming that the whole molding material including water is taken as 100 weight %. Also, an amount of the functional additives when the total amount of the main solid matter is taken as 100 weight %, i.e. an amount of the functional additives with respect to the total amount of the main solid matter is not particularly restricted, as long as the amount thereof in the molding material falls in the range as above.

In other words, as is the case with the extending agent, the functional additives are not necessarily contained in the molding material. However, it is preferable if the additives are contained not more than 25 weight % out of 100 weight % of the molding material, to improve performance of the biodegradable molded article. By the way, containing the functional additives not less than 25 weight % is undesired, because the additives cannot deliver the expected performances in accordance with the content thereof, and moreover, the performance of the biodegradable molded article may be degraded in a certain situation.

Provided that the main solid matter (the starch as the main material+the extending agent) and the functional additives are collectively termed material ingredients, the molding material used in the present invention further includes water. In this case, the type of water is not particularly restricted and any kind of industrial water can be used.

As shown in the graph "(I) Molding Material=100%" in FIG. 4, when water is added to the molding material, a content of water in the molding material should be within the range between not less than 20 weight % and not more than 70 weight %, more preferably within the range between not less than 25 weight % and not more than 55 weight %, assuming that the molding material is taken as 100 weight %.

In other words, as a graph "(III) Ratio of Material Ingredients to Water" in FIG. 4 shows, provided that the total amount of the material ingredients (main solid matter+ functional additives) of the molding material is taken as 100 weight %, water is added within the range between not less than 25 weight % and not more than 230 weight %, more preferably within the range between not less than 33 weight % and not more than 120 weight %. When the content of the water in the molding material falls in the range above, the molding material is in slurry/dough state.

On the one hand, if the content of the water in the molding material is less than 20 weight %, the molding material is scarcely fluid because of too small a water content, so this is not preferable in terms of molding. On the other hand, if the content of the water is more than 70 weight %, the content of the solid matter in the molding material becomes too low because of too large a water content, so this is not preferable in terms of molding too.

When the molding material is in slurry/dough state, moldability is improved since it becomes easy to make the molding material fill a cavity of the mold, as described later. It also becomes possible to make the molded expanded molded article contain a certain amount of water, and flexibility of the expanded molded article can be improved, as described later.

By the way, along with the main material, additives, and water that are described above, the molding material may include other additives. The ingredients are determined in accordance with functions to be added to the biodegradable molded article, and hence not particularly limit-ed to any additive.

Furthermore, slurry/dough state in this embodiment is categorized in accordance with fluidity of the biodegradable molded article for the sake of convenience. Thus the categorization is nothing to do with the content of the water. For instance, assuming that a molding material containing a certain amount of water is in slurry form, the molding material may be transformed to dough form if a content of a stabilizer, a water-absorbing extending agent such as bean curd lees, pulp, etc. are increased. Similarly, when a binding agent such as protein is added to the molding material, the material sometimes loses a certain degree of fluidity and may be transformed to dough form.

The expanded molded article is molded by using the molding material, as described above. As for the molding method, there is a method to use a mold including a cavity matched with a form of a desired molded article and containing at least two parts. The expanded molded article is molded by heating and pressurizing the molding material charged into the cavity of the mold.

One of the arrangements of the mold is that at least two metal parts capable of being detached for removing the expanded molded article after the molded article are included.

More specifically, examples of the mold are molds shown in FIGS. 5(a), 6(a) and 7(a) such as a metal mold 20a including upper and lower metal parts 21a and 22a, a metal mold 20b including parts 21b and 22b, and a metal mold 20c including parts 21c and 22c, and a mold shown in FIG. 8(a) such as a metal mold 20d including an upper part 21d having the same shape as the part 21c and lower parts 23d and 24d having the same shape as the lower part 22c being split in two.

That is to say, the mold of the present invention has to include dividable multiple molds but the style of splitting (i.e. the number of parts) is not particularly limited, since the style varies in accordance with the shape of the expanded molded article.

For instance, for the bowl-shaped container 10a and the plate-shaped container 10b, the molds split in two, i.e. the upper and lower parts, are preferably used, since these two are large in horizontal dimensions. In the meantime, the metal mold 20c, which is split in two (the upper and lower parts) similarly with the metal molds 20a and 20b, is possibly used for the cup-shaped container 10c. However, a three-way split mold such as the metal mold 20d is more suitable than the two-way types such as the metal mold 20c, since the container 10c is taller than the containers 10a and 10b.

As shown in FIGS. 5(b), 6(b), and 7(b) cavities 25a, 25b, and 25c matched with the shapes of desired expanded molded articles (see FIGS. 1 and 3) are formed in the metal molds 20a, 20b and 20c, when the upper parts 21a, 21b, and 21c are joined with the lower parts 22a, 22b, and 22c. Similarly, as FIG. 8(b) shows, a cavity 25d is formed in the metal mold 20d, when the parts 21d, 23d, and 24d are joined.

Moreover, although not illustrated, the metal molds 20a, 20b, 20c, and 20d may include a knockout pin for removing the expanded molded article and a hinge, guide, bar, etc., for movably connecting the parts 21a to 21d, 22a to 22c, 23d, and 24d.

Furthermore, in the present embodiment, although the metal molds 20a, 20b, 20c, and 20d are taken as examples of the mold, various conventional molds can be used and an appropriately shaped mold can be selected in accordance with a shape of the expanded molded article.

However, as described later, the mold used in the present invention requires heat resistibility for the steam expansion molding, and strength and abrasion resistance are also necessary. Furthermore, microwave permeability is required if internal heating is conducted by using microwave. Therefore, molds made of resin or ceramic having microwave permeability, heat resistibility, strength, and abrasion resistibility are preferably used when the internal heat is generated by using microwave, but otherwise a metal mold is more suitable because the mold itself performs as a part of an electrode in the case of internal heating by using electric conduction or high frequency dielectric heating that are described later.

As for the heating method for molded article above, what can be used are:
- external heating by direct heating means that the mold is directly heated, such as direct heat, far-infrared radiation, electric heater, IH device, etc.; or
- internal heating by internal heating means that the internal molding material itself is heated, such as electric conductive heating, high frequency dielectric heating, microwave heating, etc.

In the case of the external heating, the mold (metal mold 20a etc.) is directly heated by the direct heating means above. On this account, the molding material in the cavity (cavity 25a etc.) is heated from the outside, and the expanded molded article is molded through the steam expansion of the molding material.

Figure 9:
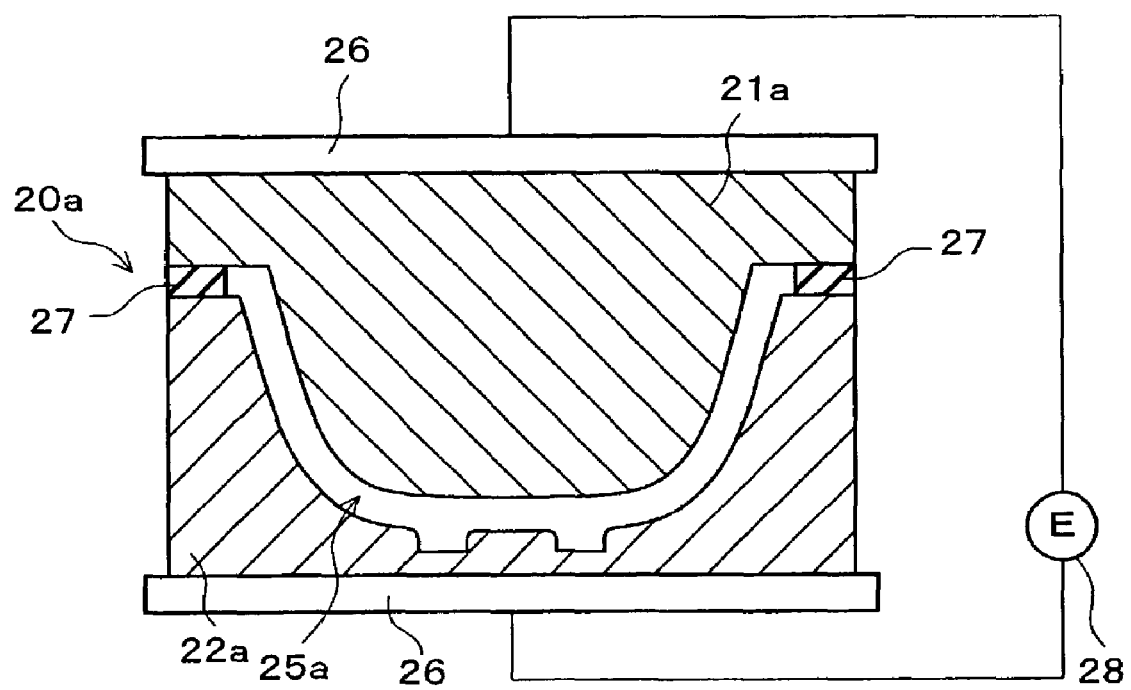
FIG. 9 is a schematic explanatory view showing an example of an arrangement that the mold shown in FIGS. 5(a) and (b) includes an electrode for internal heating.
Figure 10:
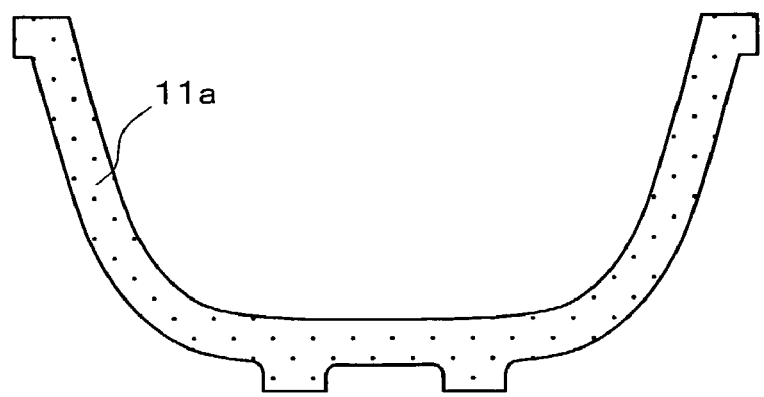
FIG. 10(a) is a schematic cross-sectional view showing a shape of the expanded molded article molded by the mold shown in FIGS. 5(a) and (b)
FIG. 10(b) is a schematic cross-sectional view showing a shape of the expanded molded article molded by the mold shown in FIGS. 6(a) and (b)
FIG. 10(c) is a schematic cross-sectional view showing a shape of the expanded molded article molded by the mold shown in FIGS. 7(a) and (b) or FIGS. 8(a) and (b).
Figure 10:
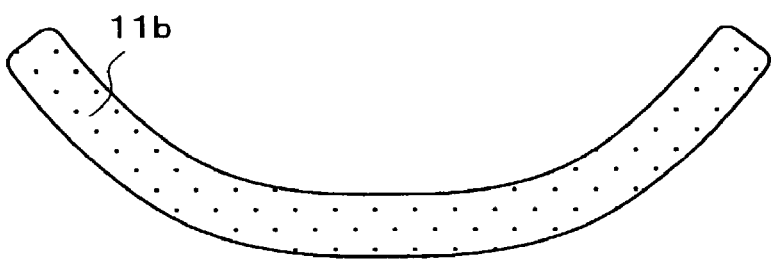
Figure 10:
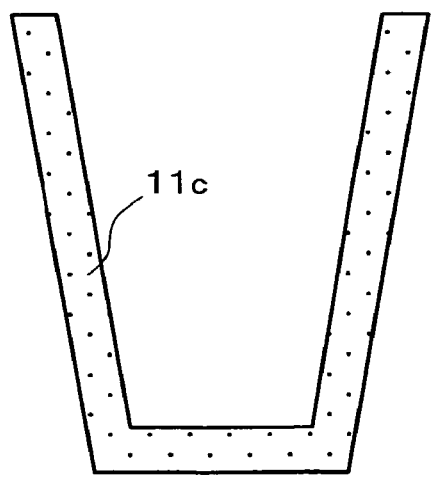

In the meantime, a mold having the same shape as that for the external heating can be used for the internal heating. So if the metal mold 20a is taken as the example, as FIG. 9 schematically shows, when the parts 21a and 22a are paired, the mold is possibly arranged so that:
- each of the parts 21a and 22a is connected to an individual electrode 26;
- an insulator 27 is provided at contacts between the parts 21a and 22a; and
- the electrodes 26 are connected to a power supply 28.

On this account, it becomes possible to internally heat the molding material charged in the cavity 25a. By the way, apart from the power supply 28, the electrode 26 is connected to unillustrated switch, control circuit, etc.

It is also possible to apply the arrangement in which the electrode 26 is connected either of the parts 21a and 22a, for the external heating. That is to say, the arrangement including the direct heating means and the electrode 26 is possibly used to heat the molding material directly, in the case of external heating too. Thus the arrangement shown in FIG. 9, in which the electrode 26 is provided, is possibly used for both internal and external heating.

Although a heating temperature of the heat molding is not particularly restricted, it is preferred if the mold is heated within the range between not less than 140° C. and not more than 240° C., in the case of external heating. When the temperature falls within the range above, the slurry/dough molding material in the cavity (cavity 25a etc.) is properly heated and the molded article as solid matter can be acquired. Also, the water contained in the molding material surely be vaporized and bubbles are formed because the range of the temperature is more than 100° C. i.e. the boiling point of water. Thus the expanded molded article can easily be acquired, since the acquired molded article surely achieves the steam expansion.

In the meantime, a heating temperature in the case of internal heating is not particularly restricted as long as the heating temperature is in a range at which the steam expansion happens to the molding material, since the molding material itself in the cavity (cavity 25a etc.) is internally heated by applying low frequency alternating voltage or high frequency electric field to the electrode 26, and the heating temperature depends on conditions related to the internal heating.

More specifically, characteristics of the electrode 26, a level of the low frequency alternating voltage, and strength of the high frequency electric field are deeply related to the determination of the conditions. Simultaneously, other major conditions include the conductivity and the dielectric loss of the molding material that are described above, since the heating condition depends on the conductivity of the molding material when the molding material is molded through electric heating, and the heat condition depends on the dielectric loss of the molding material, when the molding material is molded through high frequency dielectric heating.

Practically, the ranges of the conditions above are not specifically restricted, as long as the temperature in the cavity is more or less within the range of the temperature in the case of external heating.

The heating time should be appropriately set in accordance with the heating temperature and the shape, thickness, etc. of the expanded molded article. It is however preferable if the water content of the molded expanded molded article falls within a specified range. In other words, it is favorable to set the heating time so that the water in the molding material is not almost completely evaporated during the heating time.

When the amount of water in the molding material is less than the specified range of water content (described later) due to long heating time, undesirebly the quality of the expanded molded article is reduced, since the expanded molded article is expanded too much as well as cannot contain the specified amount of water, and as a result the expanded molded article becomes hard and brittle.

The heating time is not specifically restricted. For instance, while it is possible to mold the expanded molded article in a much shorter time through the high frequency dielectric heating comparing to a conventional external heating, the heating time tends to be longer when a thick expanded molded article is molded. Thus basically the heating time is appropriately determined in accordance with which heating method is used and how the expanded molded article is shaped, although generally it is preferable if the heating time falls within the range of 10 second to 5 minutes.

Pressure applied in the process of heat molding is not particularly restricted as well. However, generally, it is preferred if pressure is within the range of 5 kg/cm$^2$ to 50 kg/m$^2$. Of course, this molding pressure is variable with reference to the conditions.

By heating and pressurizing the molding material in either of the cavities 25a, 25b, 25c, and 25d by using either of the metal molds 20a, 29b, 20c, and 20d, as FIGS. 10(a), (b), and (c) indicates, either of the bowl-shaped main body 11a, the plate-shaped main body 11b, and the cup-shaped main body 11c is acquired as the expanded molded article. A final content of water in the expanded molded articles after they are molded falls within the range between 3 weight % and 20 weight %, more preferably within the range between 3 weight % to 15 weight %.

On the one hand, it is undesirable if the final content of water is less than 3 weight %, because excessively low water content renders the expanded molded article hard and brittle so that the flexibility thereof is reduced. On the other hand, it is also undesirable if the water content is more than 20 weight %, because excessively high water content renders the expanded molded article containing too much moisture so that the weight thereof is gained and attaching and adhering the coating film 12 become difficult.

As described in the description of the moisture retaining agent, the use of the molded article material is seriously limited due to the hardness and brittleness of the same, when starch is simply transformed to be α-starch. Thus, in the present invention, it is possible to acquire the expanded molded article containing the amount of water within the range as above by simply molding the same, since enough water is contained in the molding material in slurry/dough state. By the way, sometimes the water content goes a little out of bounds when circumstances of the molded article vary. In this kind of case, the water content is adjustable by leaving the expanded molded article in a warehouse with a fixed moisture level for a certain period of time, spraying water to the same, and inversely leaving the same in a dry warehouse for a fixed period of time.

In the biodegradable molded article in accordance with the present invention, the coating film 12 made of biodegradable plastics is attached on the surface of the expanded molded article (the main body 11a, etc.). Attaching the coating film 12 having at least hydrophobicity can impart the expanded molded article at least water resistance. Also, it is preferable if the coating film 12 further imparts gas impermeability, heat insulation, abrasion resistance, improved strength, and flexibility to the expanded molded article.

More specifically, when the biodegradable molded article of the present invention is used for a highly hermetic preserving container, a gas impermeable coating film 12 is highly preferable, since oxidation of, and moisture absorption by, an article in the container must be avoided.

Moreover, when the biodegradable molded article of the present invention is used for a container of noodles, a coating film 12 with high heat resistance is preferably arranged, since deformation and melting of the biodegradable molded article because of the heat of an article inside the container must be avoided. More specifically, the softening point of the coating film 12 is preferably not less than 130° C., and more preferably not less than 150° C. Also, the melting point of the coating film 12 is preferably not less than 170° C., more preferably not less than 200° C. Furthermore, the softening point of the coating film 12 is preferably not less than 130° C. and at the same time the melting point is not less than 170° C., and the most preferable arrangement is that the softening point thereof is not less than 150° C. and at the same time the melting point is not less than 200° C. On account of this, deformation and melting of the biodegradable molded article because of the heat of an article inside the container are able to be avoided.

The material of the coating film 12 is not specifically limited as long as materials that are able to impart water resistance and preferably gas impermeability to the expanded molded article after the film 12 is attached.

More specifically, what are used as the materials are those conventionally known as biodegradable plastics such as 3-hydroxybutyric acid-3-hydroxyvaleric acid copolymer, poly-p-hydroxybenzaldehyde (PHB), polybutylene succinate (PBS), polycaprolactone (PLC), acetylcellulose (PH) polymer, polyethylene succinate (PESu), polyester amide, modified polyester, polylactic acid, Mater-Bi (trademark of Novamont, Italy: having starch as the major ingredient and polyvinyl alcohol resin and aliphatic polyester resin as the minor ingredients), cellulose, and chitosan composite, etc. Either one of the materials above or any mixture of more than one material may be used. Also, accessory materials such as a biodegradable plasticizer, filler, etc. may be added to the biodegradable plastics.

Furthermore, the coating film 12 may be produced by adding starch to the materials (biodegradable plastics) above. In this case, although a mixing ratio between the biodegradable plastic and starch is not particularly limited as long as qualities of the coating film 12 such as water resistance are not impaired; for instance, what is preferable is a more or less 1:1 mixing ratio by weight.

In addition, additives may be added to the coating film 12. More specifically, although the additives are not particularly limited types, what are able to be added are coloring agents, additives capable of improving water resistance, gas impermeability, etc., an additive improving qualities in relation to the softening when the coating film 12 is attached, etc.

Although the thickness of the coating film 12 (thickness of the film) is not particularly limited, it is preferred if the thickness of the film or sheet before attached on the expanded molded article falls within the range between 0.01 mm and a few millimeters.

As described later, the thickness of the coating film 12 becomes below the range above after attached on the surface of the expanded molded article, since the coating film 12 is heated and softened when attached. The thickness of the coating film 12 after attached is set at an appropriate thickness capable of having water resistance, gas impermeability, etc. in accordance with the type of biodegradable plastics used as the materials, hence not particularly limited. However, preferably the thickness is not more than 80 μm, and more preferably not more than 50 μm. Although the floor limit is also not particularly limited as long as water resistance, gas impermeability are acquired, it is generally not less than 5 μm.

The expanded molded article preferably accounts for not less than 60 weight % of the total weight of the biodegradable molded article in accordance with the present invention. In other words, the biodegradable plastics preferably account for less than 40 weight % of the total weight of the biodegradable molded article in accordance with the present invention.

As described above, the speed of biodegradation of biodegradable plastics is slower than that of starch. More specifically, although the speed of biodegradation of the biodegradable plastics having the same weight greatly varies in accordance with the type and shape of the biodegradable plastics, generally, the rate of biodegradation of the biodegradable plastics can be considered in the range of some tenth to around a fourteenth, if that of starch is set as one.

Therefore, if the amount of biodegradable plastics included in the biodegradable molded article is too much, biodegradability of the biodegradable molded article on the whole becomes poor, even if the biodegradable plastics have biodegradability. Thus it is highly preferable to set the maximum amount of the biodegradable plastics accounting for in the total weight.

So, apart from the coating film 12 that is always made of biodegradable plastics, the biodegradable plastics of the biodegradable molded article in accordance with the present invention may include an adhesive (adhesive layer 13) that is described later. Thus to stipulate the maximum amount of the biodegradable plastics is equivalent to stipulate the maximum amount of these coating film 12 and adhesive layer 13.

However, the adhesive 13 does not always have to be used (for instance, the bowl-shaped container 10a shown in FIG. 1(a)), and moreover, as described later, non-plastic natural materials such as starch are possibly used as the adhesive layer 13. So in the biodegradable molded article in accordance with the present invention, the amount of the biodegradable plastics is stipulated by stipulating the amount of the expanded molded article mainly made of starch.

Since the coating film 12 and the adhesive layer 13 are shaped as film, the biodegradable plastics are easily biodegraded in the biodegradable molded article of the present invention. Taking this into account, as described above, the maximum weight of the biodegradable plastic (coating film 12 and adhesive layer 13) in the biodegradable molded article of the present invention is stipulated as less than 40 weight %, when the weight of the expanded molded article is set as not less than 60 weight %. As a result, biodegradability of the biodegradable plastics and that of the expanded molded article are well-balanced, so biodegradability of the biodegradable molded article is further improved.

Very good biodegradability is able to be acquired on the whole, especially since the expanded molded article, having good biodegradability for its expanded structure, lessen the content of the coating film 12 and the adhesive layer 13. Thus when, for instance, the biodegradable molded article of the present invention is used as a food tray, the food tray is able to be composted together with residues of food without causing any problem.

The weight of the expanded molded article preferably accounts for not less than 60 weight % of the total weight of the biodegradable molded article of the present invention. That is to say, the biodegradable plastics preferably account for a maximum of less than 40 weight % of the total weight of the biodegradable molded article in accordance with the present invention.

In the present invention, two arrangements in which the coating film 12 is attached are discerned in accordance with a difference of the manufacturing method of the biodegradable molded article. The coating film 1 is directly attached on the expanded molded article in the first arrangement (for instance, see FIG. 1(*a*)) and the film is attached via the adhesive layer 13 (for instance, see FIG. 1(*b*)) in the second arrangement. An adhesive is required for attaching the coating film 12 in the latter arrangement.

Although the adhesive is nut particularly restricted as long as having biodegradability and also capable of attaching the coating film 12 to the expanded molded article, specific examples of the adhesive are such as natural glues and binding agents mainly made of starch, protein, or these natural substances mixed with PVA (polyvinyl alcohol), aqueous adhesives, protein refractory/insoluble in water and congealed due to thermal metamorphism, biodegradable plastics (generally synthetic product) having a low melting point and being able to be melted below the melting point of the coating film 12, adhesives having a low melting point such as a mixture of any aforementioned substances, and thermosetting adhesives having fluidity at room temperature.

The aqueous adhesives have the advantage of very high level of biodegradability and safety, since they are mainly naturally occurred substances and basically made of starch, etc. as in the case of the expanded molded article. The use of the aqueous adhesives is not particularly limited. However, generally the coating film 12 is attached after the adhesive is put on the surface of the expanded molded article with a brush or inversely the adhesive is put on the surface of the coating film 12 before the film 12 is attached on the surface of the expanded molded article.

The biodegradable plastics (generally synthetic product) having a low melting point and being able to be melted below the melting point of the coating film 12, and a mixture thereof are also able to be used as the adhesive with low melting point. In other words, among the biodegradable plastics taken as the concrete examples of the coating film 12, a plastic selected as an appropriate one has to have a lower melting point than that of the biodegradable plastic used for the outermost layer of the coating film 12, more specifically, melted either at temperatures lower than the softening point of the coating film 12 or within the range between not less than the softening point of the coating film 12 and less than the melting point of the coating film 12.

For instance, when a film mainly made of polylactic acid, modified polyester and the like are used as the coating film 12, since the melting points of these substances are within the range of 80° C. to 100° C., polycaprolactone whose melting point is within the range 60° C. to 70° C. is preferably used as the adhesive with a low melting point.

The biodegradable plastics having a low melting point is generally used in film-shape. That is, the biodegradable plastics having a low melting point is highly suitable for use as an adhesive film. As described later, the coating film 12 is heat and pressure-pressed and attached on the expanded molded article by using the attaching mold. So if the adhesive film made of the biodegradable plastics having a low melting point is arranged between the coating film 12 and the expanded molded article in the step above, the adhesive works well, since the biodegradable plastics having a low melting point is melted on account of the heat and pressure pressing.

As the adhesive used in the present invention including the aqueous adhesive and the biodegradable plastics having a low melting point, adhesives not including a volatile organic solvent are suitable. The organic solvent is unfavorable because, if the same is used, a device to prevent volatilization and diffusion, etc. of the organic solvent has to be provided and thus the manufacturing facilities have to be upsized.

Now, a manufacturing method of the biodegradable molded article in accordance with the present invention is described.

There are two methods of manufacturing the biodegradable molded article in accordance with the present invention. The first one is a method that after a molding material is molded to be a specifically shaped expanded molded article through a steam expansion, a coating film is attached (termed as after attaching method). The second one is a method that molding a molding material through steam expansion and attaching a coating film are done at the same time (termed as simultaneous attaching method).

First, the after attaching method is described. This method at least includes two steps of:

molding a specifically shaped expanded molded article (such as the main bodies 11*a*, 11*b*, 11*c*, etc.) from the molding material through the steam expansion; and attaching to compress-bond the coating film 12 on the surface of the expanded molded article after the coating film 12 is heated and softened.

The biodegradable molded articles acquired by using this method are arranged to have the adhesive layer 13 between the coating film 12 and the expanded molded article (the main bodies 11*a*, 11*b*, and 11*c*), as shown in FIGS. 1(*b*), 2(*b*), 3(*b*), etc.

On this account, the biodegradable molded article with a water content that gives enough strength to the same and arranged so that the coating film 12 is steadily attached on the main body (expanded molded article) containing a stable water content is able to be acquired.

So, a attaching mold, which is used when the coating film 12 is attached, has substantially identical shape as that of a mold (metal mold 20a, etc.) used for molding the expanded molded article. For instance, as shown in FIG. 11, a mold 30 having substantially identical shape as that of the metal mold 20a is used, when the coating film 12 is attached on the main body 10a to produce the bowl-shaped container 10a.

The shape of the attaching mold does not have to be completely matched with the outside shape of the expanded molded article, as long as being capable of guiding the coating film 12 to be attached on the surface of the expanded molded article adequately. So, generally a copy of the mold of the expanded molded article is used. On this account, it becomes possible to produce the attaching mold at low cost and to attach the coating film 12 certainly and easily, even on a complicatedly shaped expanded molded article. As a result, this allows to manufacture the biodegradable molded article in simpler procedure.

The shape of the attaching mold is not particularly limited as long as the attaching mold has substantially identically shaped cavity as that of the mold. However, if two layers of films, the coating film 12 and the adhesive film, are attached, the heating means is provided as in the case of the mold, to melt the adhesive film with certainty. Thus, for instance, it is possible to use the metal mold 20a, shown in FIGS. 5(a), 5(b), or 9, as the attaching mold, for attaching the film 12 without any modification, when the bowl-shaped container 10a is manufactured.

Figure 11:
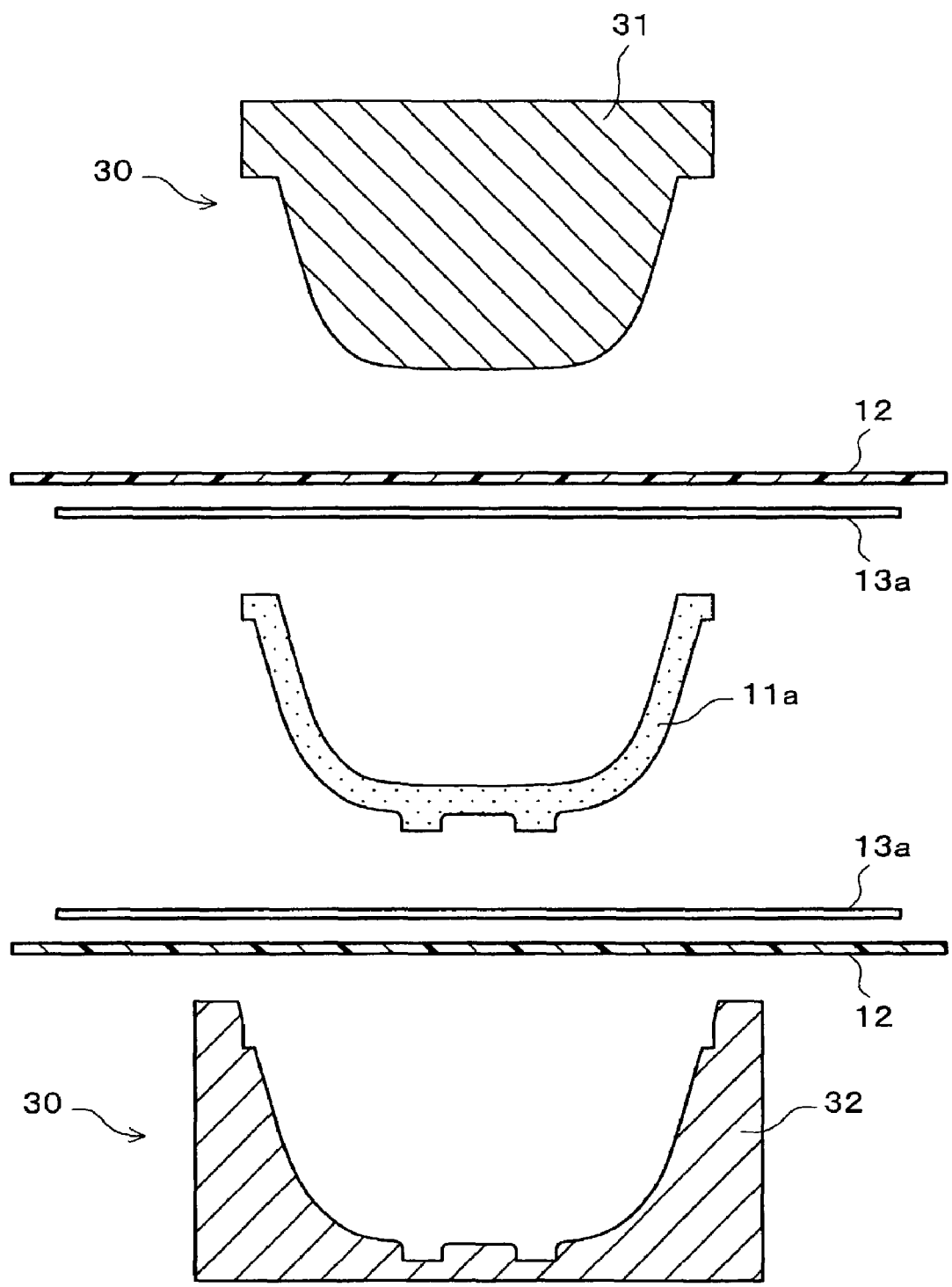
FIG. 11 is a schematic explanatory view describing a attaching step that a coating film is attached on the surface of the biodegradable expanded molded article shown in FIG. 10(a) by using an after attaching method.
Figure 12:
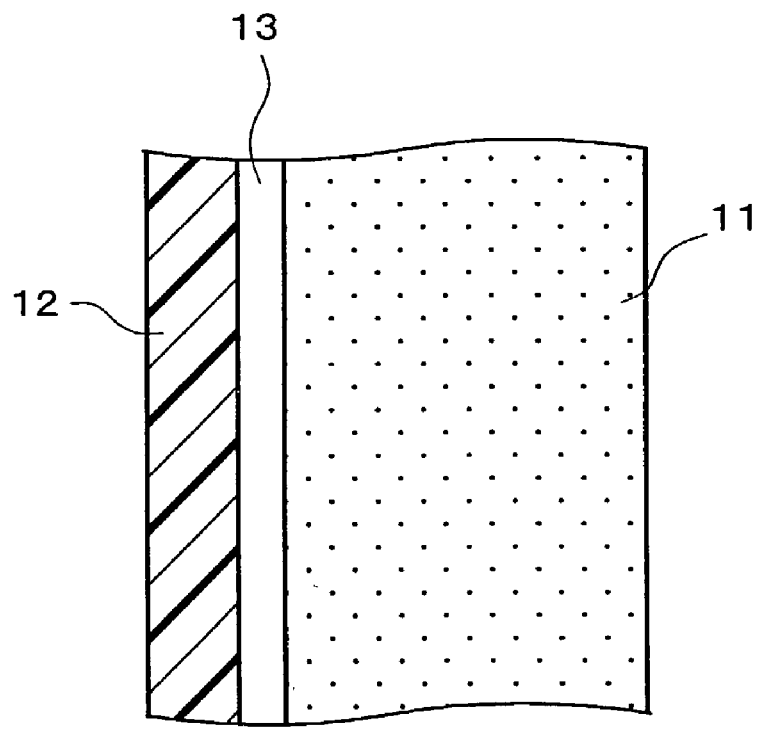
FIG. 12(a) is a scheamtic explanatory view showing a attaching state of the coating film on the surface of the biodegradable molded article on which the coating film is attached by using the after attaching method.
FIG. 12(b) is a scheamtic explanatory view showing a attaching state of the coating film on the surface of the biodegradable molded article on which the coating film is attached by using a simultaneous attaching method.
Figure 12:
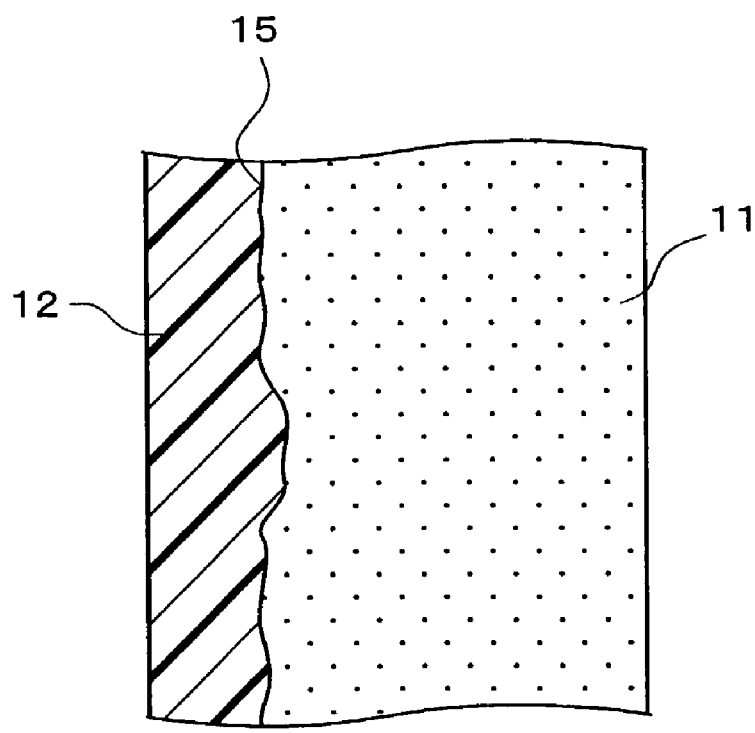

Provided that a concrete example of the attaching method is described, first of all, as shown in FIG. 11, the main body of the bowl-shaped container 11a, which is an expanded molded article, is arranged with respect to the mold 30, and also the coating film 12 is arranged on a part of the mold 30 corresponding to the surface of the main body 11a where the coating film 12 is desired to be attached.

FIG. 11 shows an example to attach the coating film 12 to the whole expanded molded article. Above a part 32, which is a below part of the mold 30, the coating film 12 is arranged. The main body 11a is provided above the film 12, then above the main body 11a the coating film 12 is arranged again, and further above, a part 31, which is an upper part of the mold 30, is arranged. In other words, the main body 11a is sandwiched between two coating films 12.

Furthermore, when the biodegradable plastics having a low melting point is adopted as the adhesive, as FIG. 11 shows, the adhesive film 13a made thereof is provided between the coating film 12 and the main body 11a. That is to say, above the lower part 32, the coating film 12, the adhesive film 13a, the main body 11a (expanded molded article), the adhesive film 13a, and the coating film 12, are arranged in that order. By the way, FIG. 11 is illustrated as spaces are left between the films and between the molded article and the film, for the convenience of description.

After the step above, temperatures of the parts 31 and 32 are set between not less than the softening point of the coating film 12 and less than the melting point thereof in advance, and then the coating film 12 is attached on the surface of the main body 11a by pressing the upper part 31 and the lower part 32 from both above and below and exerting appropriate pressure on the parts 31 and 32. At this moment, since the adhesive film 13a is melted at a temperature not higher than the softening point of the coating film 12, the melted adhesive film 13a is fused and adhered to the surface of the main body 11a and becomes the adhesive layer 13, then on the same, the coating film 12 is attached.

By the way, if a biodegradable plastic, melted at a temperature between not less than the softening point of the coating film 12 and less than the melting point thereof, is adopted as the adhesive film 13a, heating temperatures of the parts 31 and 32 also have to be set between the softening point of the coating film 12 and the melting point thereof.

Although the exerted pressure when the coating film 12 is attached is not specifically limited and appropriately set in accordance with the type of adhesive being used, what is preferable is such relatively high pressure that the thickness of the expanded molded article is reduced. On this account, it becomes possible to make adhesion of the coating film 12 thanks to the adhesive layer 13 better and also to make the thickness of the biodegradable molded article (bowl-shaped container 10a in FIG. 1(b)), which is the final molded article, thinner. Therefore, it is possible to improve stackability (easiness to stack cups and the number of cups when stacked to a specified height) of the biodegradable molded article.

When the after attaching method is adopted in the manufacturing method of the present invention, as described above, the adhesive film 13a is highly preferably used for the adhesive to attach the coating film 12. When this method is used, it becomes possible to omit the step to apply the adhesive on the surface of the expanded molded article and the manufacturing method of the biodegradable molded article is further simplified, since providing the adhesive film 13a before attaching the coating film 12 is all that is needed in this method.

That is to say, the expanded molded article (main body 11a, etc.), which is the main body of the biodegradable molded article of the present invention, is clearly hydrophilic, because the molded article is mainly made of starch and contains a certain amount of water. Meanwhile, as already described, the coating film 12 is hydrophobic. Thus it is highly likely that the coating film 12 is not sufficiently attached to the expanded molded article, when the film 12 is simply attached by using the after attaching method.

On the contrary, if the coating film 12 is attached by using the adhesive film 13a, as FIG. 12(a) shows, the coating film 12 is certainly attached to the hydrophilic expanded molded article 11 via the adhesive layer 13. As a result, it becomes possible to stabilize the attaching condition of the coating film 12 in the biodegradable molded article in accordance with the present invention, and also to further improve water resistance and gas impermeability of the biodegradable molded article.

By the way, in the after attaching method, what are able to be used as the coating film 12 are parts that are shaped substantially identical with the outside shape of the resulting biodegradable molded article in advance such as a molding film, a film part, an outside shape film, etc. that are used in the simultaneous attaching method described later.

In this manner, the coating film is not ripped in the step of attaching, if the coating film is molded in a shape substantially identical with the outside shape of the biodegradable molded article, hence this enables manufacture of the biodegradable molded article with deep draw depth properly. the molding film, the film part, and the outside shape film are described in detail in the description of the simultaneous attaching method.

Now, the simultaneous attaching method is described. As described above, this method at least includes the step of molding coinciding with attaching in which the molding material is molded through the steam expansion and at the same time the coating film 12 is attached. The biodegradable molded article acquired by using this method is arranged so that the coating film 12 is formed directly on the surface of the expanded molded article (main bodies 11a, 11b, and 11c), as shown in FIGS. 1(a), 2(a), 3(a), etc. Comparing to the aforementioned after attaching method, this simultaneous attaching method has advantages as follows.

Firstly, the number of the steps is able to be reduced. That is, it is possible to reduce the steps in comparison to the after attaching method requiring at least two steps to attach the coating film 12, since the simultaneous attaching method is capable of attaching the coating film 12 virtually in one step. Moreover, it is possible to reduce the manufacturing time thanks to the capability of attaching in one step. As a result, it becomes possible to manufacture the biodegradable molded article of the present invention more efficiently.

Secondly, the attaching mold becomes unnecessary. That is to say, in the simultaneous attaching method, attaching the coating film 12 is done concurrently with molding the expanded molded article (main body 11a, etc.) by using the mold (metal mold 20a, etc.). Thus the attaching mold (mold 30 shown in FIG. 11, etc.) for attaching the coating film 12 in the after attaching method is unnecessary. On this account, it becomes possible to cut costs for the manufacturing facilities and also to downsize the facilities, since the attaching facilities including the attaching mold becomes unnecessary.

Thirdly, it becomes unnecessary to use adhesives. That is, in the simultaneous attaching method, since the coating film 12 is attached concurrently with the expanded molded article being molded, the coating film 12 is substantially bonded to the surface of the expanded molded article (main body 11a, etc.) Thus it becomes possible to cut costs of the material of the adhesive and also to further improve biodegradability of the biodegradable molded article, since the omission of the adhesive induces a higher content of starch in the biodegradable molded article.

Fourthly, the attaching condition of the coating film 12 is as stable as that of the coating film 12 using the adhesive film 13a in the after attaching method, since the coating film 12 is substantially bonded to the expanded molded article.

As already described, while the expanded molded article such as main body 11a is hydrophilic, the coating film 12 is hydrophobic. Thus it is highly likely that the coating film 12 is not sufficiently attached to the expanded molded article, when the film 12 is simply attached on the expanded molded article.

However, in the simultaneous attaching method, the coating film 12 is attached concurrently with the steam expansion molding of the molding material, at a temperature at least between not less than the softening point of the biodegradable plastic that is the main ingredient of the coating film 12 and less than the melting point of the biodegradable plastic. Hence the heated and pressurized coating film 12 faces the expanded molded article in the step of expansion. So the softened coating film 12 receives pressure of the mold from outside and that of the expanded molded article in the step of expansion from inside so as to closely contacts with the expanded molded article. As a result, the coating film 12 is attached as fusing on the surface of the expanded molded article.

On this account, as shown in FIG. 12(b), the boundary surface 15 of a layer of the coating film 12 and the surface of the expanded molded article 11 in a cross section of the acquired biodegradable molded article becomes not like a smooth surface created by the simple attaching (see the condition in the after attaching method in FIG. 12(a)) but becomes, for instance, an irregular surface with bumps and dips, so the coating film 12 is adequately adhered to the expanded molded article 11. Consequently, the attaching condition of the coating film 12 becomes highly strong and as stable as the condition of the attaching by the adhesive layer 13. Thus it is possible to further improve the water resistance and the gas impermeability of the acquired biodegradable molded article.

By the way, although the boundary surface 15 of the layer of the coating film 12 and the surface of the expanded molded article 11 is schematically described as, for instance, an irregular surface with bumps and dips in FIG. 12(b), of course the state of the surface 15 is not limited to this, and the surface 15 possibly takes various forms in accordance with the ingredients of the coating film 12 and the expanded molded article 11, conditions of the simultaneous attaching method, etc. Therefore, in the present invention, the attaching condition of the layer of the coating film 12 and the expanded molded article 11 of the biodegradable molded article acquired by the simultaneous attaching method is not particularly limited as long as these two are almost completely adhered.

Taking these four advantages into account, adopting the simultaneous attaching method makes it possible to manufacture the biodegradable molded article at lower cost, since the biodegradable molded article of the present invention, having the same quality as the one manufactured by the after attaching method, can be manufactured more efficiently and at lower cost than using the after attaching method. Hence this makes easier to utilize the biodegradable molded article of the present invention for the disposal use.

However, sometimes the simultaneous attaching method is difficult to be applied, depending on the type of the coating film 12, the composition of the molding material, etc. In this case, the after attaching method is highly suitable. In other words, each of the after attaching method and the simultaneous attaching method has advantages thereof, thus the methods are appropriately selected in accordance with the situation. So both of the methods have benefits and advantages as the manufacturing methods of the biodegradable molded article in accordance with the present invention.

Now, the simultaneous attaching method is a method that the coating film 12 is softened at the temperature within the range between less than the melting point and not less than the softening point at the same time with the steam expansion molding of the molding material, and then the coating film 12 is attached concurrently with molding the expanded molded article. Thus it is required to set the conditions of the heating method with respect to the coating film 12 to be attached appropriately.

That is to say, since a temperature not less than 100° C. is simply required to mold the molding material through the steam expansion, a biodegradable plastic whose melting point is not less than 100° C. has to be selected as the main ingredient of the coating film 12, if the external heating is adopted as the heating method. If the coating film 12 is mainly made of the biodegradable plastic whose melting point is not more than 100° C., the coating film 12 is completely melted at a temperature for sufficient steam expansion molding of the molding material. Hence it becomes impossible for the coating film 12 to be film-shaped or sheet-shaped, so a uniform layer of the coating film 12 without any gaps and holes cannot be formed on the surface of the expanded molded article.

In the meantime, the coating film 12 mainly made of the biodegradable plastic whose melting point is not less than 100° C. is suitable, even in the case of using the internal heating as the heating method. However, it is possible to use the one having relatively low melting point, compared to the external heating.

The molding material itself is heated in the case of the internal heating. Thus the coating film 12 is heated by the molding material that is in the step of the expansion molding and under high temperature conditions, and then attached on the surface of the expanded molded article. Hence using the internal heating permits the use of the coating film 12 mainly made of a biodegradable plastic having relatively low melting point, since the coating film 12 is not directly heated by the mold.

The dielectric heating is particularly suitable for the internal heating. By the dielectric heating, the molding material is rapidly heated in an early stage on the expansion molding and the whole of the molding material is expanded altogether. Because of this, pressure to press the coating film 12 against the mold is generated strongly as well as evenly. Also, controlling the temperature of the mold and the heat generation of the mold allows to raise the temperature of an adhesive surface (surface to be bonded with the coating film) of the expanded molded article to near the melting point, while keeping the temperature of a mold contact surface (surface to contact with the mold) below the melting point. As a result of these features, it becomes possible to acquire a biodegradable molded article in which the expanded molded article and the coating film 12 are intensely adhered.

The dielectric heating is a method to heat an object by means of dielectric loss of the object. There are different types of the dielectric heating, such as:

high frequency dielectric heating in which high frequency wave (HF; 3 to 30 MHz) is fed to an object (dielectric) to dielectrically heat the same; and microwave heating in which microwave (HF; 1 to 100 GHz) is fed to an object (dielectric) to dielectrically heat the same.

Of the methods above, the high frequency dielectric heating is more suitable because of the characteristics thereof; such as dielectric heating can be done by using a metal mold as an electrode, heating of the molding material is easily controlled since an output device (high frequency generator) is controllable with precision, etc.

Meanwhile, in the case of the external heating, the coating film 12 is heated to very high temperatures to conduct the expansion molding of the molding material sufficiently, because, in this method, after the coating film 12 is directly heated by the mold, the molding material located further inside is heated. Hence it is preferred if the coating film 12 has a higher melting point, and the heating temperature of the mold has to be adjusted more precisely, in consideration of the melting point and softening point of the coating film 12.

Therefore, in the case of the simultaneous attaching method, the internal heating has higher versatility as the heating method of the simultaneous attaching method, in terms of ease of attaching, wider choice of the coating film 12, etc.

However, the external heating has advantages in that the softening of the coating film 12 and the adhesion thereof to the surface of the expanded molded article are easily controllable, since the coating film 12 is directly heated by the mold. Also, in the case of internal heating, the external heating may be preferred when a coating film 12 having a high softening point is used, because the expanded molded article might be degraded due to over expansion and so on, when the molding material is heated enough to melt the coating film 12, and if certain kinds of molding materials are used. In this manner, in the case of the simultaneous-attaching, the external heating and the internal heating have each own advantage as the heating method, thus the heating method is not particularly limited but appropriately chosen to use either of the external heating, the internal heating, or both.

It is possible to classify the simultaneous attaching method, for instance, under seven types (eight types if a variation is included) as below, depending on the use of the coating film 12 when attached.

[Method 1]

As in the case of the attaching step of the coating film 12 in the after attaching method above, the method 1 is a method that the molding material is inserted between the coating films 12 which are not formed and still shaped like sheet, then the coating film 12 is attached to the expanded molded article which is simultaneously molded through the steam expansion molding. This method is particularly preferred for molding a horizontally long and wide biodegradable molded article such as the plate-shaped container 10*b* shown in FIG. 2(*a*), in accordance with a sheet-shaped coating film 12.

Figure 6:
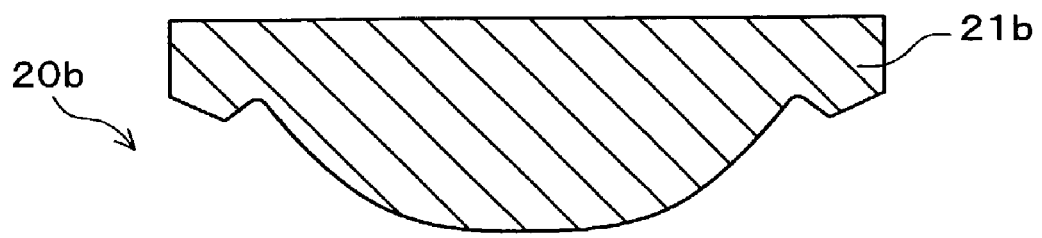
FIGS. 6(a) and (b) are schematic cross-sectional views showing an arrangement of a mold to mold an expanded molded article that is a main body of the plate-shaped container shown in FIGS. 2(a) and (b).
Figure 6:
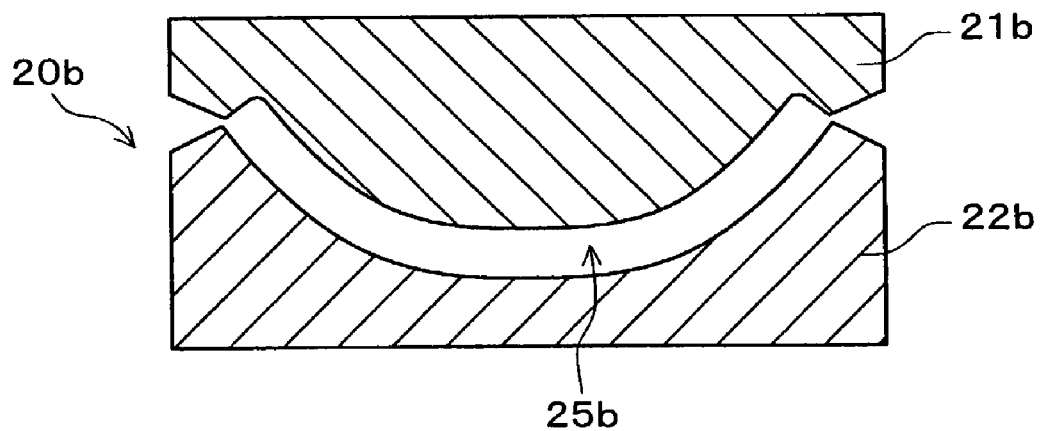
Figure 7:
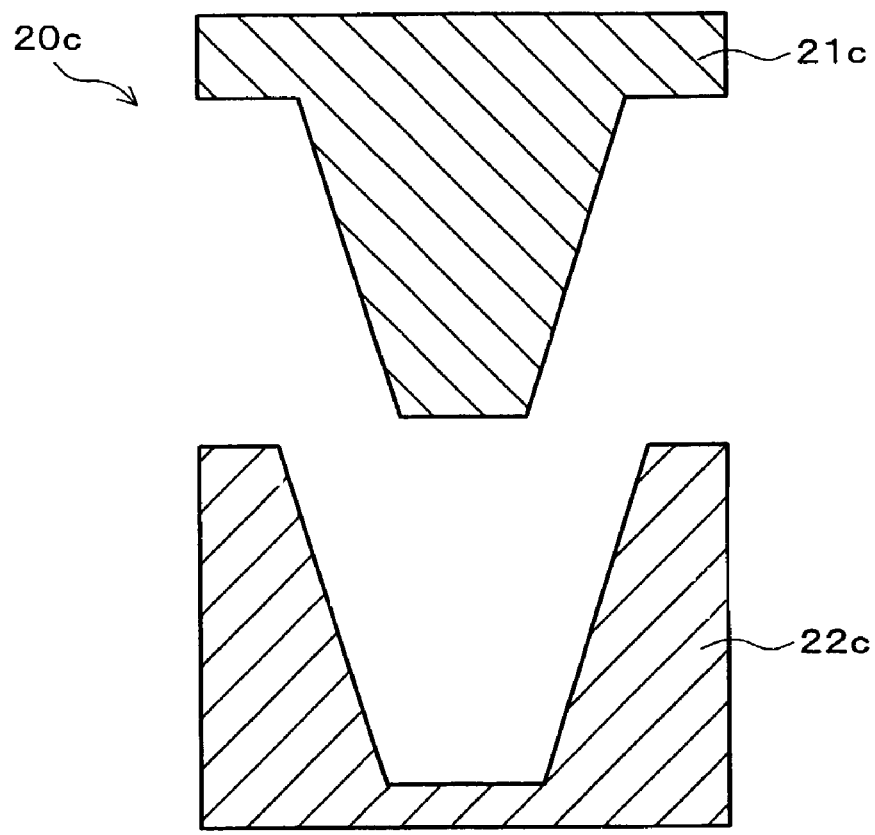
FIGS. 7(a) and (b) are schematic cross-sectional views showing an arrangement of a mold to mold an expanded molded article that is a main body of the cup-shaped container shown in FIGS. 3(a) and (b).
Figure 7:
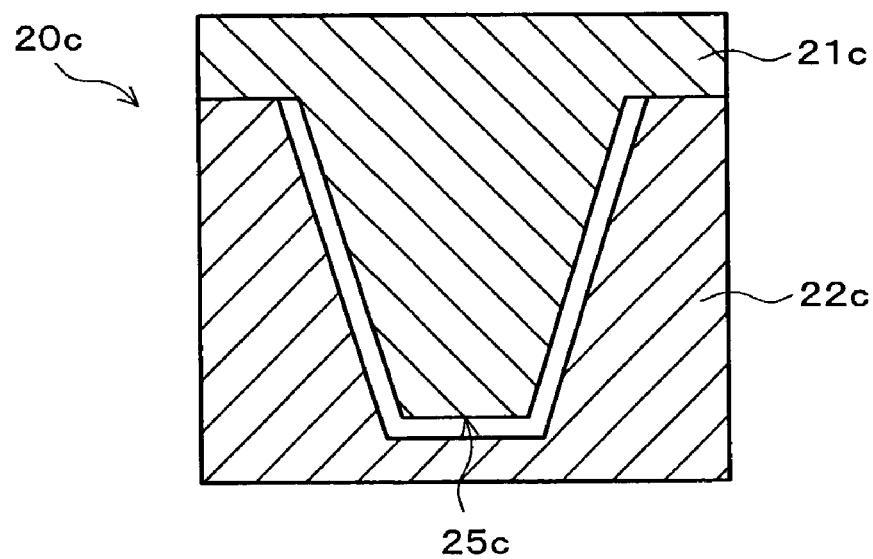
Figure 13:
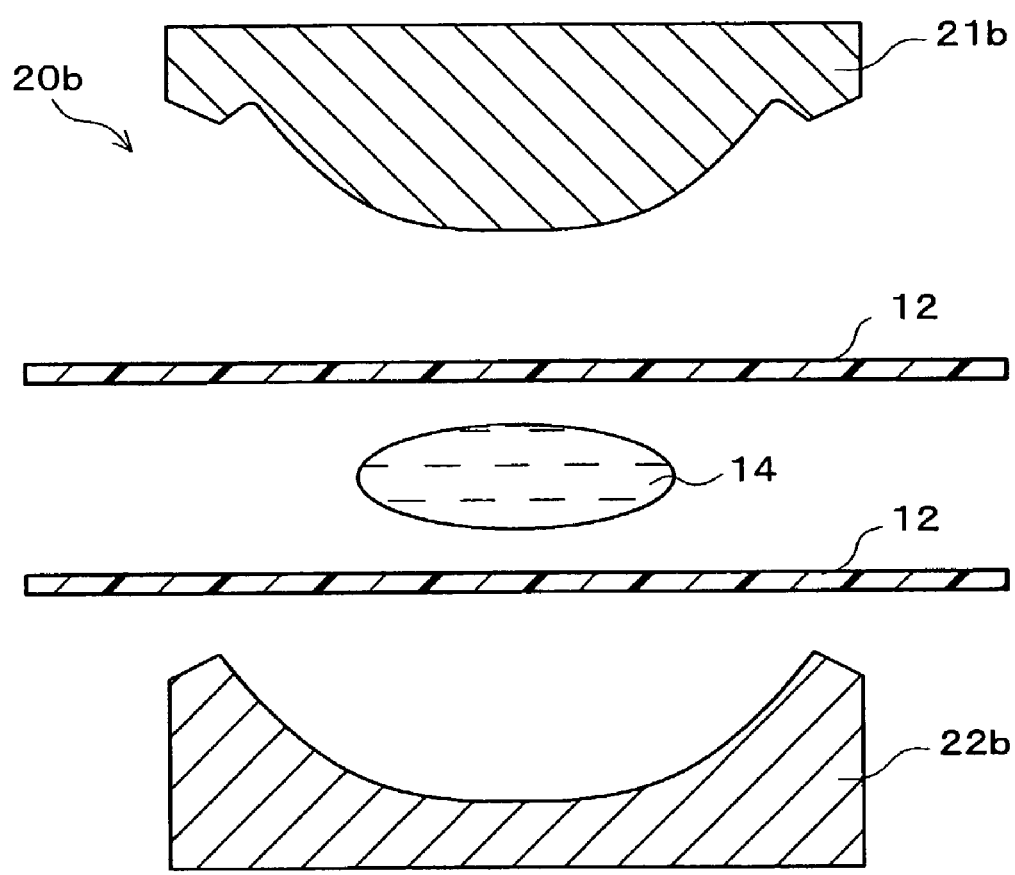
FIG. 13 is an explanatory view describing a case that a manufacturing method 1 is used, in the simultaneous attaching method for manufacturing the biodegradable molded article shown in FIG. 2(a).

To describe the method 1 concretely, as FIG. 13 shows, the metal mold 20*b* shown in FIGS. 6(*a*) and 6(*b*) is arranged so that two coating films 12 still shaped like sheet are provided between the upper and lower parts 21*b* and 22*b*, and further the slurry/dough molding material 14 is provided between the coating films 12. At this moment, the metal mold 20*b* is heated not exceeding the melting point of the biodegradable plastic that is the main ingredient of the coating film 12. Then the upper and lower parts 21*b* and 22*b* are paired up and heated and pressurized to be molded, by the external heating or the internal heating. It is possible to acquire the plate-shaped container 10*b* (see FIG. 2(*a*)) as the biodegradable molded article of the present invention only by this step.

[Method 2]

Method 2 is similar to the method 1, except that the coating film 12 is formed to be substantially matched with an outside shape of the biodegradable molded article in advance. This method is preferably used for a biodegradable molded article with a relatively deep draw depth, i.e. vertically tall shape, such as the bowl-shaped container 10*a* shown in FIG. 1(*a*).

Some types of the coating films 12 cannot be stretched extensively, depending on the type of the main ingredient thereof, i.e. the biodegradable plastic. Hence if method 1 is employed to mold the biodegradable molded article with the deep draw depth such as the bowl-shaped container 10*a* shown in FIG. 1(*a*), the coating film 12 might be ripped and not able to cover the expanded molded article sufficiently. So a molding film, which is the coating film 12 being formed similar to the desired shape in advance, is prepared. On this account, the coating film 12 becomes able to cover biodegradable molded articles having complicated shape and the deep draw depth certainly and efficiently.

Although the forming method of the coating film 12 is not particularly limited and conventional methods of forming sheet films are used, forming methods preferably used are, for instance, vacuum forming, injection molding, blow molding, etc. By the way, it is not necessary to shape the coating film 12 precisely identical to the molded biodegradable molded article, as long as the shape of these two are substantially similar to each other. It is sufficient that the coating film 12 is roughly identical with the shape of the molded biodegradable molded article, i.e. the shape of the mold, inasmuch as the coating film 12 has some flexibility.

Figure 5:
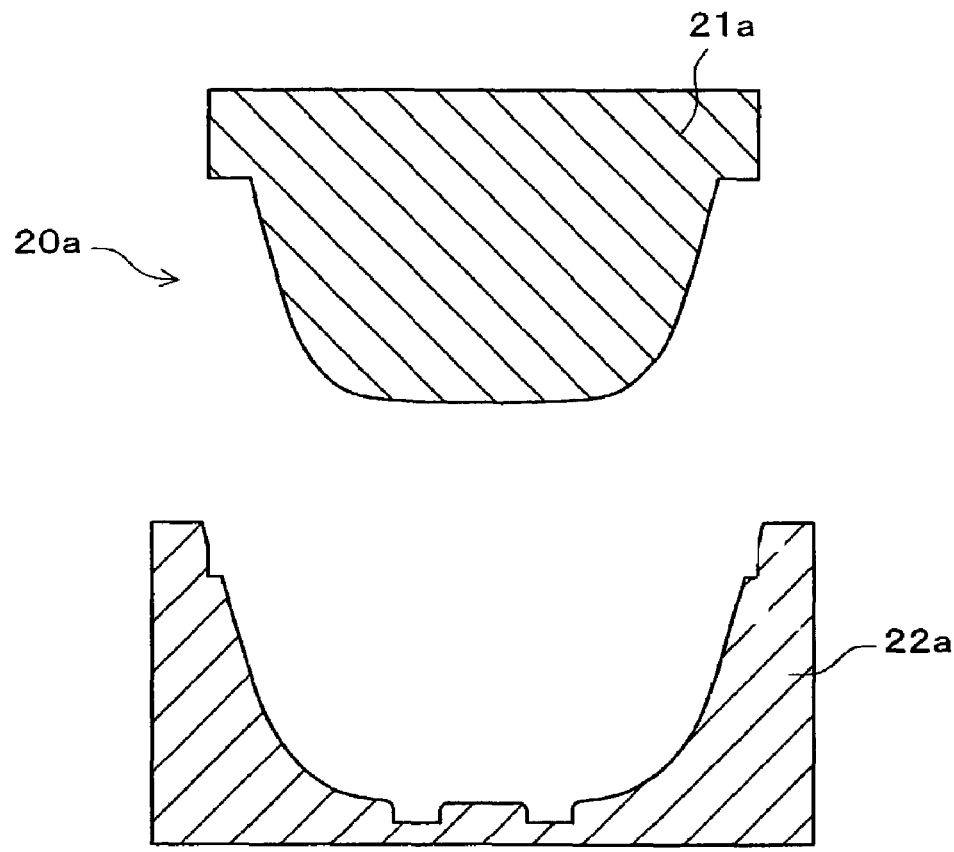
FIGS. 5(a) and (b) are schematic cross-sectional views showing an arrangement of a mold to mold an expanded molded article that is a main body of the bowl-shaped container shown in FIGS. 1(a) and (b).
Figure 5:
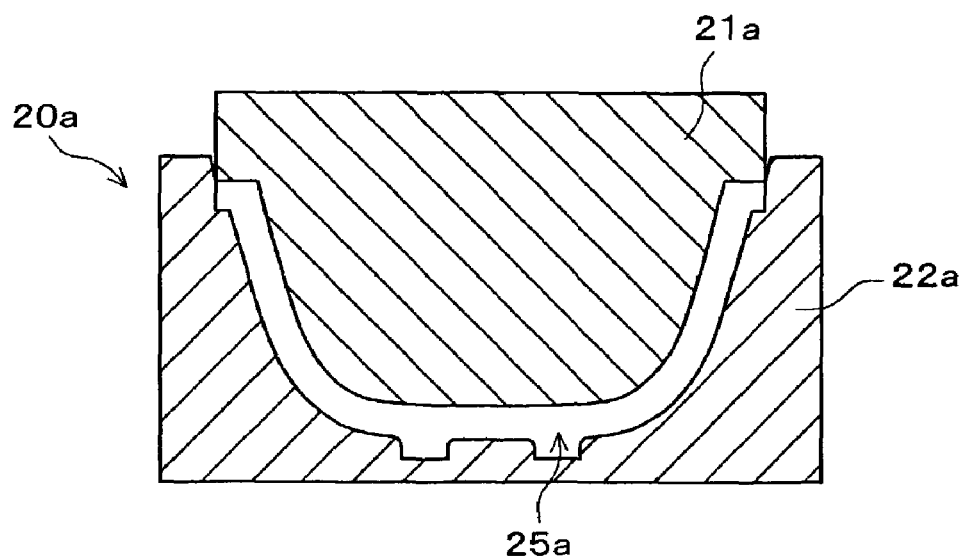

To describe the method 2 more specifically, as shown in FIG. 14, the metal mold 20*a* shown in FIGS. 5(*a*) and 5(*b*)

is arranged so that two coating films 12 shaped substantially similar to the bowl-shaped container 10a are provided between the upper and lower parts 21a and 22a, and further the slurry/dough molding material 14 is provided between the coating films 12. At this moment, the metal mold 20a is heated not exceeding the melting point of the biodegradable plastic that is the main ingredient of the forming film 12a (coating film 12). Then the upper and lower parts 21a and 22a are paired up and heated and pressurized to be molded, by the external heating or the internal heating. It is possible to acquire the bowl-shaped container 10a (see FIG. 1(a)) as the biodegradable molded article of the present invention by this single step.

[Method 3]

Method 3 is identical with method 1, except that the coating film 12 is shaped like a bag in advance, and then the molding material is placed inside the bag-shaped coating film 12. This method is also particularly preferred for molding a horizontally long and wide biodegradable molded article such as the plate-shaped container 10b shown in FIG. 2(a), in accordance with the sheet-shaped coating film 12.

In the case of this method, as a bag film, the coating film 12 is formed to be able to accommodate the molding material. If the molding material is placed inside this bag film, the molding material can be regarded as substantially wrapped by the bag film. So it becomes possible to store large amounts of the molding material for a while by distributing bulk of the molding material to each bag film in advance. Furthermore, preparation of the molding is completed only by putting the wrapped material in the mold, at the time of manufacturing the biodegradable molded article. This makes it possible to further simplify the manufacturing process.

The method to form the coating film 12 to be the bag film is not particularly limited to any method, so conventional methods to form sheet or film-shaped plastics to be bag-shaped ones are able to be used without any problem. Such example includes pillow type packaging. The storing method of wrapped material that the molding material is put in the bag film is not particularly limited to any method as well, and conventional storing methods to prevent starch from going rotten are satisfactorily used.

By the way, in the present invention, the bag film 12b storing the molding material inside is termed "composition for expansion molding". As described above, the compositions for expansion molding (abbreviated as molding composition) are capable of being prepared as large in numbers in advance and being stored for a certain period of time, and at the same time the biodegradable molded article on which the coating film is attached can easily be manufactured by simply putting the molding compositions in the molds. So the molding composition is suitable for manufacturing the biodegradable molded article in an easy and simple step.

Figure 15:
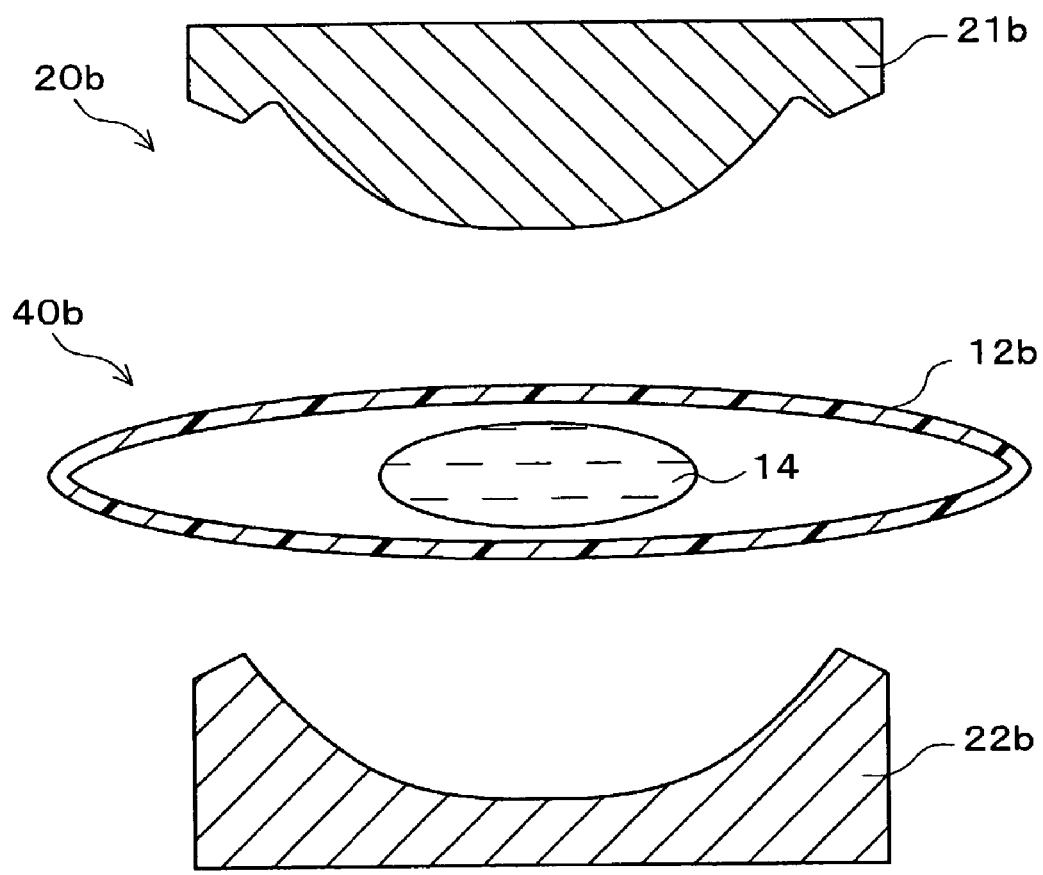
FIG. 15 is an explanatory view describing a case that a manufacturing method 3 is used, in the simultaneous attaching method for manufacturing the biodegradable molded article shown in FIG. 2(a) is used.

To describe the method 3 more specifically, as shown in FIG. 15, the bag film 12b is formed by making the coating film 12 be bag-shape, and then molding compositions 40b is prepared in advance by putting a certain amount of the molding material 14 in each of the bag films 12b. These molding compositions 40b are stored in a specified warehouse etc. Following the steps above, in the metal mold 20b shown in FIGS. 6(a) and 6(b), the molding composition 40b taken out from the warehouse is placed on the lower part 22b, and the molding preparation is now done.

At this moment, the metal mold 20b is heated up to a temperature not exceeding than the melting point of the biodegradable plastic that is the main ingredient of the coating film 12 (bag film 12b). Then the upper and lower parts 21b and 22b are paired up and heated and pressurized to be molded, by the external heating or the internal heating. It is possible to acquire the plate-shaped container 10b (see FIG. 2(a)) as the biodegradable molded article of the present invention by this single step.

[Method 4]

Method 4 is a method that integrates methods 1, 2, and 3, wherein the coating film 12 is formed substantially similar to a bag shape as well as an outer shape of the biodegradable molded article in advance. In other words, the bag film 12d of the method 3 is further modified to be a molding bag film with substantially identical shape as that of the biodegradable molded article. This method is also preferably used for a biodegradable molded article with a relatively deep draw depth, i.e. vertically tall shape, such as the bowl-shaped container 10a shown in FIG. 1(a).

The molding bag film may be formed so that the coating film 12 is modified to be a bag-shaped film in advance and then formed to be substantially identical with the outside shape of the biodegradable molded article, or modified to be the molding bag film after being substantially shaped to be the outside shape of the molded article. The forming method and the method to make the bag film are not particularly restricted and conventional methods can suitably be used, as stated above.

Figure 16:
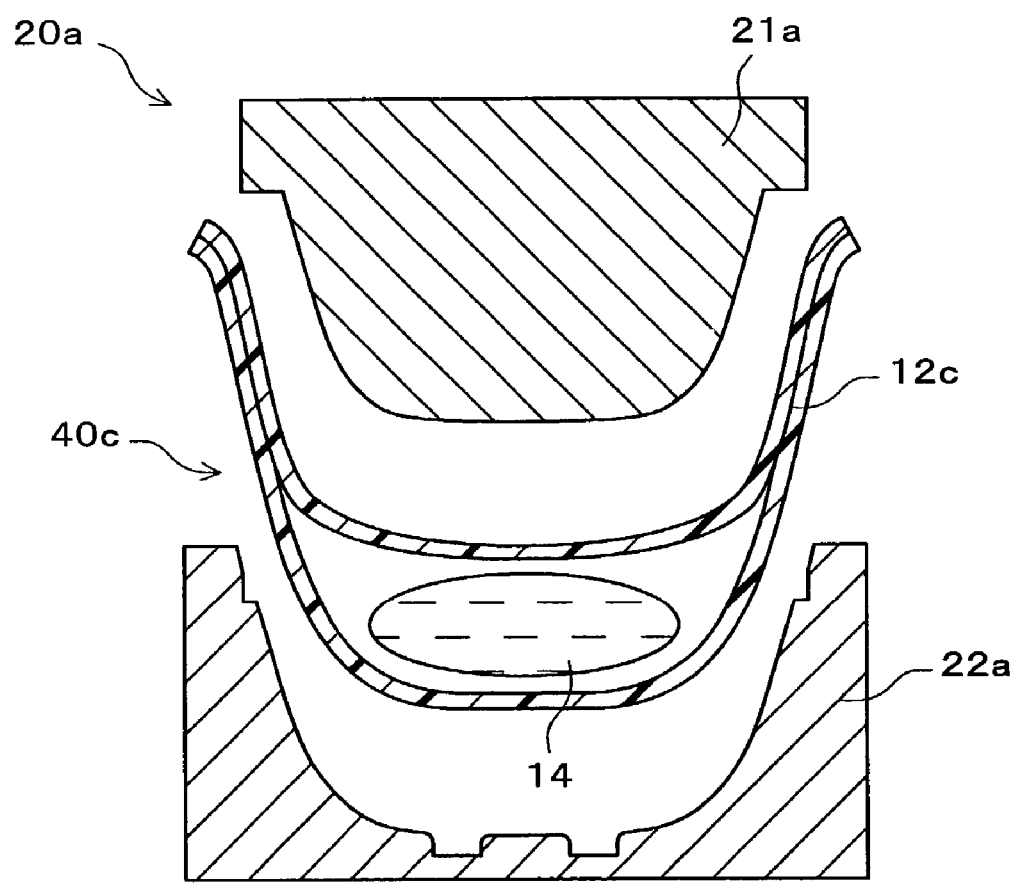
FIG. 16 is an explanatory view describing a case that a manufacturing method 4 is used, in the simultaneous attaching method for manufacturing the biodegradable molded article shown in FIG. 1(a) is used.

To describe method 4 more specifically, as shown in FIG. 16, the coating film 12 is modified to be the molding bag film 12c in advance, and then the molding compositions 40c are prepared by putting a certain amount of the molding material into each of the molding bag films 12c. It is possible to store these molding compositions 40c in a specified warehouse etc. Following the steps above, in the metal mold 20a shown in FIGS. 5(a) and 5(b), the molding composition 40c taken out from the warehouse is placed on the lower part 22a, and the molding preparation is now done.

At this moment, the metal mold 20a is heated up to a temperature not exceeding the melting point of the biodegradable plastic that is the main ingredient of the coating film 12 (molding bag film 12c). Then the upper and lower parts 21a and 22a are paired up and heated and pressurized to be molded, by the external heating or the internal heating. It is possible to acquire the plate-shaped container 10a (see FIG. 1(a)) as the biodegradable molded article of the present invention by this single step.

[Method 5]

Method 5 is identical with method 1, except that the coating film 12 is used as a film part cut out to be shaped substantially identical to the outside shape of the biodegradable molded article in advance. This method is preferably used for a biodegradable molded article with a deeper draw depth or more complicated shape, such as the cup-shaped container 10c shown in FIG. 3(a).

Figure 17A:
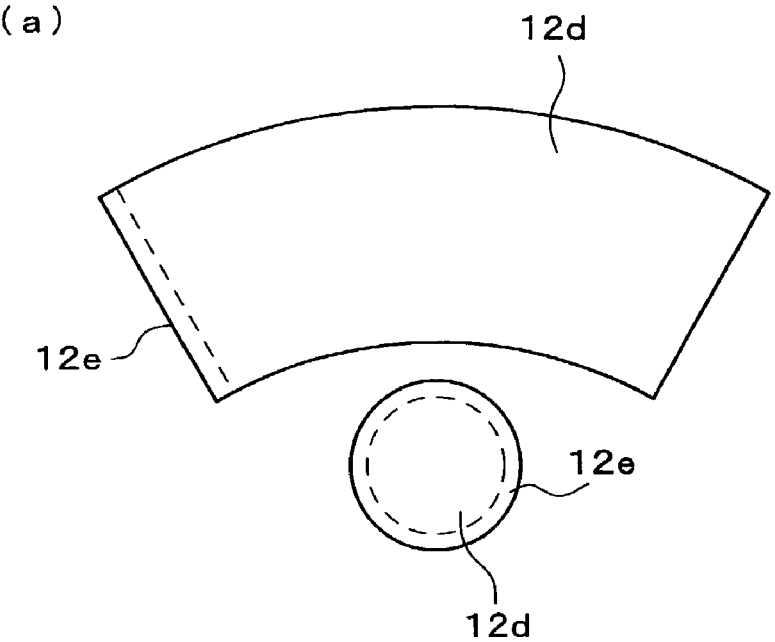
FIG. 17(a) is a schematic plan view showing an example that the coating film is cut off in two pieces of film when the biodegradable molded article shown in FIG. 3(a) is manufactured by using a manufacturing method 5.
Figure 17B:
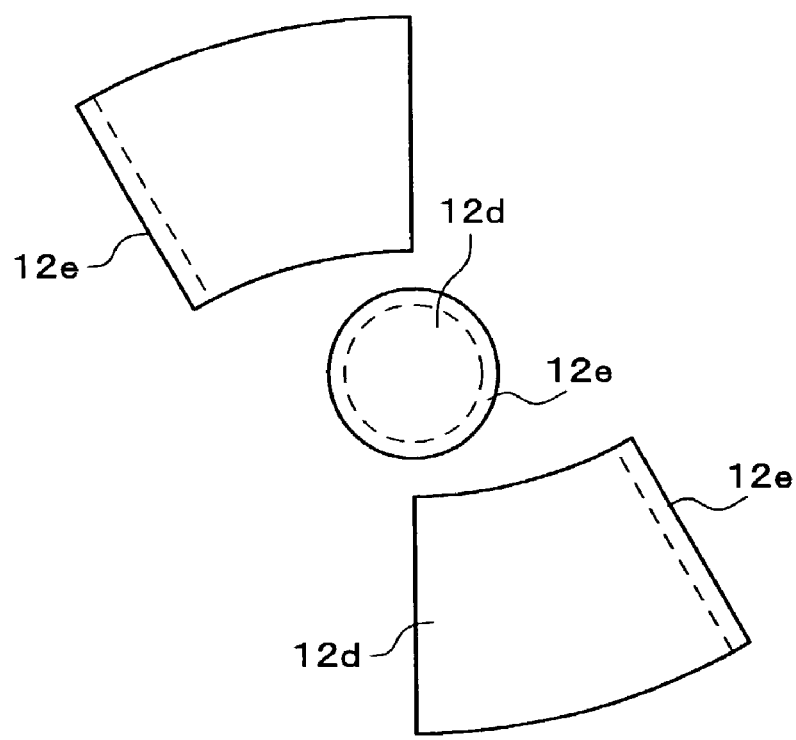
FIG. 17(b) is a schematic plan view showing an example that the coating film is cut off in three pieces of film.

Although the concrete form of the film part is not particularly limited, usually, as FIGS. 17(a) and 17(b) show, a preferably used method is arranged so that film parts 12d are cut into shapes of individual faces of the unfolded molded biodegradable molded article (for instance the cup-shaped container 10c).

The film part 12d further has an overlap section 12e equivalent to an overlap width, as FIGS. 17(a) and 17(b) show. This overlap section 12e is provided around a bottom film part 12d, and along an edge of a side film part 12d where the film part 12d is overlapped with itself to be adhered when the film part 12d is cylindrically wound, etc.

These overlap sections 12e are overlapped with each other at a specified section of each film part 12d, when the film part 12d are arranged in the cavity of the mold in the step of molding. On this account, the overlap section 12e and a part of the overlapping film part 12d are both softened and adhered (fused) to each other. Consequently, the film parts 12d is assembled as one substantially cup-shaped coating film 12, and after this coating film 12 is further adhered to the surface of the expanded molded article, the cup-shaped container 10c of the present invention is acquired.

The shape of the unfolded film part 12d is not particularly limited. So taking the cup-shaped container 10c as the example, the film part 12d may be cut out in two as the side and the bottom, i.e. the side and the bottom are each film part 12d, or in three as two sides and the bottom, as indicated in FIG. 17(b). In this manner, it is sufficient that an assembly of all film parts 12d overlapped at the overlap sections 12e takes a shape matched with the biodegradable molded article such as the cup-shaped one.

The coating film 12 before attaching is more similar to the shape after the molding in this method, than the methods 2 and 4. This method is adequately used when a coating film 12 mainly made of a biodegradable molded article with low drawability, especially when the biodegradable molded article with the deep draw depth such as the cup-shaped container 10c is molded using e coating film 12 with low drawability, and further when the thickness of the coating film 12 after attaching is desired to be freely adjusted, etc.

To describe the method 5 more specifically, in the metal mold 20d shown in FIGS. 8(a) and 8(b), the film part 12d matched with the bottom of the cup-shaped container 10c and the film part 12d matched with the side are arranged along the shapes of the cavity of the lower parts 23d and 24d, as shown in FIG. 18. At this time, the overlap sections 12e have to be surely overlapped with each other.

Then the molding material 14 is provided for the substantially cup-shaped film part 12d. At the same time, the film part 12d matched with the bottom of the cup-shaped container 10c and the film part 12d matched with the side thereof are arranged in accordance with the shape of the upper part 21d, then the upper part 21d is paired with the lower parts 23d and 24d with the arranged film parts 12d. Of course the parts 21d, 23d, and 24d are heated up to a temperature not exceeding the melting point of the biodegradable molded article, of which the coating film 12 is mainly made.

After the steps above, heat and pressure molding is done by the external or internal heating. By this step of heat and pressure molding, the overlap sections 12e of the film parts 12d are fused as above and a layer of the coating film 12 is formed on the surface of the expanded molded article (main body 11c) without a gap between them. As a result, it is possible to acquire the cup-shaped container 10c (see FIG. 3(a)) as the biodegradable molded article of the present invention, by the step above.

[Method 6]

Method 6 is identical with method 5, except that the film parts 12c are adhered at the overlap sections 12d for the purpose to make the film parts 12c be almost matched with the outside shape of the biodegradable molded article before molding the same. As in the case of the method 5, this method is preferably used for a biodegradable molded article with a deeper draw depth or more complicated shape, such as the cup-shaped container 10c shown in FIG. 3(a).

Being almost identical to the method 5, this method is arranged so that an outside shape film is formed in advance by adhering the overlapping sections 12d with certainty by way of fusing etc. This method is preferable when a coating film 12, in which the overlapping sections 12d are not easily fused, is used in the method 5.

To describe the method 6 more specifically, as shown in FIG. 19, in the metal mold 20d indicated in FIGS. 8(a) and 8(b), two outside shape films 12f, which are adhered to be substantially similar to a cup-shape in advance, are overlaid and arranged between the upper and lower parts 21d, 23d, and 24d, and then the molding material is provided between the outside shape films 12f. At this moment, the metal mold 20b is heated up to a temperature not exceeding the melting point of the biodegradable plastic that is the main ingredient of the outside shape film 12f (coating film 12). Then the upper and lower parts 21c, 23d, and 24d are paired up and the heat and pressure molding is conducted using the external or internal heating. As a result, it is possible to acquire the cup-shaped container 10c (see FIG. 3(a)) as the biodegradable molded article of the present invention, by the single step.

[Method 7]

In method 7, the method 6 is further combined with method 3. That is to say, after the film parts 12c are adhered at the overlap sections 12d and formed to be almost identical with the outside shape of the biodegradable molded article before the molding process, the shaped film parts 12c are overlaid to be a substantially bag shape and the molding material is put into the same. As in the cases of the methods 5 and 6, this method is preferably used for a biodegradable molded article with a deeper draw depth or more complicated shape, such as the cup-shaped container 10c shown in FIG. 3(a).

As is the cases of the methods 3 and 4, the molding compositions are prepared by converting the coating film 12 to be the bag film and putting the molding material therein. Thus the molding materials can be stored for a certain period of time and also the preparation of molding can be completed only by putting the molding compositions into the mold, so it becomes possible to further simplify the manufacturing process.

Figure 20:
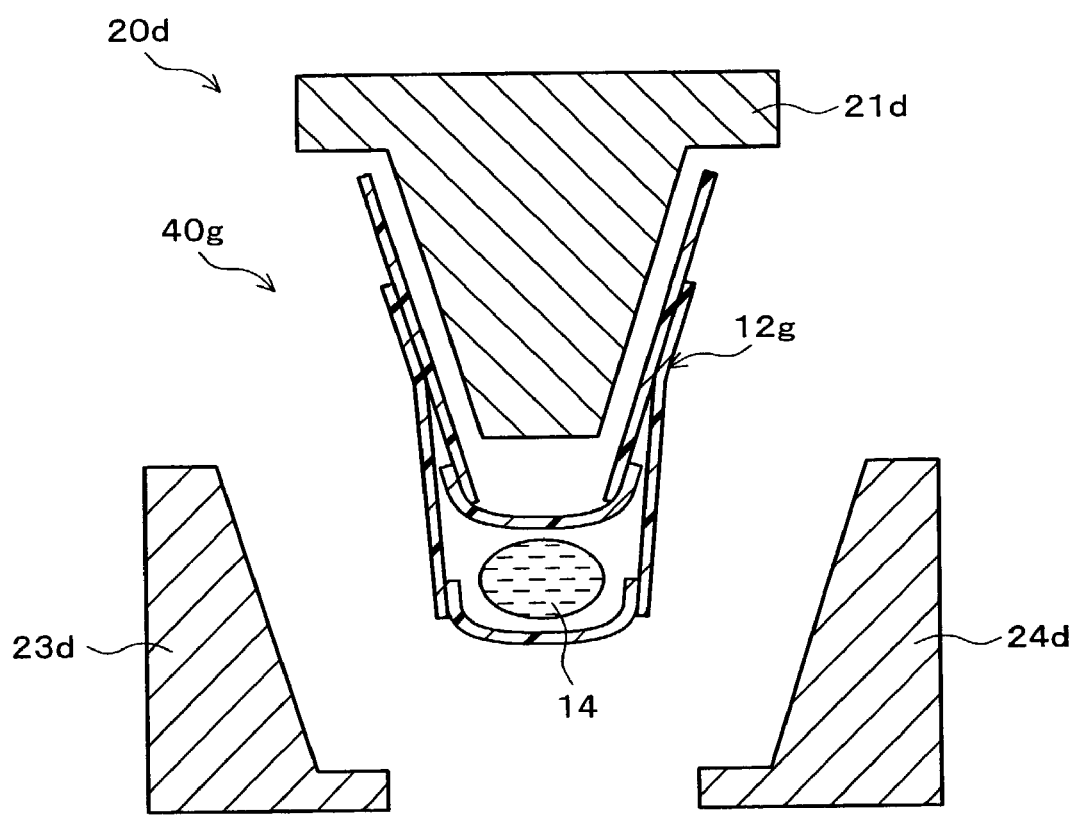
FIG. 20 is an explanatory view describing a case that a manufacturing method 7 is used, in the simultaneous attaching method for manufacturing the biodegradable molded article shown in FIG. 3(a) is used.

To describe method 7 more specifically, as shown in FIG. 20, after the coating film 12 is fabricated to be the film parts matched with the outside shape of the cup-shaped container 10c, the film parts are adhered to be the outside shape film, and two of the same are adhered to be a bag-shaped outline bag film 12g before the procedures below. Then a certain amount of the molding material 14 is put into each of the outline bag films 12g and the molding compositions 40g are prepared. These molding compositions 40g are stored in a specified place such as a warehouse. Following the steps above, in the metal mold 20d shown in FIGS. 8(a) and 8(b), preparation for molding is completed easily by simply taking out the molding composition 40g from the warehouse and placing the same on the lower parts 23d and 24d.

At this moment, the metal mold 20d is heated up to a temperature not exceeding the melting point of the biodegradable plastic that is the main ingredient of the coating film 12 (outline bag film 12g). Then the upper and lower parts 21d, 23d, and 24d are paired up and the heat and pressure molding is conducted using the external or internal heating. As a result, it is possible to acquire the cup-shaped container 10c (see FIG. 3(a)) as the biodegradable molded article of the present invention, by the single step above.

In all attaching methods described above, i.e. both after attaching method and simultaneous attaching method, the coating film 12 is not necessarily attached to the whole expanded molded article, so it is sufficient that the coating film 12 is attached only on a part of the expanded molded article desired to be coated. For instance, a plate used only for supporting food on the face such as:

an one-way plate on which light meals such as takoyaki, fried noodles, Japanese-style pancake, hot dogs, and fried potato are temporarily placed when eaten and thrown away after the consumption; and a plate used as a base for wrapping a cake etc. does not have to be coated except that the top face of the plate. So it is sufficient that the coating film 12 is only attached on the top face.

For instance, in the simultaneous attaching methods 1 to 7, the molding material is sandwiched by two coating films 12 and the whole surface of the expanded molded article is coated by the coating film 12 at the time of the steam expansion molding using the mold, at the time of the steam expansion molding. However, it is possible to coat only the top face of the expanded molded article in the simultaneous attaching methods 1 to 7.

Moreover, when the biodegradable molded article in accordance with the present invention is used as a cushioning material for wrapping electrical appliances etc., it is sufficient that the coating film is attached only on areas directly touching the appliances. Especially, the cushioning as well as the attaching mold to attach the coating film become large when the appliance to be wrapped is large in size, so it is sufficient to attach the coating film on a minimum space when the biodegradable molded article becomes large.

In the meantime, if the whole parts of the container requires gas impermeability in the case such as a container of noodles (such as the bowl-shaped container 10a shown in FIGS. 1(a) and 1(b)) in which not only boiling water is poured but also dried noodles that have to avoid oxidation or moisture absorption are placed, it is preferable if the coating film 12 coats every part of the container.

Next, what is described is an example of a simultaneous attaching method in which only a part of the surface of the expanded molded article is coated by the coating film 12.

[Method 1A]

Method 1A is a modification of the method 1, and a method that only one coating film 12 is provided on the top side of the molding material, instead of two coating films 12 sandwiching the molding material in the case of the method 1, thus the coating film 12 is attached only on the top face of the molding material.

Figure 22:
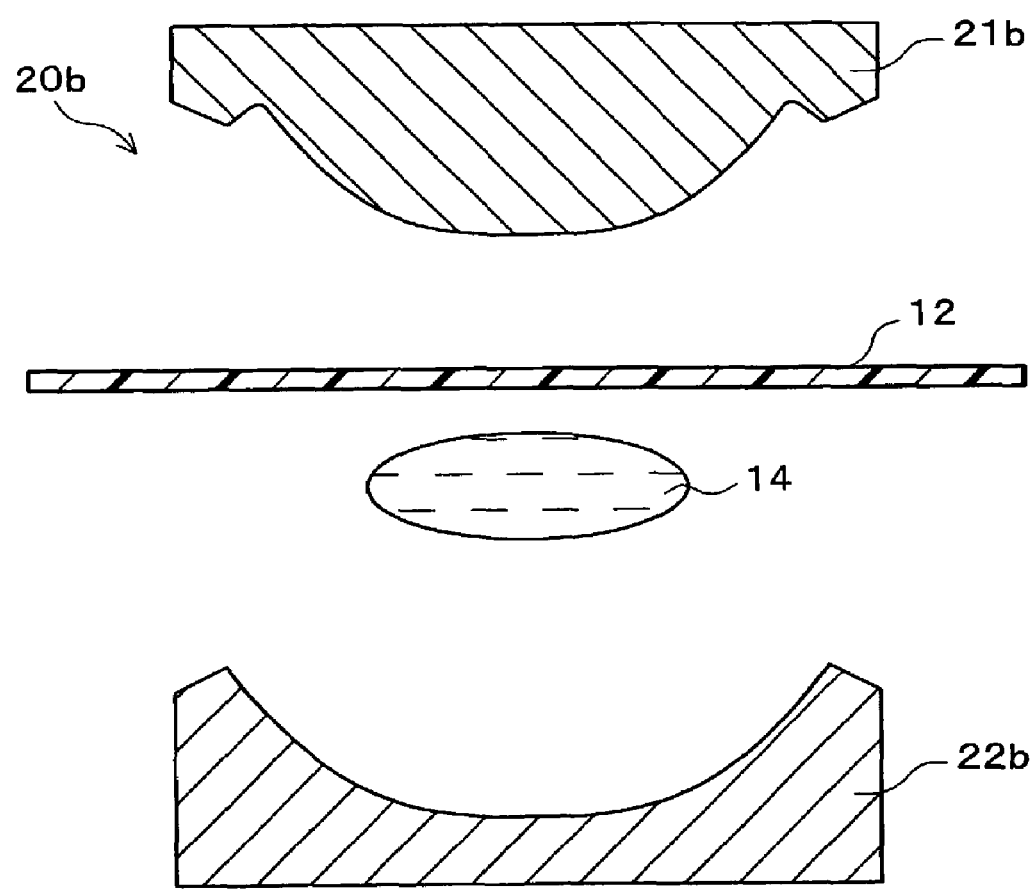
FIG. 22 is an explanatory view describing a case that a manufacturing method 1A is used in the simultaneous attaching method.

To describe the method 1A more specifically, as FIG. 22 shows, only one coating film 12, which is still shaped like a sheet, is provided between the upper and lower parts 21b and 22b of the metal mold 20b shown in FIGS. 6(a) and 6(b), and subsequently the slurry/dough molding material 14 is provided between the coating film 12 and the lower part 22b. At this moment, the metal mold 20b is heated up to a temperature not exceeding the melting point of the biodegradable plastic that is the main ingredient of the coating film 12. Then the upper and lower parts 21b and 22b are paired up and heated and pressurized to be molded, by the external heating or the internal heating. It is possible to acquire a plate-shaped container 10d (see FIG. 23) as the biodegradable molded article of the present invention by the single step above.

As FIG. 23 shows, the plate-shaped container 10d has a main body 11b whose only top side on which food is placed is coated by the coating film 12. The top side of the plate-shaped container 10d has good water resistance. Thus the container 10d is preferably used for the plates described above, such as the one-way plate thrown away after food is placed thereon and the plate used as a base for wrapping a cake etc.

In the present invention, in addition to the mold for molding the expanded molded article, the attaching mold having a cavity that is substantially identical to that of the mold is required, when the after attaching method is adopted for attaching the coating film 12. Meanwhile, when the simultaneous-attaching is adopted, the attaching mold is unnecessary and the coating film 12 can be attached simultaneously with molding the expanded molded article.

Therefore, it is possible to make the coating film 12 substantially adhere to the surface of the expanded molded article with precision and certainty. Especially, even when a complicatedly shaped molded article is manufactured by using the after attaching method, simply copying the shape of the mold allows to manufacture the molded article without creating the attaching mold 30 matched with the expanded molded article or adjusting the shape delicately, because the shape of the molded article depends on a shape of the cavity of the mold.

Moreover, the present invention is arranged so that the coating film 12 is attached either after the expanded molded article, with a specified shape and mainly made of starch (natural product), is molded through the steam expansion or simultaneously with the steam expansion of the expanded molded article above. Thus molded articles having any kind of shapes can be molded as long as capable of being released from the mold. For instance, it is possible to mold the molded articles such as those which have a deep draw depth like a cup, those which have uneven thickness like a food tray with partitions and a wrapping tray, a really complicatedly shaped cushioning material, etc., with certainty.

Furthermore, when the coating film 12 is attached using the after attaching method, as described above, it is possible to acquire variously shaped molded articles with biodegradability and good water/moisture resistance, since the attaching mold that has the shape substantially identical to that of the mold for molding, is used.

Also, if the coating film 12 which is not only water resistant but also gas impermeable etc. is used, when the molded article is used for a container etc., it becomes possible to prevent the contents thereof from being oxidized or getting moist etc. and a molded container suitable for preserving can be acquired, since it becomes possible to add various characteristics such as gas impermeability to the biodegradable molded article of the present invention.

In addition, when words and pictures are printed on the surface of the coating film 12 in advance by using biodegradable ink, simply attaching the coating film allows to print beautiful and detailed design on the surface of the expanded molded article much easily, compared to printing directly on the surface thereof.

In other words, in the present invention, it is possible to add various characteristics to the biodegradable molded article of the present invention easily and certainly, if the coating film 12 is attached on the expanded molded article after functions are imparted to the film 12 in advance.

Figure 21A:
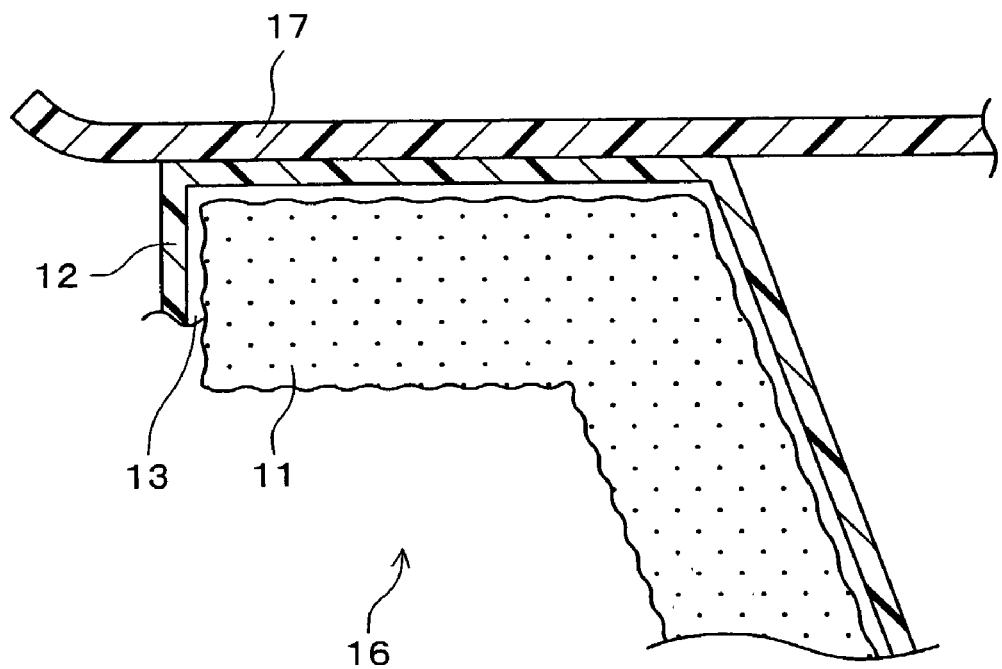
FIG. 21(a) is a schematic explanatory view showing a state that an adhesive lid is adhered to an edge of the biodegradable molded article shown in FIG. 1(b)

When the biodegradable molded article of the present invention is used as a sealable container for holding things inside thereof, the container is often shaped as having an opening. So to seal the container, there is a method to seal the opening by an adhesive lid, for instance. In this case, as FIG. 21(a) shows, it is preferable if at least the coating film 12 is attached on an edge 16 of the opening.

Figure 21B:
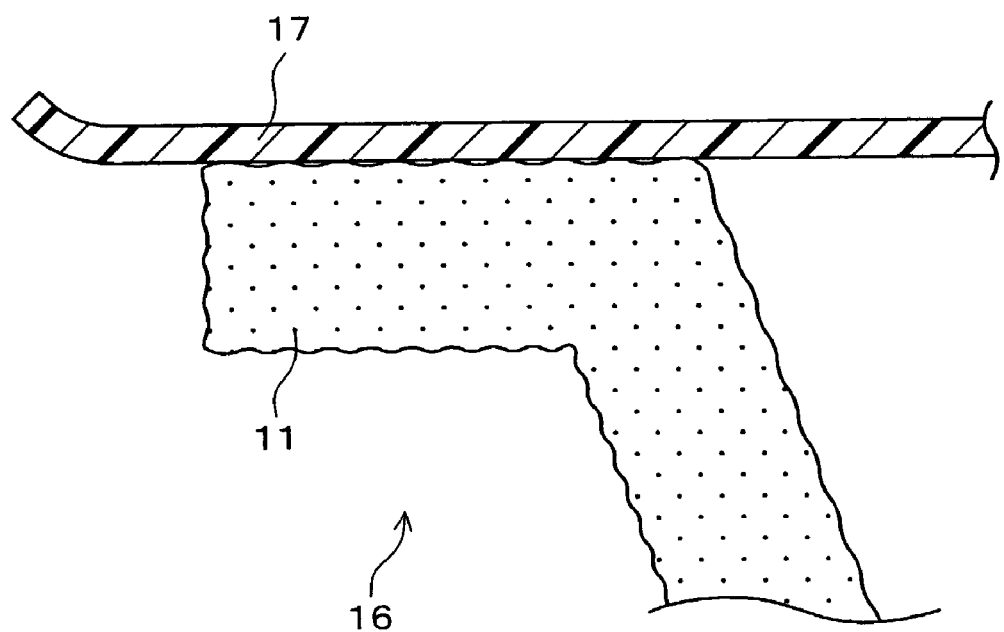
FIG. 21(b) is a schematic explanatory view showing a state that the coating film is not adhered on the edge shown in FIG. 21(a).

The expanded molded article is made as the steam expansion is conducted on natural starch which is the main ingredient of the expanded molded article, etc. Thus microscopic bumps and dips are formed on the surface of the expanded molded article 11 as a result, as shown in FIGS. 21(a) and 21(b). These bumps and dips are predominantly caused by the steam expansion molding, and as FIG. 21(b)

shows, they make the contact between the adhesive lid 17 and the edge 16 worse and the sealability becomes insufficient.

There is a conventional technology to apply water resistant resin on the surface. However, because of the microscopic bumps and dips, no matter how the resin is applied evenly, gaps and pinholes are likely to be created on a coating of the applied resin in accordance with the bumps and dips, and it is impossible to form a smooth coating. Thus adequate water/moisture resistance cannot be acquired. Furthermore, gas impermeability is required when oxidation etc. of the contents needs to be prevented. However the microscopic bumps and gaps lower the gas impermeability too.

To take measures against this, in the present invention, the coating film 12 which is naturally formed as a complete film is attached, for instance, via the adhesive layer 13 or by being softened concurrently with the expansion molding and then directly adhered. Thus, as FIG. 21(a) shows, in the edge 16, adhesion between the adhesive lid 17 and the edge 16 on which the coating film 12 is attached is improved. On this account. the sealability of the opening, such as water resistance, moisture resistance, gas impermeability, etc., is improved, and the contents is better preserved.

As described above, when the coating film 12 is partly attached, after the attaching mold (mold 30 shown in FIG. 11, for instance) for attaching is prepared, an appropriately sized coating film 12 and the adhesive film 13a are arranged to be sandwiched by the attaching mold and the expanded molded article, and then the coating film 12 is pressed and attached to the expanded molded article.

In this manner, the biodegradable molded article in accordance with the present invention is arranged so that the coating film made of biodegradable plastics is attached on the surface of the expanded molded article mainly made of starch. As a result, high water resistance can be added to the surface of the expanded molded article, while keeping stability of the shape (property of keeping an appropriate thickness) and heat insulation. In addition, it becomes possible that strength and flexibility of the expanded molded article is improved.

Moreover, both the expanded molded article and the film have biodegradability and are adequately biodegraded, because an expanded molded article with a large thickness has very good biodegradability since the same is mainly made of starch, while the film is thin enough despite the same is made of biodegradable plastic which is biodegraded slowly. On this account, the biodegradable molded article in accordance with the present invention is biodegraded well when disposed.

Furthermore, since the complete coating film is attached on the surface of the expanded molded article, when the expanded molded article is used as a container with an opening, it becomes possible to completely seal the adhesive lid on the edge of the opening by heating.

The biodegradable molded article in accordance with the present invention is preferably used as a cushion for wrapping, GES, a molded article for wrapping such as a tray for wrapping, a container of ready-to-eat food such as noodles, one-way plate or tray used in the catering industry, and a container of food such as soup and juice.

Especially the water resistance enables the biodegradable molded article of the present invention to be preferably used for a container of food having a high water content, and the same is also preferably used as a container of ready-to-eat food such as noodles to be stored for a certain period of time, because of the gas impermeability thereof.

Now, the present invention is described further in detail, on the basis of examples and comparative examples. However, the present invention is not limited to these examples.

By the way:
water resistance and moisture resistance of the biodegradable molded article of the present invention; and a condition of the expansion molding and a state of the coating film after molding when the simultaneous-molding method is adopted, are assessed by methods below.

[Water Resistance]

Either water at a temperature of 25° C. or boiling water at a temperature around 100° C. was poured into a container to capacity. After the container was left for twenty four hours, the assessment was made in terms of the deformation of the container. Very Good (V) was given when the container was neither deformed at all by both water nor boiling water, Good (G) was given when the container was not deformed at all by water but deformed by boiling water, and Insufficient (I) was given when the container was deformed by boiling water and mildly deformed by water.

[Moisture Resistance]

After the container was left for twenty four hours in a thermo-hygrostat kept at a temperature of 40° C. and at a 80 RH % humidity, the assessment was made in terms of the deformation of the container. Good (G) was given when the container was not deformed at all, and Bad (B) was given when the container was deformed to be unusable. By the way, this assessment doubled as an assessment of gas impermeability of the coating film.

[Quality of Expansion Molding]

When the biodegradable molded article was manufactured by the simultaneous attaching method, a condition of the expansion molding of the main body of the container that was the acquired biodegradable molded article was visually observed. Good (G) was given when the main body was adequately molded through the steam expansion and in a desired shape matched with the mold, Insufficient (I) was given when a part of the main body was not matched with the desired shape in accordance with the mold, despite the same was molded through the steam expansion to some degree, and Bad (B) was given when the main body was not adequately molded through the steam expansion.

[Condition of Coating Film after Molding]

When the biodegradable molded article was manufactured by the simultaneous attaching method, conditions of the coating film and the mold of the biodegradable molded article just after the molded article were visually observed. Good (G) was given when the coating film was not adhered to the mold and adequately coats the surface of the biodegradable molded article, Insufficient (I) was given when the coating film was not adhered to the mold but a part of the surface of the biodegradable molded article was not coated and gaps and holes are found thereon, and Bad (B) was given when either the coating film was adhered to the mold or the surface of the biodegradable molded article was not sufficiently coated by the coating film, despite the coating film was not adhered to the mold.

[Processing of Molding Material]

First of all, the main ingredients such as the varieties of starches (including the derivatives thereof), additives, and water were uniformly mixed to be a composition shown in table. 1, and slurry molding materials (1) to (3) and dough molding material (4) to (6) and (8) were prepared.

TABLE 1

| | | Molding Material (weight %) | | | | | | | |
| | | Slurry | | | | Dough | | | |
| | | (1) | (2) | (3) | (7) | (4) | (5) | (6) | (8) |
|---|---|---|---|---|---|---|---|---|---|
| Starch | Potato Starch | 50 | 25 | 40 | 50 | 0 | 25 | 25 | 65 |
| Derivative | Starch Cross-linked by Phosphoric Acid | 0 | 20 | 0 | 0 | 60 | 25 | 0 | 0 |
| | Starch in Total | 50 | 45 | 40 | 50 | 60 | 50 | 25 | 65 |
| Extending Agents | Bean Curd Lees | 0 | 0 | 0 | 0 | 0 | 0 | 15 | 0 |
| | Beer Yeast Lees | 0 | 0 | 0 | 0 | 0 | 0 | 10 | 0 |
| | Extending Agents (Extending Additives) in Total | 0 | 0 | 0 | 0 | 0 | 0 | 25 | 0 |
| | Total Amount of Main Sold Matter | 50 | 45 | 40 | 50 | 50 | 50 | 50 | 65 |
| Strength Adjusting Agents | Virgin Pulp | 0 | 0 | 5 | 0 | 0 | 10 | 0 | 0 |
| | Used Pulp | 0 | 0 | 0 | 0 | 0 | 0 | 5 | 0 |
| | Calcium Carbonate | 0 | 0 | 0 | 0 | 10 | 5 | 0 | 0 |
| Plasticizer | Sorbitol | 0 | 1 | 0 | 0 | 2 | 0 | 2 | 2 |
| Emulsifier | Glycerine Fatty Acid Ester | 0 | 0.5 | 0 | 0 | 0 | 0 | 0 | 0 |
| Stabilizer | Guar Gum | 0 | 2 | 0.5 | 0 | 0 | 0 | 0 | 0 |
| Mold Releasing Agent | Magnesium Stearate | 0 | 0.5 | 0.5 | 0 | 1 | 1 | 1 | 0 |
| Swelling Agent | Sodium Bicarbonate | 0 | 0 | 0.5 | 4 | 2 | 2 | 0 | 0 |
| Coloring Agent | Cochineal Pigment | 0 | 0 | 0.5 | 0 | 0 | 0 | 0 | 0 |
| | Functional Additives in Total | 0 | 4 | 7 | 4 | 7 | 18 | 8 | 2 |
| | Water | 50 | 51 | 53 | 46 | 25 | 32 | 42 | 33 |
| | Sum Total | 100 | 100 | 100 | 100 | 100 | 100 | 100 | 100 |

By the way, to further clarify the characteristics of the molding materials, amounts of: the starch; the extending agent; the solid matter in total; the functional additives in total; the material ingredients in total; water; the functional additives with respect to the total amount of the solid matter; and the added water with respect to the total amount of the material ingredients are summarized and shown as table. 2.

TABLE 2

| | Molding Material (weight %) | | | | | |
| | Slurry | | | Dough | | |
| | (1) | (2) | (3) | (4) | (5) | (6) |
|---|---|---|---|---|---|---|
| Starch in Total | 50 | 45 | 40 | 60 | 50 | 25 |
| Extending Agents (Extending Additives) in Total | 0 | 0 | 0 | 0 | 0 | 25 |
| Total Amount of Main Sold Matter | 50 | 45 | 40 | 60 | 50 | 50 |
| Functional Additives in Total | 0 | 4 | 7 | 15 | 18 | 8 |
| Amount of Added Functional Additives, When Total Amount of Main Solid Matter Is 100 Weight % (weight %) | 0 | 9 | 18 | 25 | 36 | 16 |
| Total Amount of Material Ingredients | 50 | 49 | 47 | 75 | 68 | 58 |
| Water | 50 | 51 | 53 | 25 | 32 | 42 |
| Amount of Added Water, When Total Amount of Main Solid Matter Is 100 Weight % (weight %) | 100 | 104 | 113 | 34 | 47 | 72 |

[Molding of the Expanded Molded Article]

Figure 3:
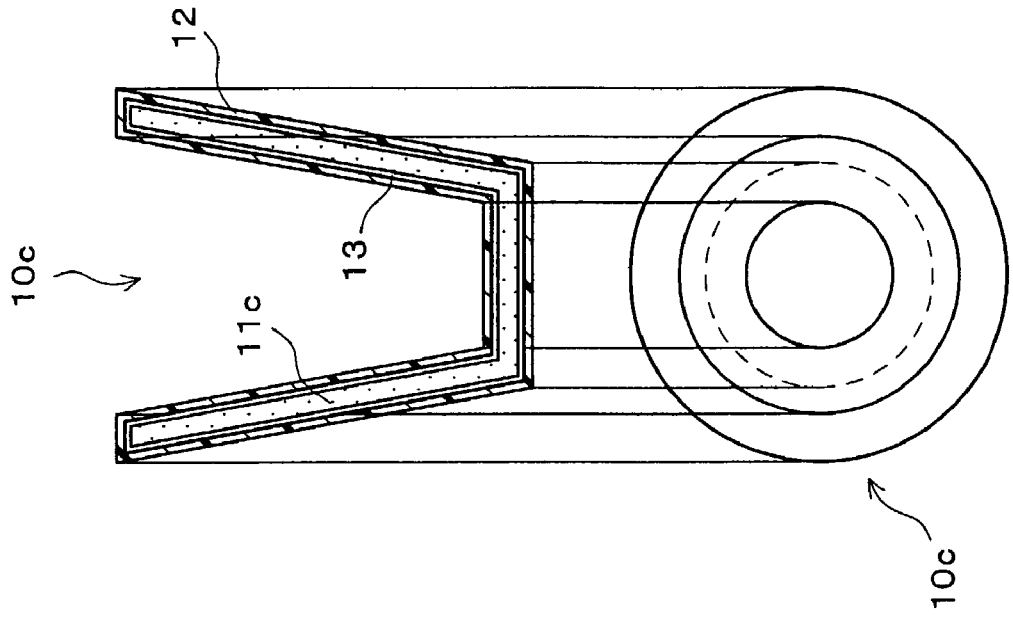
FIGS. 3(a) and (b) are a schematic cross-sectional view and a schematic plan view showing a shape of a cup-shaped container as an example of a biodegradable molded article of an embodiment in accordance with the present invention.
Figure 3:
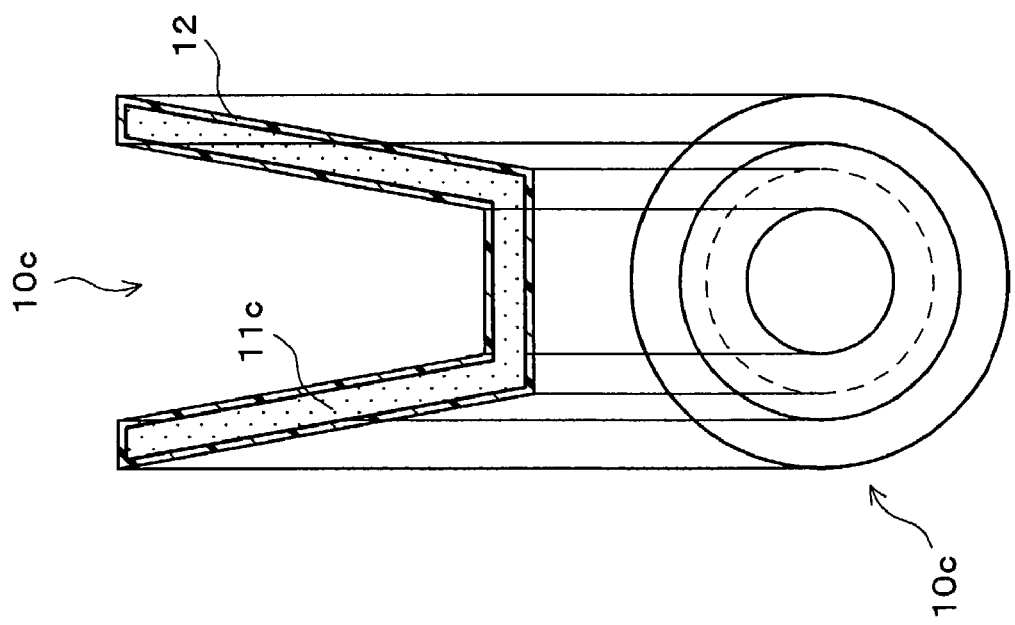

After either the metal mold 20a shown in FIGS. 5(a) and 5(b) or the metal mold 20b shown in FIGS. 6(a) and 6(b) was heated to a temperature of 200° C., either one of the molding materials (1) to (6) was charged into the cavity 25 of the metal mold 20a/20b, and then six types of the main bodies 11a (expanded molded article) shaped as bowl shape A shown in FIG. 7(a) and six types of the main bodies 11b (expanded molded article) shaped as plate shape B shown in FIG. 7(b), i.e. twelve types of the expanded molded articles were acquired. Each expanded molded article's shape and the molding material is indicated in FIG. 3, and numbers (No) in table. 3 show the type of expanded molded articles in the description below.

TABLE 3

| No | Shape | Molding Material |
|---|---|---|
| A1 | Bowl-Shape A | (1) |
| A2 | Bowl-Shape A | (2) |
| A3 | Bowl-Shape A | (3) |
| A4 | Bowl-Shape A | (4) |
| A5 | Bowl-Shape A | (5) |
| A6 | Bowl-Shape A | (6) |
| B1 | Plate-shape B | (1) |
| B2 | Plate-shape B | (2) |
| B3 | Plate-shape B | (3) |
| B4 | Plate-shape B | (4) |
| B5 | Plate-shape B | (5) |
| B6 | Plate-shape B | (6) |

[Coating Film]

As shown in table. 4, six types of films from F1 to F6 were prepared as the coating films. By the way, as in the case of the expanded molded article, numbers (No) in table. 4 indicates the type of the coating film.

TABLE 4

| No | Type | Film Thickness (μm) | Manufacturer |
|---|---|---|---|
| F1 | PBS | 25-100 | Showa Highpolymer |
| F2 | PCL | 20-100 | Daicel Chemical Industries |
| F3 | PLA ① | 20-25 | Mitsui Chemicals |
| F4 | PLA ② | 15-188 | Shimadzu |
| F5 | Modified Polyester | 20-100 | Du Pont |
| F6 | Mater-Bi | 10-100 | Nippon Synthetic Chemical Industry |

[Adhesive]

As shown in table. 5, two types of the adhesives were prepared as the adhesive to attach the coating film to the expanded molded article. By the way, PBS film in G2 with the thickness within the range shown in table. 5 was used. Also, as in the case of the expanded molded article, numbers (No) in table. 5 indicate the type of the adhesives.

TABLE 5

| No | Type | Film Thickness (μm) | Manufacturer |
|---|---|---|---|
| G1 | Starch Glue | — | Kokuyo |
| G2 | PBS Film | 25-100 | Showa Highpolymer |

Using the expanded molded article, the coating film, and the adhesive, the biodegradable molded article in accordance with the present invention was manufactured through the after attaching method. Examples 1 to 21 adopting the after attaching method are shown below. By the way, a biodegradable molded article for comparison was manufactured by coating the expanded molded article with resin, wax, etc., for comparison with the examples, and shown as comparative examples 1 to 3.

EXAMPLE 1

In the case of the expanded molded article A1 shaped as bowl shape A and molded from the molding material (1), the biodegradable molded article of the present invention was acquired by selecting a PBS resin film F1 and a starch glue from the coating films shown in table. 4 and the adhesives shown in table. 5 respectively, and attaching the coating film F1 to the expanded molded article Al by the method described in the aforementioned example. The water resistance and the moisture resistance of this biodegradable molded article were assessed, and the results are shown in table. 6.

EXAMPLES 2 TO 21

The biodegradable molded articles of the present invention were acquired by the same procedures as those of example 1, except arrangements of the expanded molded article shown in table. 6, the coating film, and the adhesive were different. The water resistance and the moisture resistance of these biodegradable molded articles are assessed, and the results were shown in table. 6.

COMPARATIVE EXAMPLE 1

As shown in table. 6, the biodegradable comparative molded article was prepared from the expanded molded article A2 made of the molding material (2) by a conventional method (see Tokukai 2000-142783), i.e. by forming a resin film on the expanded molded article A2 by spraying a shellac resin dissolved or dispersed in alcohol at room temperature and then drying the same. The water resistance and the moisture resistance of this biodegradable molded article for comparison were assessed, and the results are shown in table. 6.

COMPARATIVE EXAMPLES 2 AND 3

As shown in table. 6, the biodegradable molded article for comparison was prepared from either the expanded molded article A2 made of the molding material (2) or the expanded molded article B1 made of the molding material (1) by a conventional method, i.e., by forming a wax film by heating so as to melting paraffin wax or microcrystalline wax at a temperature higher than a melting point thereof and by spraying the waxes above on the expanded molded article and then cooling the same. The water resistance and the moisture resistance of this biodegradable molded article for comparison were assessed, and the results are shown in table. 6.

TABLE 6

| | Expanded Molded Article | Coating Film | Adhesive | Surface Coat | Water Resistance | Moisture Resistance |
|---|---|---|---|---|---|---|
| Example 1 | A1 | F1 | G1 | — | G | G |
| Example 2 | A2 | F1 | G1 | — | G | G |
| Example 3 | A2 | F2 | G2 | — | G | G |
| Example 4 | A2 | F5 | G2 | — | V | G |
| Example 5 | A2 | F6 | G1 | — | G | G |
| Example 6 | A2 | F6 | G2 | — | G | G |
| Example 7 | A3 | F2 | G2 | — | G | G |
| Example 8 | A4 | F2 | G2 | — | G | G |
| Example 9 | A5 | F2 | G2 | — | G | G |
| Example 10 | A6 | F2 | G2 | — | G | G |
| Example 11 | B1 | F2 | G2 | — | G | G |
| Example 12 | B2 | F2 | G2 | — | G | G |
| Example 13 | B2 | F3 | G2 | — | V | G |
| Example 14 | B3 | F3 | G2 | — | V | G |
| Example 15 | B3 | F4 | G2 | — | V | G |
| Example 16 | B3 | F5 | G2 | — | V | G |
| Example 17 | B4 | F4 | G2 | — | V | G |
| Example 18 | B4 | F5 | G2 | — | V | G |
| Example 19 | B5 | F3 | G2 | — | V | G |
| Example 20 | B5 | F4 | G2 | — | V | G |
| Example 21 | B6 | F5 | G2 | — | V | G |
| CE 1 | A2 | — | — | Shellac | I | B |
| CE 2 | A2 | — | — | Wax | I | B |
| CE 3 | B1 | — | — | Wax | I | B |

*CE is Comparative Example
* (V) Very Good
(G) Good
(I) Insufficient
(B) Bad

As the results clearly show, while the biodegradable molded articles of the present invention acquired by the after attaching method had excellent water resistance and moisture resistance, the biodegradable molded articles for comparison whose surfaces were coated by the conventional methods had much inferior water resistance and moisture resistance. Productivity is also excellent because the biodegradable molded article can be manufactured by a simple way, especially when the adhesive film was used such as in examples 3, 4, and 6 to 21.

Furthermore, in the present invention, the expanded molded articles A1 to A6 and B1 to B6, which were the main bodies of the containers made of the biodegradable molded article, had a water content within the specified range and were free from the problems caused by excessive hardness or brittleness. Thus, these biodegradable molded articles of the present invention, which were arranged so that the films were simply attached to the expanded molded articles A1 to A6 and B1 to B6, were proven to have excellent strength and flexibility. By the way, the thickness of the all attached coating films was not more than 30 μm.

Moreover, the biodegradable molded articles of the present invention were proven to have excellent biodegradability compared to the conventional ones, since the weight of the biodegradable plastics such as the coating film and the adhesive layer were not more than 40 weight % of the total weight.

Next, using the molding material and the coating film above, the biodegradable molded article of the present invention by the simultaneous attaching method were manufactured. Examples 22 to 51 by the simultaneous attaching method were shown below.

EXAMPLE 22

The biodegradable molded article of the present invention was acquired by selecting the slurry molding material (3) and the modified polyester (No. F5) from the molding materials shown in table. 1 and the coating films shown in table 4 respectively and using the method 1. The metal mold 20b shown in tables. 6(a) and 6(b) was used as the mold, and as the heating method, the external heating by the electric heater and the internal heating by the high frequency heating (at a frequency of 13.56 MHz) were adopted.

In this example, heating temperatures of the molds by both external and internal heating were respectively set to seven types, 130° C., 140° C., 150° C., 160° C., 170° C., 180° C., and 190° C., and fourteen plate-shaped biodegradable molded articles were acquired. The quality of the expansion molded article, the condition of the coating film after the molding, and the water resistance of these biodegradable molded articles were assessed, and the results are shown in table. 7.

By the way, in the examples 22 to 51 below including this example, the water resistance was assessed only when the conditions of the expansion molding and the coating film after the molding were both Good (G in the table). Hence if either of the quality of the expanded molded article and the condition of the coating film was not assessed as G, the assessment of the water resistance was not conducted and thus "–" are written in the corresponding boxes of tables. 7 to 14.

EXAMPLE 23

Fourteen bowl-shaped biodegradable molded articles of the present invention were acquired by the same procedures as those of example 22, except that the metal mold 20a shown in FIGS. 5(a) and 5(b) and the method 2 were used. The quality of the expansion molding, the condition of the coating film after the molding, and the water resistance of these biodegradable molded articles were assessed, and the results are shown in table. 7.

EXAMPLE 24

Fourteen plate-shaped biodegradable molded articles of the present invention were acquired by the same procedures as that of example 22, except that the method 3 is used. The quality of the expansion molding, the condition of the coating film after the molding, and the water resistance of these biodegradable molded articles were assessed, and the results were shown in table. 7.

EXAMPLE 25

Fourteen bowl-shaped biodegradable molded articles of the present invention were acquired by the same procedures as that of example 23, except that the method 4 were used. The quality of the expansion molding, the condition of the coating film after the molding, and the water resistance of these biodegradable molded articles were assessed, and the results are shown in table. 7.

EXAMPLE 26

Figure 8:
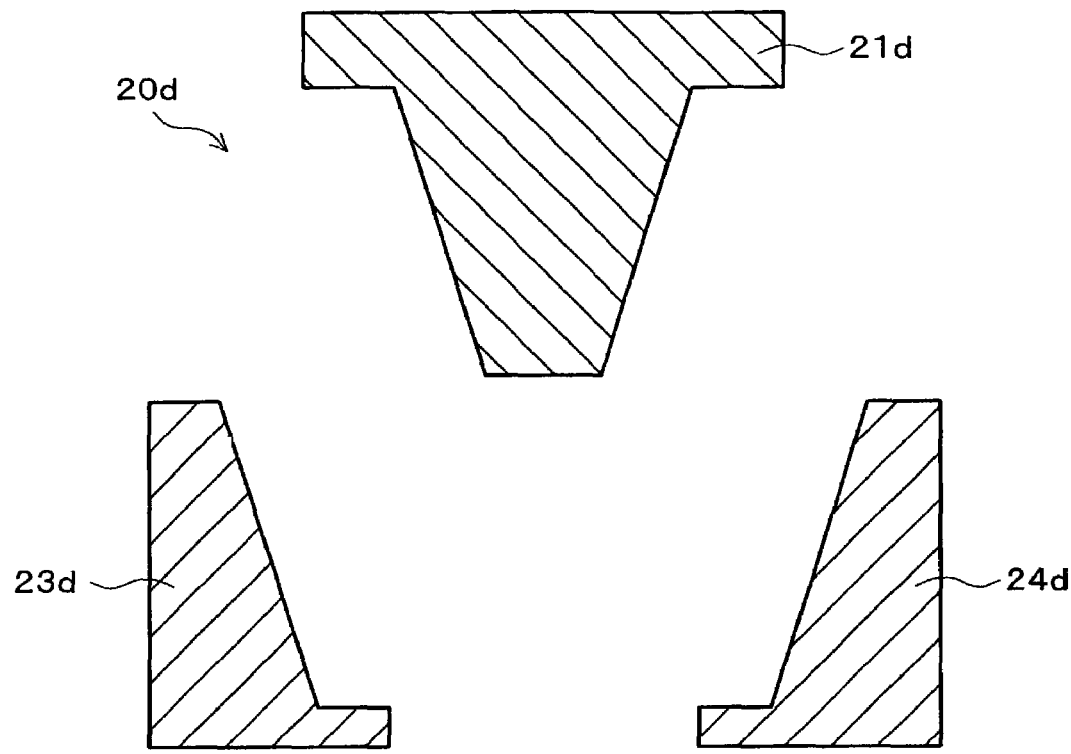
FIGS. 8(a) and (b) are schematic cross-sectional views showing another arrangement of a mold to mold an expanded molded article that is a main body of the cup-shaped container shown in FIGS. 3(a) and (b).
Figure 8:
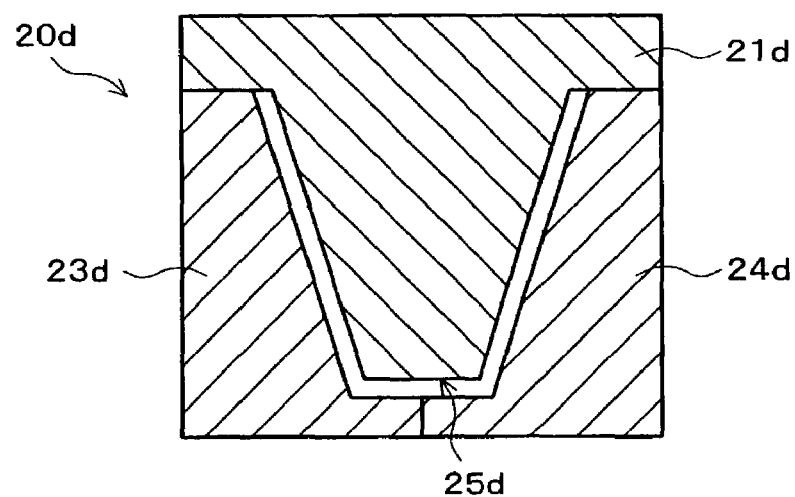

Fourteen cup-shaped biodegradable molded articles of the present invention were acquired by the same procedure as that of example 22, except that two film parts 12*d* shown in FIG. 17(*a*) were used as the coating film and further the metal mold 20*d* shown in FIGS. 8(*a*) and 8(*b*) and the method 5 were used. The quality of the expansion molding, the condition of the coating film after the molding, and the water resistance of these biodegradable molded articles were assessed, and the results are shown in table. 8.

EXAMPLE 27

Fourteen cup-shaped biodegradable molded articles of the present invention were acquired by the same procedure as that of example 26, except that three film part 12*d* shown in FIG. 17(*b*) were used. The quality of the expansion molding, the condition of the coating film after the molding, and the water resistance of these biodegradable molded articles were assessed, and the results are shown in table. 8.

TABLE 7

| Examples and Molding Conditions (Coating Film F5 Is Used) | Mold Temperature (C°) | External Heating | | | Internal Heating | | |
|---|---|---|---|---|---|---|---|
| | | (a) | (b) | (c) | (a) | (b) | (c) |
| Example 22 | 130 | B | G | — | G | G | V |
| Method 1 | 140 | I | G | — | G | G | V |
| Metal Mold 20b | 150 | G | G | V | G | G | V |
| | 160 | G | G | V | G | G | V |
| | 170 | G | I | — | G | I | — |
| | 180 | G | B | — | G | B | — |
| | 190 | G | B | — | G | B | — |
| Example 23 | 130 | B | G | — | G | G | V |
| Method 2 | 140 | I | G | — | G | G | V |
| Metal Mold 20a | 150 | G | G | V | G | G | V |
| | 160 | G | G | V | G | G | V |
| | 170 | G | I | — | G | I | — |
| | 180 | G | B | — | G | B | — |
| | 190 | G | B | — | G | B | — |
| Example 24 | 130 | B | G | — | G | G | V |
| Method 3 | 140 | I | G | — | G | G | V |
| Metal Mold 20b | 150 | G | G | V | G | G | V |
| | 160 | G | G | V | G | G | V |
| | 170 | G | I | — | G | I | — |
| | 180 | G | B | — | G | B | — |
| | 190 | G | B | — | G | B | — |

TABLE 7-continued

| Examples and Molding Conditions (Coating Film F5 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 25 | 130 | B | G | — | G | G | V |
| Method 4 | 140 | I | G | — | G | G | V |
| Metal Mold 20a | 150 | G | G | V | G | G | V |
| | 160 | G | G | V | G | G | V |
| | 170 | G | I | — | G | I | — |
| | 180 | G | B | — | G | B | — |
| | 190 | G | B | — | G | B | — |

\* (a) Condition of Expansion Molding
(b) Condition of Coating Film
(c) Water Resistance

TABLE 8

| Examples and Molding Conditions (Coating Film F5 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 26 | 130 | B | G | — | G | G | V |
| Method 5 | 140 | I | G | — | G | G | V |
| Metal Mold 20d | 150 | G | G | V | G | G | V |
| Film part - | 160 | G | G | V | G | G | V |
| Cut in Two | 170 | G | I | — | G | I | — |
| | 180 | G | B | — | G | B | — |
| | 190 | G | B | — | G | B | — |
| Example 27 | 130 | B | G | — | G | G | V |
| Method 5 | 140 | I | G | — | G | G | V |
| Metal Mold 20d | 150 | G | G | V | G | G | V |
| Film part - | 160 | G | G | V | G | G | V |
| Cut in Three | 170 | G | I | — | G | I | — |
| | 180 | G | B | — | G | B | — |
| | 190 | G | B | — | G | B | — |

\* (a) Condition of Expansion Molding
(b) Condition of Coating Film
(c) Water Resistance

EXAMPLES 28 TO 33

In each example, fourteen biodegradable molded articles of the present invention, either plate-shaped, bowl-shaped, or cup-shaped, were acquired by the same procedures as those of examples 22 to 27, except that the PLA ① (No. F3) was selected from the coating films shown in table. 4 and the heating temperatures of the molds by both external and internal heating were respectively set to seven types, 100° C., 110° C., 120° C., 130° C., 140° C., 150° C., and 160° C. The quality of the expansion molding, the condition of the coating film after the molding, and the water resistance of these biodegradable molded articles were assessed, and the results are shown in tables. 9 and 10.

TABLE 9

| Examples and Molding Conditions (Coating Film F3 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 28 | 100 | B | G | — | G | G | V |
| Method 1 | 110 | B | G | — | G | G | V |
| Metal Mold 20b | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |
| Example 29 | 100 | B | G | — | G | G | V |
| Method 2 | 110 | B | G | — | G | G | V |
| Metal Mold 20a | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |
| Example 30 | 100 | B | G | — | G | G | V |
| Method 3 | 110 | B | G | — | G | G | V |
| Metal Mold 20b | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |
| Example 31 | 100 | B | G | — | G | G | V |
| Method 4 | 110 | B | G | — | G | G | V |
| Metal Mold 20a | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |

\* (a) Condition of Expansion Molding
(b) Condition of Coating Film
(c) Water Resistance

TABLE 10

| Examples and Molding Conditions (Coating Film F3 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 32 | 100 | B | G | — | G | G | V |
| Method 5 | 110 | B | G | — | G | G | V |
| Metal Mold 20d | 120 | B | G | — | G | G | V |
| Film Part - | 130 | B | G | — | G | G | V |
| Cut in Two | 140 | I | I | — | G | I | — |
| | 150 | G | B | — | G | B | — |
| | 160 | G | B | — | G | B | — |
| Example 33 | 100 | B | G | — | G | G | V |
| Method 5 | 110 | B | G | — | G | G | V |
| Metal Mold 20d | 120 | B | G | — | G | G | V |
| Film Part - | 130 | B | G | — | G | G | V |
| Cut in Three | 140 | I | I | — | G | I | — |
| | 150 | G | B | — | G | B | — |
| | 160 | G | B | — | G | B | — |

\* (a) Condition of Expansion Molding
(b) Condition of Coating Film
(c) Water Resistance

EXAMPLES 34 TO 39

In each example, fourteen biodegradable molded articles of the present invention, either plate-shaped, bowl-shaped or cup-shaped, were acquired by the same procedures as those of examples 28 to 33, except that the PLA ② is selected from the coating films shown in table. 4. The quality of the expansion molding, the condition of the coating film after the molding, and the water resistance of these biodegradable molded articles were assessed, and the results are shown in tables. 11 and 12.

TABLE 11

| Examples and Molding Conditions (Coating Film F4 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 34 | 100 | B | G | — | G | G | V |
| Method 1 | 110 | B | G | — | G | G | V |
| Metal Mold 20b | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |
| Example 35 | 100 | B | G | — | G | G | V |
| Method 2 | 110 | B | G | — | G | G | V |
| Metal Mold 20a | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |
| Example 36 | 100 | B | G | — | G | G | V |
| Method 3 | 110 | B | G | — | G | G | V |
| Metal Mold 20b | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |
| Example 37 | 100 | B | G | — | G | G | V |
| Method 4 | 110 | B | G | — | G | G | V |
| Metal Mold 20a | 120 | B | G | — | G | G | V |
| | 130 | B | G | — | G | G | V |
| | 140 | I | I | — | G | I | — |
| | 150 | G | B | — | G | B | — |
| | 160 | G | B | — | G | B | — |

* (a) Condition of Expansion Molding
(b) Condition of Coating Film
(c) Water Resistance

TABLE 12

| Examples and Molding Conditions (Coating Film F4 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 38 | 100 | B | G | — | G | G | V |
| Method 5 | 110 | B | G | — | G | G | V |
| Metal Mold 20d | 120 | B | G | — | G | G | V |
| Film Part - | 130 | B | G | — | G | G | V |
| Cut in Two | 140 | I | I | — | G | I | — |
| | 150 | G | B | — | G | B | — |
| | 160 | G | B | — | G | B | — |
| Example 39 | 100 | B | G | — | G | G | V |
| Method 5 | 110 | B | G | — | G | G | V |
| Metal Mold 20d | 120 | B | G | — | G | G | V |
| Film Part - | 130 | B | G | — | G | G | V |
| Cut in Three | 140 | I | I | — | G | I | — |
| | 150 | G | B | — | G | B | — |
| | 160 | G | B | — | G | B | — |

* (a) Condition of Expansion Molding
(b) Condition of Coating Film
(c) Water Resistance

EXAMPLES 40 TO 45

In each example, fourteen biodegradable molded articles of the present invention, either plate-shaped, bowl-shaped or cup-shaped, were acquired by the same procedures as those of examples 22 to 27, except that the PCL (No. F2) is selected from the coating films shown in table. 4. and the heating temperatures of the molds by both external and internal heating were respectively set to six types, 60° C., 80° C., 90° C., 100° C., and 110° C. The quality of the expansion molding, the condition of the coating film after the molding, and the water resistance of these biodegradable molded articles were assessed, and the results are shown in tables. 13 and 14.

TABLE 13

| Examples and Molding Conditions (Coating Film F2 Is Used) | Mold Temperature (C°) | External Heating (a) | External Heating (b) | External Heating (c) | Internal Heating (a) | Internal Heating (b) | Internal Heating (c) |
|---|---|---|---|---|---|---|---|
| Example 40 | 60 | B | G | — | G | G | G |
| Method 1 | 70 | B | G | — | G | G | G |
| Metal Mold 20b | 80 | B | G | — | G | G | G |
| | 90 | B | I | — | G | I | — |
| | 100 | B | B | — | G | B | — |
| | 110 | B | B | — | G | B | — |
| Example 41 | 60 | B | G | — | G | G | G |
| Method 2 | 70 | B | G | — | G | G | G |
| Metal Mold 20a | 80 | B | G | — | G | G | G |
| | 90 | B | I | — | G | I | — |
| | 100 | B | B | — | G | B | — |
| | 110 | B | B | — | G | B | — |
| Example 42 | 60 | B | G | — | G | G | G |
| Method 3 | 70 | B | G | — | G | G | G |
| Metal Mold 20b | 80 | B | G | — | G | G | G |
| | 90 | B | I | — | G | I | — |
| | 100 | B | B | — | G | B | — |
| | 110 | B | B | — | G | B | — |

* (a) Condition of Expansion Molding
(b) Condition of Coating Film
(c) Water Resistance

TABLE 14

| Examples and Molding Conditions (Coating Film F2 Is Used) | Mold Temperature (C.°) | External Heating (a) | External Heating (b) | External Heating (c) | Internal Heating (a) | Internal Heating (b) | Internal Heating (c) |
|---|---|---|---|---|---|---|---|
| Example 43 | 60 | B | G | — | G | G | G |
| Method 4 | 70 | B | G | — | G | G | G |
| Metal Mold 20a | 80 | B | G | — | G | G | G |
| | 90 | B | I | — | G | I | — |
| | 100 | B | B | — | G | B | — |
| | 110 | B | B | — | G | B | — |
| Example 44 | 60 | B | G | — | G | G | G |
| Method 5 | 70 | B | G | — | G | G | G |
| Metal Mold 20d | 80 | B | G | — | G | G | G |
| Film Part - | 90 | B | I | — | G | I | — |
| Cut in Two | 100 | B | B | — | G | B | — |
| | 110 | B | B | — | G | B | — |
| Example 45 | 60 | B | G | — | G | G | G |
| Method 5 | 70 | B | G | — | G | G | G |
| Metal Mold 20d | 80 | B | G | — | G | G | G |
| Film Part - | 90 | B | I | — | G | I | — |
| Cut in Three | 100 | B | B | — | G | B | — |
| | 110 | B | B | — | G | B | — |

* (a) Condition of Expansion Molding
(b) Condition of Coating Film
(c) Water Resistance

EXAMPLE 46 TO 51

In each example, twelve biodegradable molded articles of the present invention, either plate-shaped, bowl-shaped or cup-shaped, were acquired by the same procedures as those of examples 40 to 45, except that Mater-Bi (NO. F6) was selected from the coating films shown in table. 4. The quality of the expansion molding, the condition of the coating film after the molding, and the water resistance of these biodegradable molded articles were assessed, and the results are shown in tables. 15 and 16.

TABLE 15

| Examples and Molding Conditions (Coating Film F6 Is Used) | Mold Temperature (C. °) | External Heating | | | Internal Heating | | |
|---|---|---|---|---|---|---|---|
| | | (a) | (b) | (c) | (a) | (b) | (c) |
| Example 46 | 60 | B | G | — | G | G | G |
| Method 1 | 70 | B | G | — | G | G | G |
| Metal Mold 20b | 80 | B | G | — | G | I | — |
| | 90 | B | I | — | G | I | — |
| | 100 | B | B | — | G | B | — |
| | 110 | B | B | — | G | B | — |
| Example 47 | 60 | B | G | — | G | G | G |
| Method 2 | 70 | B | G | — | G | G | G |
| Metal Mold 20a | 80 | B | G | — | G | I | — |
| | 90 | B | I | — | G | I | — |
| | 100 | B | B | — | G | B | — |
| | 110 | B | B | — | G | B | — |
| Example 48 | 60 | B | G | — | G | G | G |
| Method 3 | 70 | B | G | — | G | G | G |
| Metal Mold 20b | 80 | B | G | — | G | I | — |
| | 90 | B | I | — | G | I | — |
| | 100 | B | B | — | G | B | — |
| | 110 | B | B | — | G | B | — |

\* (a) Condition of Expansion Molding
(b) Condition of Coating Film
(c) Water Resistance

TABLE 16

| Examples and Molding Conditions (Coating Film F6 Is Used) | Mold Temperature (C. °) | External Heating | | | Internal Heating | | |
|---|---|---|---|---|---|---|---|
| | | (a) | (b) | (c) | (a) | (b) | (c) |
| Example 49 | 60 | B | G | — | G | G | G |
| Method 4 | 70 | B | G | — | G | G | G |
| Metal Mold 20a | 80 | B | G | — | G | I | — |
| | 90 | B | I | — | G | I | — |
| | 100 | B | B | — | G | B | — |
| | 110 | B | B | — | G | B | — |
| Example 50 | 60 | B | G | — | G | G | G |
| Method 5 | 70 | B | G | — | G | G | G |
| Metal Mold 20d | 80 | B | G | — | G | I | — |
| Film Part - | 90 | B | I | — | G | I | — |
| Cut in Two | 100 | B | B | — | G | B | — |
| | 110 | B | B | — | G | B | — |
| Example 51 | 60 | B | G | — | G | G | G |
| Method 5 | 70 | B | G | — | G | G | G |
| Metal Mold 20d | 80 | B | G | — | G | I | — |
| Film Part - | 90 | B | I | — | G | I | — |
| Cut in Three | 100 | B | B | — | G | B | — |
| | 110 | B | B | — | G | B | — |

\* (a) Condition of Expansion Molding
(b) Condition of Coating Film
(c) Water Resistance As the results above clearly show, when the simultaneous-attaching was used or the external heating was selected as the heating method, it was difficult to set an appropriate mold temperature due to the characteristics of the biodegradable plastics of which the coating films are mainly made. Meanwhile, it was also proven that an expansion molding done adequately and a coating film attached in good condition were acquired in the wide range of mold temperatures, when the internal heating was adopted as the heating method.

In other words, it is understood that while molding cannot be done in the case of external heating when the mold temperature is less than 150° C., molding can be done at any mold temperature in the case of internal heating. Also, from the results of examples 28 to 51 shown in tables. 9 to 16, it is possible to know that good biodegradable molded articles can be acquired only in the case of using the internal heating, when the coating films F3 and F4 having a low melting points (130° C. and 140° C., respectively) are used. On this account, it becomes possible to conduct molding and attaching simultaneously by lowering the mold temperature to less than the melting point of the coating film, even when the coating film having a low melting point such as not more than 140° C. is used.

Also, among the biodegradable molded article of examples 22 to 27 (molded at the mold temperature of 150° C. or 160° C.) having good expansion molding, coating (condition of the coating film), and water resistance, the biodegradable molded article manufactured by the internal heating (will be referred to as an internal heating sample) and the biodegradable molded article manufactured by the external heating (will be referred to as an external heating sample) were compared. First of all, stresses required to peel off the coating film were assessed. Consequently, the stress required in the internal heating sample was greater than that in the external heating sample. Then cross sections of the samples were scaled up to 200-700 times and observed by using a stereomicroscope (optical microscope), and the condition of adhesion between the coating film and the expanded molded article was assessed. Consequently, it was confirmed that the internal heating sample had stronger adhesion between the coating film and the expanded molded article than the external molding.

Taking these into account, the internal heating sample is better than the external heating sample in terms of the condition of adhesion of the coating film. This could be presumably because in the case of the internal heating, the pressure to press the coating film against the mold is generated strongly as well as uniformly, since the molding material itself generates heat in a short period of time in an early stage of the process of the expansion molding, and the whole molded article expands altogether. Actually, when the applied high frequency output is lowered in an early stage of the internal heating, not only the molding takes longer time but also the pressure inside the mold is reduced, so the condition of adhesion of the coating film is similar to that of the external heating sample.

Also, it is understood that the biodegradable molded article of the present invention has excellent water resistance.

EXAMPLE 52 TO 56

Five biodegradable molded articles of the present invention shaped as flat orbicular having a diameter of 170 mm were acquired by the same procedures as those of example 22, except that a mold (not illustrated) for a flat orbicular molded article instead of the metal mold 20b, and the slurry molding material (7) or the dough molding material (8) were used, instead of the molding material (3). Then the coating film 12 on the edge of the acquired biodegradable molded article was cut to be around 5 mm larger than the expanded molded article, and the expanded molded article was completely coated by fusing the parts of the coating film 12 extending off the expanded molded article.

Also, a 50 μm thick coating film No. F5 (coating film made of modified polyester) shown in table. 4 was used. Furthermore, the internal heating by the high frequency heating (at a frequency of 13.56 MHz) was used as the heating method and the heating temperature was adjusted so that the mold temperature was 150° C.

In examples 53, 54, and 56, the thickness of the biodegradable molded articles were altered by changing the height of the cavity of the metal mold (mold), used for conducting molding and attaching at the same time, to be different from example 52. In the mean time, in examples 53 to 56, an expanding ratio (air volume ratio) of the biodegradable molded article was altered by changing an internal pressure in the cavity of the metal mold (mold), used for conducting molding and attaching at the same time, to be different from example 52. These molding conditions are shown in table. 17 together with the type of the molding material.

TABLE 17

|  | Molding Material | Thickness of Biodegradable Molded Article (mm) | Pressure in Cavity |
|---|---|---|---|
| Example 52 | (7) | 3 | High |
| Example 53 | (7) | 1 | Middle |
| Example 54 | (8) | 5 | Low |
| Example 55 | (8) | 3 | Middle |
| Example 56 | (8) | 1 | No (Open) |

The weight of the coating film part (A), the weight of the expanded molding part (B), the total weight of these two (total weight, C), and a ratio of the volume of the gas phase (gas phase volume ratio) included in the biodegradable expanded molded article to the total volume of the biodegradable molded article were assessed in each of the resultant biodegradable molded articles. The results of the assessments are shown in table. 18. By the way, "%" in the table indicates a volume %.

TABLE 18

|  | Weight of Biodegradable Molded Article (g) | | | Wight Ratio of Biodegradable | |
|---|---|---|---|---|---|
|  | Coating Film (A) | Expanded Molded Article (B) | Total Weight (C) | Molded Article to Total Weight (B)/(C) | Gas Phase Volume Ratio |
| Example 52 | 3.5 | 3.3 | 6.8 | 48.5 Weight % | 60% |
| Example 53 | 3.5 | 3.0 | 6.5 | 46.2 Weight % | 33% |
| Example 54 | 3.5 | 13.8 | 17.3 | 79.8 Weight % | 15% |
| Example 55 | 3.5 | 6.2 | 9.7 | 63.9 Weight % | 30% |
| Example 56 | 3.5 | 3.2 | 6.7 | 47.8 Weight % | 5% |

COMPARATIVE EXAMPLE 4

A film as the molded article for the comparison was acquired by cutting the 50 μm thick coating film No. F5 (coating film made of denatured polyester) to be a circle that was 170 mm in diameter.

Then the biodegradable molded articles of examples 52 to 56 and the film of comparative example 4 were assessed with respect to the biodegradability thereof. First of all, the samples were buried into a pig waste deposit for composting, and a part of the samples were collected every three weeks, and then the weight of the samples were measured. So a reduction ratio of the weight (reduction ratio) of each sample was determined as an indicator of the biodegradation.

The reduction ratio was determined as below, from the initial weight of the sample and the weight after the collection (after the biodegradation).

(reduced weight)=(initial weight)−(weight after the collection)

(reduction ratio)=(reduced weight)÷(initial weight)

The changes in the reduction ratio of the biodegradable molded articles of examples 52 to 56 and the film of comparative example 4 determined as above are shown in table. 19.

TABLE 19

| | Reduction Ratio of Biodegradable Molded Article | | | | | |
|---|---|---|---|---|---|---|
| | 3 Weeks | 6 Weeks | 9 Weeks | 12 Weeks | 15 Weeks | 18 Weeks |
| Example 52 | 20% | 60% | 90% | 95% | 100% | 100% |
| Example 53 | 15% | 50% | 90% | 95% | 100% | 100% |
| Example 54 | 15% | 50% | 90% | 95% | 100% | 100% |
| Example 55 | 20% | 60% | 90% | 95% | 100% | 100% |
| Example 56 | 5% | 25% | 50% | 80% | 95% | 100% |
| Comparative Example 4 | 0% | 5% | 20% | 40% | 60% | 85% |

As shown above, although the coating film No. F5 which was the least biodegradable among the coating films shown in table. 4 was used in examples 52 to 56, the biodegradable molded articles thereof were completely biodegraded in all cases by 18 weeks later at the latest. Meanwhile, 15 weight % of the biodegradable molded article was not biodegraded even 18 weeks after, in the case of the molded article of comparative example 4 containing only the coating film. By this comparison, it is understood that due to the presence of the expanded molded article, the biodegradable molded article in accordance with the present invention has better biodegradability than the coating film.

However, 5 weight % of the biodegradable molded article of example 56 was not biodegraded after fifteen weeks, so the rate of biodegradation was relatively slower than the biodegradable molded articles of examples 52 to 55. This was presumably because the weight ratio of the expanded molded article in the total weight was lowly 47.8%, and the gas phase volume ratio (expansion ratio) was also lowly 5%.

In the meantime, the biodegradable molded articles of examples 54 and 55 in which the weight ratio of the expanded molded article in the total weight was not less than 63.9%, and the biodegradable molded articles of examples 52 and 53 in which the gas phase volume ratio was not less than 33%, were completely biodegraded after fifteen weeks, so these biodegradable molded articles had excellent biodegradability.

Therefore, it can be said that the biodegradable molded article of the present invention have excellent biodegradability, either when the weight ratio of the expanded molded article in the total weight is not less than 50 weight % (especially not less than 60 weight %) or the gas phase volume ratio is not less than 30%.

EXAMPLE 57 TO 60

First of all, four types of the coating films F3', F4', F5', and F7' shown in table. 20 were prepared as the coating film.

TABLE 20

| No. | Type | Thickness of Film (μm) | Manufacturer | Softening Point (C. °) | Melting Point (C. °) |
|---|---|---|---|---|---|
| F3' | PLA ① | 25 | Mitsui Chemicals | 70 | 130 |
| F4' | PLA ② | 50 | Shimadzu | 90 | 140 |
| F5' | Denatured Polyester ① | 50 | Du Pont | 130 | 170 |
| F7' | Denatured Polyester ② | 50 | Du Pont | 150 | 200 |

Then by the method 2, four bowl-shaped biodegradable molded articles were acquired by using:
the dough molding material (8) shown in table. 1 as the molding material;
the four types of the coating films F3', F4', F5', and F7' shown in FIG. 20 as the coating film; and
the metal mold 20a shown in FIGS. 5(a) and 5(b), as the mold.

As for the heating method, the internal heating by the high frequency heating (at a frequency of 13.56 MHz) was adopted, and the heating temperature was adjusted so that the mold temperature was set to 120° C. in the case of the coating films F3' and F4', 150° C. in the case of the coating film F5', and 170° C. in the case of the coating film F7'.

A continuous boiling test and a microwave oven heating test were conducted in each biodegradable molded article, and the condition of the coating film and the shape of the biodegradable molded article (whether deformed or not) were assessed.

The continuous boiling test was conducted as follows. 400 cm³ of boiling water was poured into each biodegradable molded article and the state of boiling was kept for ten minutes by putting an electric heater into the boiling water, and then the condition of the coating film and the shape of the biodegradable molded article were assessed.

The microwave oven heating test was conducted as follows. 400 cm³ of water was poured into each biodegradable molded article and this biodegradable molded article in which water was charged was heated by a consumer microwave oven at 600W and for ten minutes, and then the condition of the coating film and the shape of the biodegradable molded article were assessed.

The results of the continuous boiling test and the microwave oven heating test are shown in table. 21.

TABLE 21

| | Type of Coating Film | Continuous Boiling Test (10 Minutes) | | Microwave Oven Heating Test (10 Minutes) | |
|---|---|---|---|---|---|
| | | Coating Film | Shape of Molded Article | Coating Film | Shape of Molded Article |
| Example 57 | F3' | Softened | Deformed | Melted in 30 Seconds | Absorbed Water and Deformed |
| Example 58 | F4' | Softened | Unchanged | Melted Where Far from Water | Unchanged |
| Example 59 | F5' | Unchanged | Unchanged | Unchanged | Unchanged |
| Example 60 | F7' | Unchanged | Unchanged | Unchanged | Unchanged |

As shown in table. 21, in the biodegradable molded articles (examples 59 and 60) which start to be softened at a temperature not less than 130° C. and contain the coating films F5' and F7' having melting points not less than 170° C., neither the films were softened nor deformed in the continuous boiling test and the microwave oven heating test. Thus, it was understood that the biodegradable molded article, which starts to be softened at a temperature not less than 130° C. and contains the coating films having melting points not less than 170° C., was excellent in terms of hot water resistance (resistance to very hot water).

EXAMPLE 61

By method 1A, three plate-shaped biodegradable molded articles were acquired by using:
the dough molding material (8) shown in table. 1 as the molding material;
the three types of the coating films F4', F5', and F7' shown in FIG. 20 as the coating film; and
the metal mold 20b shown in FIGS. 6(a) and 6(b) as the mold.

In the case of using the coating film F4', only the internal heating by the high frequency heating (at a frequency of 13.56 MHz) was adopted and the heating temperature was adjusted so that the mold temperature was 120° C. In the case of using the coating film F5', the internal heating by the high frequency heating (at a frequency of 13.56 MHz) and the external heating by the electric heater were both adopted and the heating temperature was adjusted so that the mold temperature was 150° C. In the case of using the coating film F5', the internal heating by the high frequency heating (at a frequency of 13.56 MHz) and the external heating by the electric heater were both adopted and the heating temperature was adjusted so that the mold temperature was 170° C.

Only the top side of the acquired biodegradable molded article on which food is placed was coated by the coating film, like the plate-shaped container 10c shown in FIG. 23.

Water resistance of these biodegradable molded articles made by five different methods was assessed. As a result, none of the biodegradable molded articles are deformed after 25° C. water was charged and left for twenty four hours. So it is found that the biodegradable molded article such as the plate-shaped container 10d shown in FIG. 23, of which a part of the surface of the expanded molded article is coated, also has a sufficient water resistance for a light use.

Despite the concrete embodiments and examples are described in best modes for carrying out the invention, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

As described above, a biodegradable molded article of the present invention is arranged to include a biodegradable expanded molded article and a coating film attached thereon, wherein the coating film is mainly made of biodegradable plastics and has at least hydrophobicity, and the biodegradable expanded molded article is mainly made of starch or a derivative thereof and molded through steam expansion of a slurry or dough molding material prepared by adding water to the starch or the derivative thereof.

Thus in the arrangement above, the steam expansion molding is conducted by using the slurry or dough molding material mainly made of starch, and hence even very complicatedly shaped molded article can be molded easily, and the expanded molded article of the present invention has superior strength compared with conventional molded articles made of starch, since the molded article acquired through molding contains a certain amount of water.

Moreover, since the coating film having biodegradability is attached on this expanded molded article, it is possible to attach the coating film in accordance with the shape of the expanded molded article having enough strength, and furthermore various characteristics such as water resistance and gas impermeability can be additionally imparted to the biodegradable molded article.

In the case of the biodegradable molded article of the present invention arranged as above, a weight of the biodegradable expanded molded article preferably accounts for not less than 60 weight % of the total weight.

Hence an amount of the biodegradable plastic having a slow biodegradation rate accounts for less than 40 weight % of the total weight, so as a result, biodegradability of the biodegradable plastic and that of the expanded molded article are well-balanced, and biodegradability of the biodegradable molded article is further improved.

In the arrangement above, the biodegradable molded article of the present invention is preferably arranged so that a ratio of a gas phase included in the biodegradable expanded molded article is more than 30 volume % of the total volume.

According to the arrangement above, it has become easy to secure microbes which biodegrade the biodegradable expanded molded article, as the surface area of the biodegradable expanded molded article becomes larger. Therefore the biodegradable expanded molded article has become easily biodegradable, and consequently, biodegradability of the biodegradable molded article in the arrangement above is further improved.

In the arrangement above, the biodegradable molded article of the present invention is preferably arranged so that a content of water in the molding material is between not less than 20 weight % and not more than 70 weight %, assuming that the total weight is 100 weight %.

Hence in the arrangement above, the expanded molded article to be acquired has the water content preferable for possessing enough strength, since the molding material includes an adequate amount of water. As a result, it is possible to manufacture the biodegradable molded article without adjusting the water ratio more than once, only by either attaching the coating film in a succeeding process after the process of steam expansion molding or attaching the coating film simultaneously with conducting the steam expansion.

The biodegradable molded article of the present invention arranged as above is preferably arranged so that the coating film is substantially adhered so as to be directly attached on the surface of the biodegradable expanded molded article.

Hence in the arrangement above, the coating film is not easily peeled off from the surface of the expanded molded article, since the coating film is directly attached on the surface of the biodegradable expanded molded article so that the coating film is substantially adhered to the same. This results in the coating film being attached on the expanded molded article with more certainty and biodegradability of the resultant biodegradable molded article being ensured.

The biodegradable molded article of the present invention arranged as above is possibly arranged so that the coating film is attached on the surface of the biodegradable expanded molded article by using a biodegradable adhesive.

Hence in the arrangement above, the use of the biodegradable adhesive results in the coating film being attached on the expanded molded article with more certainty and biodegradability of the resultant biodegradable molded article being ensured.

The biodegradable molded article of the present invention arranged as above is preferably arranged so that a final water content of the biodegradable expanded molded article is between not less than 3 weight % and not more than 20 weight %.

Hence in the arrangement above, an adequate amount of the water contained in the expanded molded article enables the same to have enough strength. This results in further improving the strength and durability of the resultant biodegradable molded article.

The biodegradable molded article of the present invention arranged as above is preferably arranged so that the coating film starts to be melted at a temperature of 130° C. or higher, and has a melting point of 170° C. or higher.

Hence in the arrangement above, softening and melting of the coating film hardly occur, and this makes it possible to avoid deformation of the biodegradable molded article due to heat with more certainty.

As described above, a manufacturing method of a biodegradable molded article in accordance with the present invention includes the processes of:

molding a biodegradable expanded molded article mainly made of starch or a derivative thereof into a specific shape through steam expansion of a slurry or dough molding material prepared by adding water to the starch or the derivative thereof;

attaching a coating film mainly made of a biodegradable plastic and having at least hydrophobicity on a surface of the biodegradable expanded molded article by compress-bonding the film after heating and softening the same.

Hence in the method above, the coating film having biodegradability is attached by heating and compress-bonding the same, after the slurry or dough molding material mainly made of starch is molded through expansion molding. Thus it is possible to provide the expanded molded article containing a certain amount of water required for obtaining enough strength, at the moment of molding, and also to attach the coating film safely to the main body (expanded molded article) having a stable water content. This makes it possible to produce the biodegradable molded article far superior to conventional ones by a simple method.

The manufacturing method of the biodegradable molded article of the present invention arranged as above may be arranged so that a specified mold is used in the molding process and a attaching mold whose shape is substantially identical with that of the mold is used in the attaching process.

Hence in the method above, the attaching mold can easily be produced by copying the shape of the mold produced in advance, since the mold of the expanded molded article and the attaching mold of the coating film have substantially the same shape. Moreover, the biodegradable molded article can be manufactured in a simpler process, since the coating film is attached by using the mold substantially identically shaped as the mold.

The manufacturing method of the biodegradable molded article of the present invention arranged as above may be arranged so that in the attaching process, an adhesive film made of biodegradable plastics, having a low melting point and can be melted at a temperature lower than the melting point of the coating film, is provided between the coating film and the biodegradable expanded molded article, before the coating film is attached.

Hence in the method above, only by inserting an adhesive that is film-shaped in advance between the coating film and the expanded molded article, the coating film is softened and compress-bonded so that the adhesive layer is fused, so the coating film is certainly attached to the surface of the expanded molded article. Consequently, the manufacturing method of the biodegradable molded article can be further simplified, since a process to apply an adhesive to the surface of the expanded molded article becomes unnecesary.

The manufacturing method of the biodegradable molded article of the present invention arranged as above may be arranged so that the coating film is shaped in advance substantially identically with an outside shape of the resultant biodegradable molded article.

Hence in the method above, the coating film is not ripped and a biodegradable molded article with a deep draw depth can be successfully manufactured, since the coating film is shaped in advance substantially identically with an outside shape of the resultant biodegradable molded article. This results in certainly and efficiently coating the expanded molded article by the coating film.

As described above, another manufacturing method of the biodegradable molded article in accordance with the present invention includes the process of:

simultaneously molding a biodegradable expanded molded article and attaching a coating film, the molding being carried out by heating a slurry or dough molding material and the coating film in a mold and by steam-expanding the biodegradable expanded molded article into a specific shape, and the attaching being carried out by compress-bonding the coating film through heating and thereby softening the film so that the coating film is attached on a surface of the biodegradable expanded molded article in the end.

Hence in the method above, expansion molding of a molding material and attaching a coating film are simultaneously done in a single step, and moreover, the resultant biodegradable molded article includes the coating film compress-bonded so as to directly attached to the surface of the expanded molded article. This makes it possible to produce the biodegradable molded article far superior to conventional ones by a simpler method, and also further stabilize a attaching condition of the coating film of the resultant biodegradable molded article.

In another manufacturing method of the biodegradable molded article of the present invention, it is possible to acquire the biodegradable molded article in which the entire surface of the biodegradable expanded molded article is coated by the coating film, after the molding material is sandwiched by the coating films and then heated in a mold.

Another manufacturing method of the biodegradable molded article of the present invention is preferably a method in which the molding material is directly heated by using high frequency dielectric heating in the process above.

According to the method above, pressure to press the coating film against the mold is generated strongly as well as uniformly, since the molding material itself generates heat in a short period of time in an early stage of the process of the expansion molding, and the whole molded article expands altogether. As a result, this makes it possible to acquire the biodegradable molded article in which the biodegradable expanded molded article and the coating film are adhered well.

Also, According to the method above, an adequately heated molding material can be bonded to the molding material even if a temperature of the mold is adjusted to be relatively low, since the molding material is directly heated instead of being heated through the mold. This makes it possible to use a coating film having a low melting point and widen the choice of the coating film.

The manufacturing method of the biodegradable molded article of the present invention arranged as above may be arranged so that the coating film is shaped in advance substantially identically with an outside shape of the resultant biodegradable molded article.

Hence in the method above, the coating film is not ripped and a biodegradable molded article with a deep draw depth can be successfully manufactured, since the coating film is shaped in advance substantially identically with an outside shape of the resultant biodegradable molded article. This results in certainly and efficiently coating the expanded molded article by the coating film.

The manufacturing method of the biodegradable molded article of the present invention arranged as above may be arranged so that the coating film is cut as a film part shaped substantially identically with an outside shape of the resultant biodegradable molded article.

Hence in the method above, the coating film is not ripped and a biodegradable molded article with a deep draw depth can be successfully manufactured, since the coating film before the attaching is shaped substantially identically with an outside shape of the resultant biodegradable molded article in advance. This results in certainly and efficiently coating the expanded molded article by the coating film.

The manufacturing method of the biodegradable molded article of the present invention arranged as above may be arranged so that the coating film is further transformed to be a bag shape capable of storing the molding material therein.

Hence in the method above, the molding material is substantially wrapped by the coating film transformed to be a bag shape. So it becomes possible to store the molding material for a while, and furthermore, preparation of the molding is completed only by putting the wrapped material in the mold, when the biodegradable molded article is manufactured. This makes it possible to further simplify the manufacturing process.

A composition for expansion molding of the present invention is characterized in that:

a slurry or dough molding material mainly made of starch or a derivative thereof and prepared by adding water to the starch or the derivative thereof is stored in a bag film formed as a substantially bag shape; and further the bag film is made from a coating film, mainly made of a biodegradable plastic and having at least hydrophobicity.

In the arrangement above, it is possible to store a large amount of the molding material that is distributed to each bag shaped coating film for a while, and at the same time the biodegradable molded article on which the coating film mainly made of biodegradable plastics is attached can easily be manufactured by simply putting these molding materials in the bag shaped films in the molds and steam-expanding the same. So the biodegradable molded article can be manufactured in an easy and simple process.

What is claimed is:

1. A biodegradable molded article, comprising:
   a biodegradable expanded molded article molded in a specified shape; and
   a coating film attached on a surface of the biodegradable expanded molded article,
   wherein a boundary surface of a layer of the coating film and the surface of the biodegradable molded article is an irregular surface with bumps and dips, and
   wherein the biodegradable expanded molded article is mainly made of starch or a derivative thereof and molded through steam expansion of a slurry or dough molding material prepared by adding water to the starch or the derivative thereof, and
   wherein the coating film is mainly made of a biodegradable plastic and has at least hydrophobicity, and the coating film has a melting point of 170° C. or higher, and
   wherein the biodegradable molded article is obtainable by simultaneously molding the biodegradable expanded molded article and attaching the coating film, the molding being carried out by heating the slurry or dough molding material and the coating film in a mold and by steam-expanding the biodegradable expanded molded article into the specific shape, and the attaching being carried out by compress-bonding the coating film through heating and thereby softening the film so that the coating film is attached on the surface of the biodegradable expanded molded article in the end.

2. The biodegradable molded article as set forth in claim 1, wherein the biodegradable expanded molded article accounts for not less than 60 weight % of the biodegradable molded article.

3. The biodegradable molded article as set forth in claim 1, wherein a gas phase included in the biodegradable expanded molded article accounts for more than 30 volume % of the biodegradable molded article.

4. The biodegradable molded article as set forth in claim 1, wherein the molding material includes water within a range between not less than 20 weight % and not more than 70 weight %, assuming that the biodegradable molded article is 100 weight %.

5. The biodegradable molded article as set forth in claim 1, wherein the coating film is directly attached on the surface of the biodegradable expanded molded article so as to substantially adhered to the surface.

6. The biodegradable molded article as set forth in claim 1, wherein the coating film is attached on the surface of the biodegradable expanded molded article by using a biodegradable adhesive.

7. The biodegradable molded article as set forth in claim 1, wherein a final water content of the biodegradable expanded molded article is not less than 3 weight % and not more than 20 weight %.

8. The biodegradable molded article as set forth in claim 1, wherein the coating film starts to be softened at a temperature of 130° C. or higher.

9. A manufacturing method of a biodegradable molded article, comprising the step of:
   simultaneously molding a biodegradable expanded molded article and attaching a coating film, the molding being carried out by heating a slurry or dough molding material and the coating film in a mold and by steam-expanding the biodegradable expanded molded article into a specific shape, and the attaching being carried out by compress-bonding the coating film through heating and thereby softening the film so that the coating film is attached on a surface of the biodegradable expanded molded article in the end,
   wherein heating is carried out at a temperature not less than a softening point and less than a melting point of the biodegradable plastic,
   wherein the molding material is mainly made of starch or derivative thereof and prepared by adding water to the starch or the derivative thereof, and the coating film is mainly made of a biodegradable plastic having at least hydrophobicity, and the coating film has a melting point of 170° C. or higher, and
   wherein the coating film is further transformed to be a bag shape used for storing the molding material therein.

10. A biodegradable molded article, comprising:
    a biodegradable expanded molded article molded in a specified shape; and
    a coating film attached on a surface of the biodegradable expanded molded article,
    wherein the biodegradable expanded molded article is mainly made of starch or a derivative thereof and molded through steam expansion of a slurry or dough molding material prepared by adding water to the starch or the derivative thereof, and wherein the coating film is mainly made of a biodegradable plastic and has at least hydrophobicity, and wherein a gas phase included in the biodegradable expanded molded article accounts for more than 30 volume % of the biodegradable molded article, and
    wherein the biodegradable molded article is obtainable by simultaneously molding the biodegradable expanded molded article and attaching the coating film, the molding being carried out by heating the slurry or dough molding material and the coating film in a mold and by steam-expanding the biodegradable expanded molded article into the specific shape, and the attaching being carried out by compress-bonding the coating film through heating and thereby softening the film so that the coating film is attached on the surface of the biodegradable expanded molded article in the end;
    wherein a boundary surface of a layer of the coating film and the surface of the biodegradable expanded molded article is an irregular surface with bumps and dips.

11. A manufacturing method of a biodegradable molded article, comprising the step of:
    simultaneously molding a biodegradable expanded molded article and attaching a coating film, the molding being carried out by heating a slurry or dough molding material and the coating film in a mold and by steam-expanding the biodegradable expanded molded article into a specific shape, and the attaching being carried out by compress-bonding the coating film through heating and thereby softening the film so that the coating film is attached on a surface of the biodegradable expanded molded article in the end,
    wherein the molding material is mainly made of starch or derivative thereof and prepared by adding water to the starch or the derivative thereof, and the coating film is mainly made of a biodegradable plastic having at least hydrophobicity, and the coating film has a melting point of 170° C. or higher; and
    wherein the coating film is further transformed to be a bag shape used for storing the molding material therein.

* * * * *